(12) United States Patent
Ruskuc et al.

(10) Patent No.: US 12,572,834 B2
(45) Date of Patent: Mar. 10, 2026

(54) NUCLEAR SPIN WAVE QUANTUM REGISTER FOR SOLID STATE QUANTUM NETWORK NODES

(71) Applicant: California Institute of Technology, Pasadena, CA (US)

(72) Inventors: Andrei Ruskuc, Pasadena, CA (US); Joonhee Choi, Pasadena, CA (US); Chun-Ju Wu, Pasadena, CA (US); Andrei Faraon, La Canada Flintridge, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 586 days.

(21) Appl. No.: 17/899,291

(22) Filed: Aug. 30, 2022

(65) Prior Publication Data

US 2023/0093578 A1 Mar. 23, 2023

Related U.S. Application Data

(60) Provisional application No. 63/238,624, filed on Aug. 30, 2021.

(51) Int. Cl.
*G06N 10/20* (2022.01)
*G06N 10/40* (2022.01)
(52) U.S. Cl.
CPC ............. *G06N 10/40* (2022.01); *G06N 10/20* (2022.01)
(58) Field of Classification Search
USPC ......................................................... 320/100
See application file for complete search history.

(56) References Cited

U.S. PATENT DOCUMENTS

| | | | |
|---|---|---|---|
| 2021/0028863 A1 | 1/2021 | Faraon et al. | |
| 2022/0138608 A1* | 5/2022 | Ramette .............. | G06F 9/30101 |
| | | | 716/100 |
| 2023/0222375 A1* | 7/2023 | Ishiguro ................ | G06N 10/40 |
| | | | 716/100 |

(Continued)

FOREIGN PATENT DOCUMENTS

EP           3855370           7/2021

OTHER PUBLICATIONS

PCT International Search Report & Written Opinion dated Dec. 8, 2023 for PCT Application No. PCT/US2022/042049.

(Continued)

*Primary Examiner* — Brian Ngo
(74) *Attorney, Agent, or Firm* — GATES & COOPER LLP

(57) ABSTRACT

A system for coupling a qubit to a register, wherein the system controls application of a protocol comprising a sequence of pulses synchronized with an RF field, the protocol further comprising a timing, a phase, and a duration of each of the pulses comprising a single qubit gate, a period and amplitude of the RF field, and a number of repeats of the sequence, so that application of the protocol controls a coherent spin exchange interaction between a register and a qubit having a zero magnetic dipole moment. The qubit comprises a first spin state and a second spin state both of which have a zero magnetic dipole moment; the register comprises multiple register spins having an energy level structure; and the register spins are indistinguishable so as to be configurable in basis states including a superposition state used for storing the quantum state of the qubit.

20 Claims, 35 Drawing Sheets

(56)                    References Cited

U.S. PATENT DOCUMENTS

2023/0229951 A1*    7/2023   Sellier ..................... G06N 10/40
                                                        716/100

OTHER PUBLICATIONS

Bradley, C.E., et al., "A Ten-Qubit Solid-State Spin Register with Quantum Memory up to One Minute", Physical Review X, 2019, pp. 031045-1-031045-12, vol. 9.

Taminiau, T.H., et al., "Universal control and error correction in multi-qubit spin registers in diamond", arXiv:1309.5452v2, Sep. 2013, pp. 1-30.

Neumann, P., "Quantum register based on coupled electron spins in a room-temperature solid", Nature Physics, Apr. 2010, pp. 249-253, vol. 6.

Dutt, G.M.V., et al., "Quantum Register Based on Individual Electronic and Nuclear Spin Qubits in Diamond", Science, Jun. 2007, pp. 1312-1316, vol. 316.

Ruskuc, A., et al., Nuclear spin-wave quantum register for a solid-state qubit, Nature, Feb. 2022, pp. 408-413, vol. 602.

Awschalom, D. D., Hanson, R., Wrachtrup, J. & Zhou, B. B. Quantum technologies with optically interfaced solid-state spins. Nat. Photonics 12, 516-527 (2018).

Bermudez, A., Jelezko, F., Plenio, M. B. & Retzker, A. Electron-mediated nuclear-spin interactions between distant nitrogen-vacancy centers. Phys. Rev. Lett. 107, 3-7 (2011).

Bernien, H. et al. Heralded entanglement between solidstate qubits separated by three metres. Nature 497, 86-90 (2013).

Bhaskar, M. K. et al. Experimental demonstration of memory-enhanced quantum communication. Nature 580, 60-64 (2020).

Bourassa, A. et al. Entanglement and control of single nuclear spins in isotopically engineered silicon carbide. Nat. Mater. 19, 1319-1325 (2020).

Chatterjee, A. et al. Semiconductor qubits in practice. Nat. Rev. Phys. 3, 157-177 (2021).

Chen, S., Raha, M., Phenicie, C. M., Ourari, S. & Thompson, J. D. Parallel single-shot measurement and coherent control of solid-state spins below the diffraction limit. Science 370, 592-595 (2020).

Choi, J. et al. Robust Dynamic Hamiltonian Engineering of Many-Body Spin Systems. Phys. Rev. X. 10, 31002 (2019).

Cohen-Tannoudji, C., Dupont-Roc, J. & Grynberg, G. Atom-Photon Interactions (Wiley-VCH, Weinheim, (2004).

Degen, C. L., Reinhard, F. & Cappellaro, P. Quantum sensing. Rev. Mod. Phys. 89, 1-39 (2017).

Gangloff, D. A. et al. Quantum interface of an electron and a nuclear ensemble. Science 364, 62-66 (2019). 1812.07540.

Zhong, T., Rochman, J., Kindem, J. M., Miyazono, E. & Faraon, A. High quality factor nanophotonic resonators in bulk rare-earth doped crystals. Opt. Express 24, 536 (2016).

Gullion, T., Baker, D. B. & Conradi, M. S. New, compensated Carr-Purcell sequences. J. Magn. Reson. 89, 479-484 (1990).

Hensen, B. et al. A silicon quantum-dot-coupled nuclear spin qubit. Nat. Nanotechnol. 15, 13-17 (2020).

Taminiau, T. H., Cramer, J., Van Der Sar, T., Dobrovitski, V. V. & Hanson, R. Universal control and error correction in multi-qubit spin registers in diamond. Nat. Nanotechnol. 9, 171-176 (2014).

Kalb, N. et al. Entanglement distillation between solidstate quantum network nodes. Science 356, 928-932 (2017).

Kindem, J. M. et al. Control and single-shot readout of an ion embedded in a nanophotonic cavity. Nature, 201-204 (2020).

Knill, E. et al. Randomized benchmarking of quantum gates. Physical Review A—Atomic, Molecular, and Optical Physics 77,1-7(2008).

Waldherr, G. et al. Quantum error correction in a solidstate hybrid spin register. Nature 506, 204-207 (2014).

Kornher, T. et al. Sensing Individual Nuclear Spins with a Single Rare-Earth Electron Spin. Phys. Rev. Lett. 124, 170402 (2020).

Metsch, M. H. et al. Initialization and Readout of Nuclear Spins via negatively charged Silicon—Vacancy Center in Diamond. Phys. Rev. Lett. 122, 190503 (2019).

Wolfowicz, G. et al. Quantum guidelines for solid-state spin defects. Nature Reviews Materials (2021).

Zhong, T. et al. Nanophotonic rare-earth quantum memory with optically controlled retrieval. Science 1395, 1392-1395 (2017).

Pompili, M. et al. Realization of a multi-node quantum network of remote solid-state qubits. Science 372, 259 264 (2021).

Ruskuc, A., Wu, CJ., Rochman, J et al. Nuclear spin-wave quantum register for a solid-state qubit. Nature 602, 408-413 (2022).

Scheuer, J. et al. Robust techniques for polarization and detection of nuclear spin ensembles. Phys. Rev. B 96, 1-10 (2017).

Taylor, J. M., Marcus, C. M. & Lukin, M. D. Long-Lived Memory for Mesoscopic Quantum Bits. Phys. Rev. Lett. (2003).

* cited by examiner

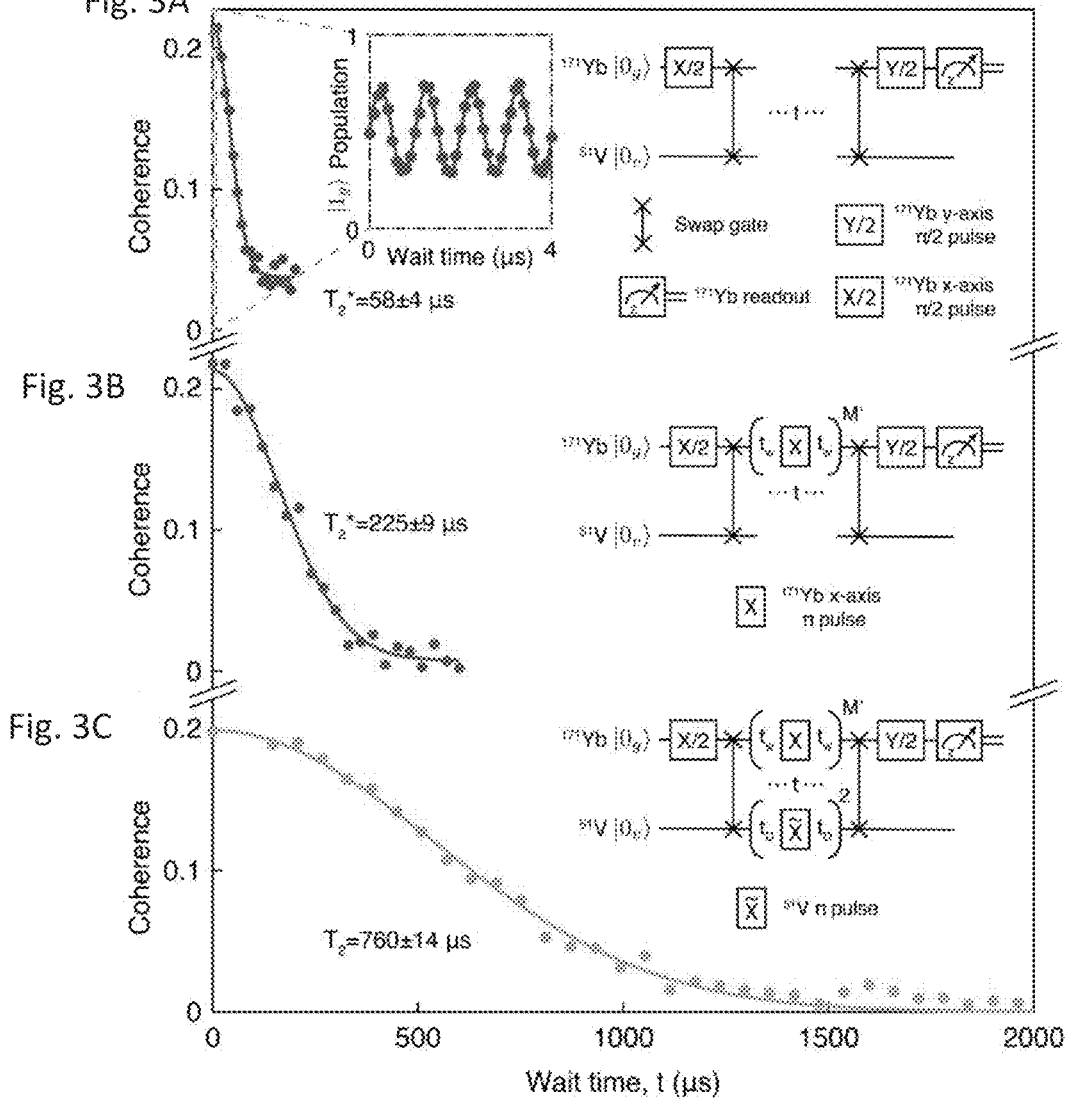

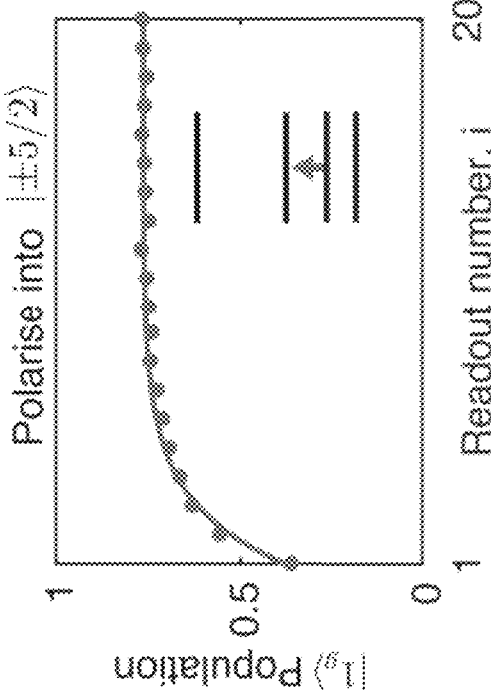
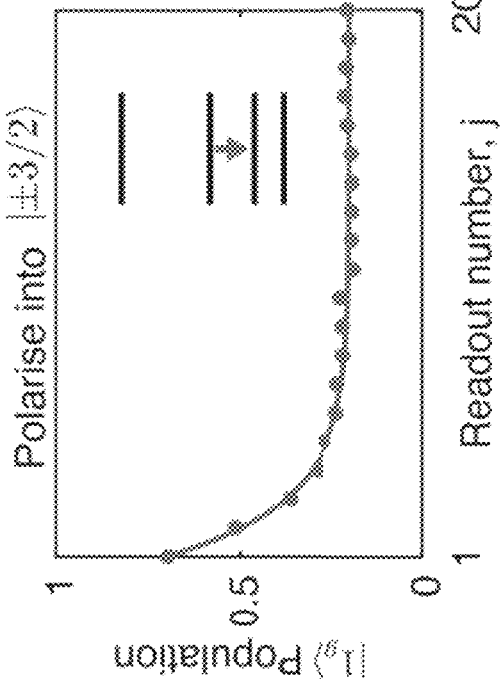
Fig. 9B c

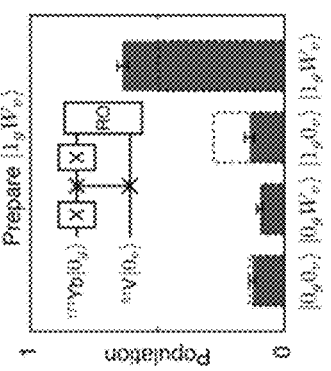
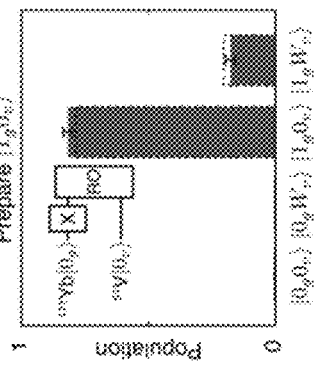
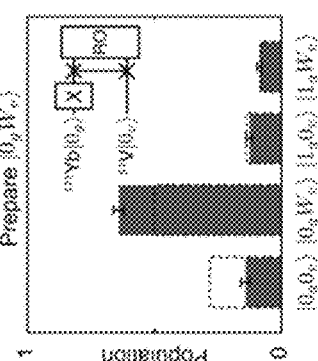
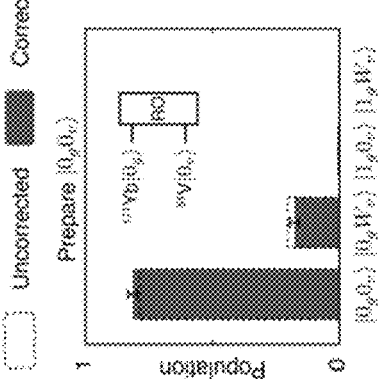
Fig. 13C

Ion 1 ——— Ion 2 ——— Ion 3 ·········

NUCLEAR SPIN WAVE QUANTUM REGISTER FOR SOLID STATE QUANTUM NETWORK NODES

CROSS REFERENCE TO RELATED APPLICATIONS

This application claims the benefit under 35 USC 119(e) of commonly assigned U.S. Provisional Patent Application Ser. No. 63/238,624 filed Aug. 30, 2021, by Andrei Ruskuc, Joonhee Choi, Chun-Ju Wu, and Andrei Faraon, entitled "NUCLEAR SPIN WAVE QUANTUM REGISTER FOR SOLID STATE QUANTUM NETWORK NODES," (CIT-8694-P), which application is incorporated by reference herein.

STATEMENT REGARDING FEDERALLY SPONSORED RESEARCH AND DEVELOPMENT

This invention was made with government support under Grant No(s). PHY1820790 & PHY1733907 awarded by the National Science Foundation, under Grant No(s). FA9550-18-1-0374 & FA9550-21-1-0055 awarded by the Air Force and under Grant No. N00014-19-1-2182 awarded by the Office of Naval Research. The government has certain rights in the invention.

BACKGROUND OF THE INVENTION

1. Field of the Invention

The present disclosure relates to compositions of matter useful as nuclear spin wave quantum registers and systems for implementing the same.

2. Description of Related Art

Solid-state nuclear spins surrounding individual, optically addressable qubits [1,2] provide a crucial resource for quantum networks [3-6], computation [7-11] and simulation [12]. While hosts with sparse nuclear spin baths are typically chosen to mitigate qubit decoherence [13], developing coherent quantum systems in nuclear spin rich hosts enables exploration of a much broader range of materials for quantum information applications. The collective modes of these dense nuclear spin ensembles provide a natural basis for quantum storage [14]. However, utilizing them as a resource for storing quantum bits has thus far remained elusive. The present disclosure satisfies this need.

SUMMARY OF THE INVENTION

The present disclosure reports on a novel system for transferring quantum information using a qubit with zero magnetic dipole moment and indistinguishable register spins (e.g., nuclear) having an energy level structure which can be implemented in a variety of materials. The system further includes a novel protocol for controlling spin preserving interaction between the qubit and the register spins (surprisingly, despite the lack of magnetic dipole moment and the presence of noise in the system). Working embodiments described herein demonstrate the protocol can decouple the qubit from noise causing decoherence and uncontrolled/random interactions between the qubit and register, so that the spin preserving interaction can be configured to perform a variety of operations including:

Polarizing the register spins into a polarized state;

Generating a swap gate that transfers information between qubit and register, and store the quantum information in the qubit in a spin wave form described by basis states including the polarized state and a superposition state of the register spins; and Generating a square root of swap gate used to prepare and measure Bell states.

Devices and methods according to embodiments described herein include, but are not limited to, the following.

1. A device for coupling a qubit to a register, comprising:

a circuit for controlling application of one or more cycles of a protocol, the protocol comprising a sequence of pulses synchronized with an RF field, a timing, a phase, and a duration of each of the pulses, and a period and amplitude of the radio frequency (RF) field, wherein:

application of the protocol controls a coherent spin exchange interaction between a register and a qubit having a zero magnetic dipole moment;

the qubit comprises a first spin state and a second spin state both of which have a zero magnetic dipole moment;

the register comprises multiple register spins having an energy level structure, the register spins are indistinguishable so as to be configurable in basis states including a superposition state used for storing the quantum state of the qubit, and the pulses each comprise an electromagnetic field tuned to excite a transition between the first spin state and the second spin state.

2. The device of example 1, wherein the protocol is configured to:

suppress or cancel one or more non-exchange interactions between the register and the qubit, suppress or cancel noise coupled to the qubit and causing decoherence of a quantum state of the qubit, enable the coherent spin exchange interaction that performs a quantum logic gate, coherently transferring a quantum state of the qubit between the register and qubit.

3. The device of example 1 or 2, wherein the circuit controls:

application of the period of the protocol within a time period shorter than a rate of change of a magnetic noise (e.g., Overhauser field), so that the magnetic noise is quasistatic during the application of the period of the protocol, the magnetic noise causing qubit decoherence and inducing a second order interaction (incoherent interaction) between the qubit and the register; and at least one of the phase, the duration, or a time spacing of the pulses in the period so that:

one or more spin exchange interactions induced by the RF field are preserved or maintained across the period;

one or more non-exchange interactions induced by the RF field are cancelled across the period (e.g., components of the non exchange interactions induced at different time instances in the period cancel each other, or average to zero, over the period);

one or more (or any) exchange and one or more (or any) non-exchange interactions induced by the magnetic noise are cancelled across the period (e.g., components of these interactions induced at different time instances in the period cancel each other, or average to zero, over the period); and the qubit decoherence induced by the magnetic noise is cancelled over the period (e.g., decoherence induced at different time instances in the period cancel each other, or average to zero, over the period); and the RF field toggling between two values of equal magnitude and opposite polarity such that:

the period is associated with a frequency of a precession of each of the multiple register spins about a predetermined quantization axis; and the amplitude is selected for a predetermined magnitude of the coherent spin exchange interaction between the register spins and qubit; and so as to form a predictable and coherent spin exchange interaction.

4. The device of any of the examples 1-3, wherein each of the single qubit gates comprises one of the pulses having the frequency and duration tuned to drive a transition between the first spin state and the second spin state.

5. The device of any of the examples claim 1-4 comprising a quantum memory, wherein the circuit:

controls application of a number of cycles the protocol in combination with an initialization of the qubit so as to configure the register spins in a polarized state;

controls application of one or more of the pulses to set a quantum state of the qubit; and controls application of a number of cycles of the protocol so as to apply a first swap gate (two qubit gate) transferring the quantum state of the qubit from the qubit to the register, thereby changing the polarized state to a corresponding state of the register spins corresponding to the quantum state; and controls application of a number of cycles of the protocol so as to apply a second swap gate retrieving the quantum state in the qubit from the register, thereby changing the corresponding state of the register spins to the polarized state.

6. The device of any of the examples 1-5, wherein configuring the register spins in the polarized state comprises polarizing the register, which is initially in an unpolarized state comprising any configuration of excitations of the register spins, by:

(a) initializing the qubit in the first spin state by controlling application of one or more initialization pulses of an initialization electromagnetic field having a frequency tuned to initialize the quantum state of the qubit in the first spin state;

(b) applying the protocol transferring a spin excitation from the register spins to the qubit; and (c) repeating steps (a) and (b) until all excitations of the register spins are transferred from the register to the qubit and the register spins are initialized in the polarized state, as characterized by a measurement of the qubit remaining in the first spin state after step (b).

7. The device of example 5 or 6, wherein the circuit controls application of the protocol so as to apply the first swap gate mapping (via the coherent spin exchange interaction) between the qubit and the register, such that:

if the qubit is in the first spin state, the corresponding state of the register is the polarized state, if the qubit is in the second spin state, the corresponding state of the register is a W state, and if the qubit is in a superposition of the first spin state and the second spin state, the corresponding state of the register is a superposition of the polarized state and the W state, and wherein the W state is a superposition of all single spin excitation states of the register spins.

8. The device of any of the examples 1-7, wherein the circuit:

controls application of the protocol in combination with an initialization of the qubit so as to configure the register spins in a polarized state;

controls application of one or more of the pulses to set a quantum state of the qubit;

controls application of the protocol so as to apply a first square root of swap gate entangling the qubit with the register so as to form a Bell state; and controls application of the protocol so as to apply a second square root of swap gate interacting with the Bell state so as to perform a measurement of the Bell state.

9. A repeater in a quantum network comprising the device of example 8.

10. A system for coupling the qubit to the register comprising the device of any of the examples 1-9, further comprising:

a photonic cavity coupled to a solid state material comprising the qubit and the register;

one or more microwave sources coupled to the qubit via a microwave waveguide, the microwave sources outputting one or more first microwave pulses and/or one or more second microwave pulses;

a radio frequency source outputting the RF field; and one or more laser sources outputting one or more laser pulses coupled to the qubit through the photonic cavity; and wherein:

the circuit controls the one or more laser sources and the one or more microwave sources so as to:

output initialization pulses comprising at least one of the one or more laser pulses or the one or more first microwave pulses having initialization frequencies for exciting one or more transitions initializing the qubit;

apply the protocol comprising the single qubit gates comprising the second microwave pulses in synchronization with the RF field; and output one or more readout electromagnetic fields having a readout frequency for exciting a readout transition from the second spin state to a readout state, so as to stimulate output of third pulses from the readout state.

11. The device of any of the examples 1-10, wherein:

the pulses each comprise a pi pulse or a pi/2 pulse having at least one phase selected from +x. −x., +y, or −y, and the circuit controls:

the sequence such that the period of the RF field is $2\tau$ and a spacing of the pulses is $\tau/4$, and for a given magnitude of the spin exchange interaction determined by the amplitude of the RF field, a number of repeats of the protocol that applies at least one of a swap gate transferring a quantum state between the qubit and the register, a square root of a swap gate for forming or measuring a Bell state, or that can be used to polarize the spins into a polarized state in combination with an initialization of the qubit.

12. The device of any of the examples 1-11 wherein the circuit selects the duration and the timing of each of the pulses and a toggling of the RF field to engineer the coherent spin-exchange interaction comprising:

$$\tilde{S}_{+}\hat{I}_{-}+\tilde{S}_{-}\hat{I}_{+},$$

where $\hat{I}_{+}=|\uparrow\rangle\langle\downarrow|$, $\hat{I}_{-}=|\downarrow\rangle\langle\uparrow|$ are the raising and lowering operators in an effective nuclear two-level manifold of the multiple spins in the register and $\tilde{S}_{+}$ are similarly defined for the qubit.

13. The device of any of the examples 1-12, wherein the RF field comprises a square wave and the sequence of pulses comprise:

in a first half period τ of the square wave a sequence of the second pulses comprising:

a first pi/2 pulse having a phase +Y followed by a first pi pulse having a phase +Y, the beginning of the first pi/2 pulse and the center of the first pi pulse separated in time by τ/4;

a second pi/2 pulse immediately followed by a third pi/2 pulse, the end of the second pi/2 pulse separated in time from the center of the first pi pulse by τ/4, wherein the second pi/2 pulse has a phase −Y and the third pi/2 pulse has a phase −X;

a second pi pulse having a phase −X and following the third pi/2 pulse, a center of the second pi pulse separated in time from the center of the first pi pulse by τ/2; and a fourth pi/2 pulse having a phase −X, wherein the end of the fourth pi/2 pulse is separated in time from center of the second pi pulse by τ/4; and in a second half period τ of the square wave, a repeat of the sequence of second pulses but wherein the first pi/2 pulse, the first pi pulse, and the second pi/2 pulse have opposite phase as compared to the first pi/2 pulse, the first pi pulse, and the second pi/2 pulse in the first half period, respectively.

14. The device of any of the examples 1-13, wherein the protocol de-couples the qubit from decoherence noise and random interactions caused by a nuclear Overhauser field generated by a host lattice in which the qubit is located.

15. A system for implementing a quantum register comprising the device of any of the examples 1-14 coupled to:

a spin carrying defect in a host lattice, wherein the spin carrying defect comprises the qubit and the host lattice comprises the register, or a quantum dot in a host lattice, wherein the quantum dot comprises the qubit and the host lattice comprises the register.

16. The system of example 15, wherein the spin carrying defect is a qubit ion comprising the qubit and the register comprises a lattice of register ions surrounding the qubit ion.

17. The device of any of the examples 1-16, wherein the multiple spins in the register comprise nuclear spins and the first spin state and the second spin state comprise hyperfine electron spin states.

18. A method for coupling a qubit to a quantum register, comprising:

controlling application of a protocol comprising a sequence of pulses synchronized with an RF field, the protocol further comprising a timing, a phase, and a duration of each of the pulses comprising a single qubit gate, a period and amplitude of the RF field, and a number of repeats of the sequence, wherein:

application of the protocol controls a coherent spin exchange interaction between a register and a qubit having a zero magnetic dipole moment;

the qubit comprises a first spin state and a second spin state having the zero magnetic dipole moment;

the register comprises multiple register spins having an energy level structure, the register spins are indistinguishable so as to be configurable in basis states including a superposition state used for storing the quantum state of the qubit, and the pulses comprise an electromagnetic field tuned to excite a transition between the first spin state and the second spin state.

19. The method of claim 18, wherein the controlling further comprises:

applying the protocol in combination with an initialization of the qubit so as to configure the register spins in a polarized state;

applying of one or more of the pulses to set a quantum state of the qubit;

controlling application of the protocol so as to apply a first swap gate (two qubit gate) transferring the quantum state of the qubit from the qubit to the register, thereby changing the polarized state to a corresponding state of the register spins corresponding to the quantum state; and controlling application of the protocol so as to apply a second swap gate retrieving the quantum state in the qubit from the register, thereby changing the corresponding state of the register spins to the polarized state.

20. The method of claim 18, wherein the controlling further comprises:

controlling application of the protocol in combination with an initialization of the qubit so as to configure the register spins in a polarized state;

controls output of one or more of the pulses to set a quantum state of the qubit;

controls application of the protocol so as to apply a first square root of swap gate entangling the qubit with the register so as to form a Bell state; and controls application of the protocol so as to apply a second square root of swap gate interacting with the Bell state so as to perform a measurement of the Bell state.

21. A device for controlling a coherent spin exchange interaction between a register and a qubit having a zero magnetic dipole moment, wherein the qubit comprises a first spin state and a second spin state having the zero magnetic dipole moment; and the register comprises multiple indistinguishable spins.

BRIEF DESCRIPTION OF THE DRAWINGS

Referring now to the drawings in which like reference numbers represent corresponding parts throughout:

FIG. 1A, Optically addressable $^{171}$Yb ion (yellow) surrounded by a local ensemble of nuclear spins from lattice $^{51}$V ions. The register (blue) consists of four $^{51}$V spins equidistantly spaced by 3.9 Å from the central $^{171}$Yb. The nuclear spin bath (grey) creates random magnetic noise termed the nuclear Overhauser field. A nanophotonic cavity enables optical initialisation and readout of the $^{171}$Yb ion via single-photon detection at 984 nm [15]. 675 MHz microwave pulses provide high-fidelity control of the $^{171}$Yb spin state. FIG. 1B, Energy level structure of $^{171}$Yb and $^{51}$V ions. Pulse-based control of the $^{171}$Yb ground-state transition ($|0_g\rangle \leftrightarrow |1_g\rangle$) enables engineered spin-exchange interactions with neighbouring $^{51}$V ions. The energy level structure of the spin-7/2 $^{51}$V consists of four quadratically-spaced, doubly degenerate energy levels, $\{|\pm m_1\rangle\} = \{|\pm\frac{1}{2}\rangle, |\pm 3/2\rangle, |\pm 5/2\rangle, |\pm 7/2\rangle\}$, resulting in three distinct transitions, $\omega_{a,b,c}/2\pi = 330$ kHz, 660 kHz, and 991 kHz, respectively. The $\omega_c$ transition (dotted box) is used to implement the local nuclear spin register for quantum information storage. FIG. 1 C, Effective qubit states of the nuclear spin register. The $|0_v\rangle$ and $|W_v\rangle$ states consist of all four $^{51}$V ions prepared in the $|\downarrow\rangle=|\pm7/2\rangle$ state and a single spin excitation equally delocalised in the $|\uparrow\rangle=|\pm5/2\rangle$ state, respectively. FIG. 1D, Initialisation of the nuclear spins from a thermal state into the polarised $|\downarrow\downarrow\downarrow\downarrow\rangle$ state. e, Transfer of a quantum state from $^{171}$Yb to the $^{51}$V register, storage and subsequent retrieval. Both the state initialization and transfer are enabled by robust, dynamically engineered interactions between $^{171}$Yb and $^{51}$V ions.

FIG. 2A, Engineered spin-exchange interactions via our ZenPol sequence. Equidistant $\pi/2$ and $\pi$ pulses combined with a square-wave RF pulse, with magnetic field amplitude $B^{RF}$, are periodically applied to the $^{171}$Yb qubit with base sequence period $2\tau$. FIG. 2B, ZenPol sequence spectroscopy. $^{171}$Yb $^{51}$V resonance is achieved for a given $^{51}$V transition ($\omega_j$) when $1/\tau=\omega_j/\pi k$ with integer k. The isolated, RF-induced $\omega_c$ (k=5) and $\omega_p$ (k=3) transitions are used to polarize the multi-level nuclear spins of neighbouring $^{51}$V ions (dashed boxes). Both cases exhibit split-resonance features, attributed to the presence of two distinct $^{51}$V ensembles: the four $^{51}$V register spins (starred transitions) adjacent to the $^{171}$Yb qubit experience a frozen-core type detuning relative to the more distant bath. Insets: Under repeated application of the ZenPol sequence targeted at the $\omega_b$ or $\omega_c$ register transitions and interleaved with $^{171}$Yb initialisation, the four register spins are selectively polarised (purple lines). FIG. 2C, Spin-exchange dynamics with the four $^{51}$V register spins. The $^{171}$Yb qubit and $^{51}$V register spins are initialized into $|1_g\rangle$ and $|0_v\rangle(\equiv|\downarrow\downarrow\downarrow\downarrow\rangle)$, respectively. Subsequently, our pulse sequence induces resonant spin exchange on the $\omega_c$ transition leading to oscillation between $|1_g\rangle|0_v\rangle\leftrightarrow|0_g\rangle|W_v\rangle$ where $|W_v\rangle$ is a spin-wave like W-state (red markers). Inset: the rate of spin exchange scales linearly with $B^{RF}$. With $^{171}$Yb in $|0_g\rangle$, there are no spin excitations in the system and oscillations are suppressed (blue markers). A ZenPol sequence with M=10 periods and duration $t_M$=50 μs is used to realise a swap gate (black arrow). d, Spin-exchange dynamics with a single $^{51}$V nuclear spin. Three $^{51}$V spins are shelved in $|\pm3/2\rangle$ and a single spin is excited to $|\uparrow\rangle=|\pm5/2\rangle$. Accordingly, the $^{171}$Yb qubit undergoes spin exchange with the $\omega_c$ transition manifold at a reduced oscillation frequency. In FIGS. 2C, 2D, solid lines are from simulations with phenomenological exponential decay constants.

FIGS. 3A-3C. Quantum information storage in the entangled nuclear spin register. FIG. 3A, Ramsey coherence time measurement. The $^{171}$Yb qubit is prepared in a superposition state which is subsequently swapped onto the $^{51}$V register. After waiting for a period of time, t, the superposition state is swapped back to the $^{171}$Yb qubit and measured in the x basis. Fast oscillations are observed at the $^{51}$V$\omega_c$/ $2\pi$=991 kHz frequency (inset) and the coherence is derived from the oscillation contrast. The resulting 1/e coherence decay time is measured to be 58±4 μs. Note that the wait time excludes the swap gate duration. FIG. 3B, Coherence time extension via motional narrowing of the $^{171}$Yb Knight field. By applying x-axis $\pi$ pulses spaced by $2t_w$=6 μs to the $^{171}$Yb qubit, the coherence time of the $^{51}$V register is extended to 225±9 μs.c. FIG. 3C. Further coherence enhancement via dynamical decoupling of the $^{51}$V register. In addition to the $\pi$ pulses acting on $^{171}$Yb, two $\pi$ pulses are applied to the $^{51}$V register with a variable inter-pulse delay time, $2t_D$. This rephases contributions to the detuning from the nuclear Overhauser field and leads to an extended memory time of 760±14 μs. Note that even numbers of $^{51}$V$\pi$ pulses are necessary to return the register to the $\{|0_v\rangle, |W_v\rangle\}$ manifold prior to state retrieval. In FIGS. 3A-3C, solid lines are fits to Gaussian decay.

FIG. 4A, Parity oscillations between $|\Psi^+\rangle$ and $|\Psi^-\rangle$ (where $|\Psi^\pm\rangle=1\sqrt{2}(|1_g\rangle|0_v\rangle \mp i|0_g\rangle|W_v\rangle)$) revealing the Bell state coherence time. To prepare the $|\Psi^+\rangle$ Bell state, a $\sqrt{\text{swap}}$ gate is applied to $|1_g\rangle|0_v\rangle$; subsequently during a wait time of duration t coherent parity oscillations occur between $|\Psi^+\rangle$ and $|\Psi^-\rangle$ at the $^{51}$V$\omega_c$ transition frequency. A second $\sqrt{\text{swap}}$ gate maps the resulting parity to $^{171}$Yb population. The oscillation contrast (and hence Bell state coherence) decays with a 1/e timescale of $T_{2, Bell}$*=8.5±0.5 μs, consistent with the $^{171}$Yb$T_2$* time. FIG. 4B, Bell state coherence extension. During the parity oscillation, an XY-8 [38] decoupling sequence is applied to the $^{171}$Yb qubit. This leads to a significantly extended Bell state coherence time of $T_{2, Bell}$*=239±6 μs, limited by the $^{51}$V $T_2$* time measured in FIG. 3b. FIG. 4C, Reconstructed Bell state density matrix. Diagonal entries representing populations are extracted through a sequential tomography protocol [39] (Methods). Off-diagonal matrix elements representing coherences are obtained from the parity oscillation contrast. Note that all density matrix values have been corrected to account for readout error, yielding a fidelity of 0.76±0.01. See Methods for details of the correction procedure.

FIG. 5A, Energy level structure of $^{171}$Yb$^{3+}$:YVO$_4{}^2$F$_{7/2}$(0) and $^2$F$_{5/2}$(0). Initialisation into $|0_g\rangle$ involves repeated pulses on the F transition combined with consecutive pairs of $\pi$ pulses applied to the A and $f_e$ transitions leading to excitation into $|1_e\rangle$. Subsequently, decay via E leads to initialisation into $|0_g\rangle$. Optical readout relies on repeated optical $\pi$ pulses on the A transition, each followed by a photon detection window during which cavity-enhanced emission via A is measured. FIG. 5B, Experimental setup. Optical control of the A and F transitions is realised via two frequency-stabilised lasers, each modulated using acousto-optic modulator (AOM) shutters. Microwave control is divided into two paths: a low frequency path consisting of 675 MHz ground state control ($f_g$ transition) and RF, both generated using a single arbitrary waveform generator (AWG) channel and a high frequency path consisting of 3.4 GHz excited state microwave control ($e_e$ transition). Each path is independently amplified and combined using a diplexer. The device chip and a superconducting nanowire single photon detector (SNSPD) are cooled to ≈500 mK in a cryostat. FIG. 5C, Detailed pulse sequence used for quantum state storage and retrieval. First, the $^{51}$V register and $^{171}$Yb qubit are initialised into $|0_v\rangle$ and $|0_g\rangle$, respectively, as described in the main text. Subsequently, the $^{171}$Yb is prepared in a superposition state, via a π/2 pulse, which is swapped onto the $^{51}$V register using a ZenPol sequence resonant with the 991 kHz$\omega_c$ $^{51}$V transition. After a wait time, t, the state is swapped back to $^{171}$Yb and measured in the x basis via π/2 pulse followed by optical readout.

FIG. 6A, The average fidelity of single qubit gates applied to the $^{171}$Yb$|0_g\big\langle\leftrightarrow|1_g\big\langle$ transition is applied by application of a series of $M_{gate}$ randomly sampled Clifford gates followed by the inverse operation (top inset). When averaged over a sufficiently large number of samples (in our case 100) it is possible to extract an average gate fidelity from the 1/e exponential decay constant, leading to f=0.99975±0.00004. FIG. 6B, We also measure the coherence time of the qubit transition using an XY-8 dynamical decoupling pulse sequence (top inset) with a fixed inter −π pulse separation of 5.6 μs and variable number of repetitions, M'. This leads to an exponential decay with 1/e time constant T$_2$=16±2 ms FIGS. 7A-7C. Hartmann Hahn spectroscopy.

separated by energy splitting equal to the Rabi frequency, Ω. An initial −x-phase π/2 pulse prepares the $^{171}$Yb qubit in the |−> dressed state. When the Rabi frequency of the HH pulse is tuned to equal one of the $^{51}$V transition frequencies, the $^{171}$Yb is transferred into the |+> dressed state as a result of resonant population exchange (green arrows). The |+> state population is mapped to $|1_g\big\langle$ with a final x-phase π/2 pulse for readout.

FIG. 8A, ZenPol sequence with the toggling-frame transformation of the spin½$\tilde{\tilde{S}}_z$ operator for the $^{171}$Yb qubit. The ZenPol sequence consists of a series of π and π/2 pulses about the x- and y-axes combined with a synchronously applied, square-wave RF signal with period 2τ. The Overhauser- and RF-induced interactions are determined by the toggling-frame transformations of $\tilde{S}_z$ which are given by $$\hat{S}_x f_x^{(OH)} + \tilde{\tilde{S}}_y f_y^{(OH)} \text{ and } \hat{S}_x f_x^{(RF)} + \hat{S}_y f_y^{(RF)},$$

respectively (see yellow and purple lines for $f_{x,y}^{(OH)}$ and $f_{x,y}^{(RF)}$, respectively). At the resonance condition ½τ=ω$_j$/2πk for odd integer k with $^{51}$V spin precession frequency ω$_j$, the sequence realises noise-robust spin-exchange interaction with a timeaveraged Hamiltonian that only depends on the RF magnetic field amplitude. FIG. 8B, ZenPol sequence filter functions corresponding to the Fourier transforms of $f_x^{(OH)}$ (yellow) and $f_x^{RF}$ (purple). For a sequence with fixed τ, the peak positions determine the resonant frequencies at which $^{171}$Yb–$^{51}$V interactions can occur. Note that the incoherent Overhauser-induced interactions occur at even-k resonances and are spectrally separated from the coherent RF-induced interactions occurring at odd-k resonances.

FIGS. 9A-9C. Polarisation of multi-level nuclear register spins. FIG. 9A, Polarisation readout by polarisation inversion (PROPI) experiments for the $^{51}$V register ω$_c$ transition. The PROPI sequence performs a repeated swap operation based on the ZenPol sequence, periodically interleaved with $^{171}$Yb qubit readout and re-initialisation into $|1_g\big\langle$. A total of 20 polarising cycles are applied to the ω$_c$ transition to polarise the $^{51}$V register into |±5/2>. As a result of register polarisation, the $^{171}$Yb population in $|1_g\big\langle$ increases over time, indicating the accumulation of the $^{51}$V population in |±5/2> (left panel). We observe that the register polarisation saturates after approximately 10 cycles. Subsequently, we perform repolarisation cycles where $^{171}$Yb is initialised into $|0_g\big\langle$ and $^{51}$V register spins are transferred to |±7/2> with similar saturation timescale (right panel). FIG. 9B, PROPI experiments for the $^{51}$V register ω$_b$ transition. Applying a ZenPol sequence resonant with the ω$_b$ transition, interleaved with $^{171}$Yb initialisation into $|1_g\big\langle(|0_g\big\langle)$, results in $^{51}$V register polarisation into |±5/2>(|±3/2>), as indicated by an increase (decrease) in $^{171}$Yb$|1_g\big\langle$ population. FIG. 9C, Experimental results of ZenPol spin-exchange dynamics with varying degree of $^{51}$V register polarisation. As the number of polarisation cycles used to prepare the |0$_v$>=|±7/2>$^{\otimes4}$ state increases, the subsequent spin-exchange oscillations become more pronounced. Note that these polarisation cycles are interleaved between the ω$_b$ and ω$_c$ transitions.

FIG. 10A, ZenPol sequence schematic. The square-wave RF magnetic field amplitude B$^{RF}$ determines the $^{171}$Yb$^{51}$V interaction strength, the pulse spacing τ/4 varies the sequence detuning from a specific $^{51}$V nuclear spin transition, and the number of ZenPol periods, M, determines the total interaction time. FIG. 10B, Simulated spin-exchange dynamics near the ω$_c$ transition at k=5, probed as a function of sequence resonance frequency ω and the number of ZenPol periods, M. FIG. 10C, Measured spin-exchange dynamics showing good agreement with the numerical simulation in FIG. 10B. FIG. 10D, Experimental demonstration of tunable spin-exchange rate by varying the square-wave RF amplitude, B$^{RF}$. When increasing B$^{RF}$ from 0.8G to 2.0G, we observe a corresponding linear increase in the spin-exchange rate. In all cases, numerical simulations (solid lines) taking into account incomplete register polarisation, control pulse imperfections and an exponential phenomenological decay show reasonable agreement with the experimental data (markers). A simulation result without this phenomenological decay (dashed line) displays a discrepancy, which needs further investigation. See Supplementary Information for simulation details.

FIG. 11A, Details of $^{51}$V nuclear spin driving scheme. To directly drive the $^{51}$V nuclear spin $\omega_c$ transition, a sinusoidal z-directed RF magnetic field, $B_z^{osc}$ $\sin(\omega_c t)$, is applied to the system at a frequency of $\omega_c/2\pi$=991 kHz after initialising the $^{171}$Yb and $^{51}$V register into $|0_g\rangle$ and $|0_v\rangle=|\downarrow\downarrow\downarrow\downarrow\rangle$, respectively (Drive Protocol 1). This induces an oscillating magnetic dipole moment on the $^{171}$Yb qubit which in turn generates an amplified transverse driving field at each $^{51}$V (Methods). Consequently, the four $^{51}$V register spins undergo independent Rabi oscillation between the $|1\rangle=|\pm5/2\rangle$ and $|\downarrow\rangle=|\pm7/2\rangle$ states. To probe the nuclear spin Rabi oscillation, the $|1\rangle$ population is measured by preparing the $^{171}$Yb in $|1_g\rangle$ via an x-phase $\pi$ pulse, performing a single swap gate and reading out the $^{171}$Yb population. FIG. 11B, Decoupling of magnetic field noise originating from the $^{171}$Yb Knight field. To improve the nuclear spin control fidelity, a train of equidistant $\pi$ pulses are applied to the $^{171}$Yb during the driving period, thereby cancelling dephasing due to the $^{171}$Yb Knight field (Drive Protocol 2). Each $\pi$ pulse is accompanied by a $\pi$ phase shift of the sinusoidal field to ensure phase continuity of the nuclear Rabi driving and an even number of $\pi$ pulses ensures the $^{171}$Yb state is returned to $0_g\rangle$ at the end of the sequence (Methods). FIG. 11C, Measured $^{51}$V register Rabi oscillations using the aforementioned schemes. We observe coherent nuclear Rabi oscillations between the $|\downarrow\rangle$ and $|\uparrow\rangle$ states at a Rabi frequency of $2\pi\times(7.65\pm0.05)$ kHz. An exponential decay is observed with a 1/e time constant of $280\pm30\mu$ without decoupling (blue). The additional $\pi$ pulses applied to the $^{171}$Yb qubit lead to an enhancement in control fidelity, giving a 1/e Gaussian decay time of $1040\pm70$ μs (red). The black arrow at t≈69 μs indicates the $^{51}$V$\pi$ pulse used in FIG. 3$c$.

FIG. 12A, Measured relaxation timescales, $T_1^{(W)}$, of the entangled register state, $|W_v\rangle$, under various conditions. Top: the $^{51}$V register is prepared in the $|W_v\rangle$ state by swapping a single spin excitation from the $^{171}$Yb initialised into $|1_g\rangle$. After a variable wait time, t, the $^{51}$V state is swapped back onto $^{171}$Yb and measured (top inset). The resulting Gaussian decay shows a 1/e relaxation time of $T_1^{(W)}$=39.5±1.3 μs (blue trace), limited by dephasing of the entangled $|W_v\rangle$ state. Middle: the $T_1^{(W)}$ lifetime can be extended by applying a series of equidistant $\pi$ pulses to the $^{171}$Yb separated by $2t_w$=6 μs (middle inset). This decouples the $|W_v\rangle$ state from dephasing induced by the $^{171}$Yb Knight field, equivalent to the coherence time extension in FIG. 12B, leading to an extended 1/e lifetime of $T_1^{(W)}$=127±'S (red trace). Bottom: further extension of the $T_1^{(W)}$ lifetime is achieved by dynamical decoupling whereby additionally two $^{51}$V $\pi$ pulses are applied during the wait time with a variable pulse separation $2t_D$ (bottom inset). This gives rise to a significantly prolonged lifetime of $T_1^{(W)}$=640±20 μs (yellow trace), equivalent to the coherence time extension in FIG. 3$c$. b, Measured relaxation timescale, $T_1^{(0)}$, of the polarized register state $|0_v\rangle$. The register is initialised in $|0_v\rangle$ and after a variable wait time, t, the $^{51}$V state is swapped onto $^{171}$Yb and measured (inset). We observe an exponential decay with a 1/e relaxation time of $T_1^{(0)}$=0.54±0.08 s, likely limited by spin exchange with the bath. See Supplementary Information for detailed discussion of $T_1$ relaxation mechanisms.

FIGS. 13A-13D. Population measurement histograms for register fidelity characterization. FIG. 13A, Sequential tomography protocol for characterising $^{171}$Yb–$^{51}$V populations in the basis spanned by $\{|0_g0_v\rangle, |0_gW_v\rangle, |1_g0_v\rangle, |1_gW_v\rangle\}$. Reconstructing the population probability distribution utilises Readout sequences 1 and 2, each including three consecutive $^{171}$Yb state readouts interleaved with single-qubit gate operations and a swap gate. FIG. 13B, Table summarizing the post-processing criteria for state attribution. Readout sequences 1 and 2 measure the $\{|0_g0_v\rangle, |0_gW_v\rangle\}$ and $\{|1_g0_v\rangle, |1_gW_v\rangle\}$ populations, respectively, conditioned on the three measurement outcomes. See Methods for full details of the post-processing procedure. FIG. 13C, Reconstructed population distributions for estimating state preparation fidelity. The four basis states, $\{|0_g0_v\rangle, |0_gW_v\rangle\}, \{|1_g0_v\rangle, |1_gW_v\rangle\}$, are independently prepared by applying a combination of $^{171}$Yb$\pi$ pulses and swap gates to the initial $|0_g0_v\rangle$ state (see the insets of each subplot). Subsequently, the sequential tomography protocol (RO) is applied iteratively, alternating between Readout 1 and 2 sequences to fully reconstruct the population probability distributions. FIG. 13D, Reconstructed population distribution for the $^{171}$Yb$^{51}$V Bell state (reproduced from FIG. 4$c$). The maximally entangled Bell state $|\Psi^+\rangle=1/\sqrt{2}(|1_g0_v\rangle-i|0_gW_v\rangle)$ is prepared by applying a $\sqrt{\text{swap}}$ gate to $|1_g0_v\rangle$ and measured using RO (inset). In c,d, the uncorrected and readout-corrected measurement results are presented as dashed and solid filled histograms, respectively. Populations are corrected by accounting for the swap gate error during the readout sequences (Methods).

FIG. 14B, Dynamically engineered spin-exchange dynamics between the $^{171}$Yb qubit and $^{51}$V register. Using constant ZenPol square-wave RF amplitude, $B^{RF}$, we obtain equal spin-exchange rates for all three ions. FIG. 14C, Characterisation of $^{51}$V register coherence times with decoupling from the $^{171}$Yb Knight field. The 1/e coherence times are measured to be 225±9 μs, 273±12 μs and 261±9 μs for Ions 1, 2 and 3, respectively. All of these results demonstrate that our platform provides a nearly identical nuclear spin register for every [171]Yb qubit in the system.

wherein interactions in green sections cancel interactions in red sections across a row.

Figures 18, 19, 20:
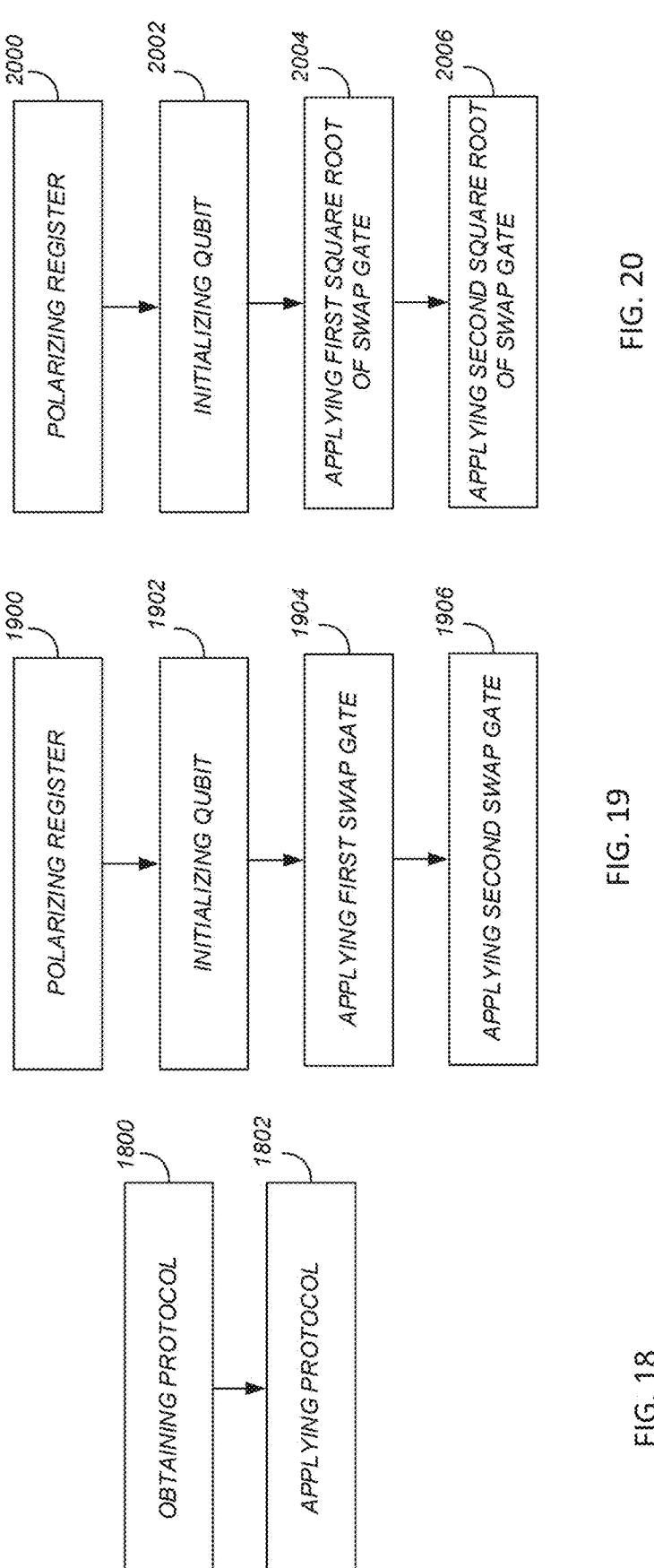

FIG. 18. Flowchart illustrating a method of performing operations using a protocol according to one or more embodiments.

FIG. 19. Flowchart illustrating a method of transferring quantum information using a protocol according to one or more embodiments.

FIG. 20. Flowchart illustrating a method of forming and measuring Bell states using a protocol according to one or more embodiments.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized, and structural changes may be made without departing from the scope of the present invention.

Technical Description

The present disclosure describes a system and method for implementing a protocol for coupling a qubit to a register. The protocol comprises a sequence of pulses synchronized with an RF field, the protocol further comprising a timing, a phase, and a duration of each of the pulses comprising a single qubit gate, a period and amplitude of the RF field, and a number of repeats of the sequence, wherein application of the protocol controls a coherent spin exchange interaction between a register and a qubit having a zero magnetic dipole moment. The qubit comprises a first spin state and a second spin state both of which have a zero magnetic dipole moment and the register comprises multiple register spins having an energy level structure. The register spins are indistinguishable so as to be configurable in basis states including a superposition state used for storing the quantum state of the qubit. The system further typically includes a source of the pulses comprising an electromagnetic field tuned to excite a transition between the first spin state and the second spin state.

The quantum memory can be implemented using nuclear spin-wave like states that can be implemented in a variety of (e.g., solid state) material systems. In typical examples, the quantum register is implemented using utilizing high spin, spectrally-indistinguishable, dense, lattice nuclear spins surrounding solid-state qubits. The control protocols induce coherent interaction between a central solid-state qubit and surrounding lattice ion nuclear spins. Specifically, the protocols are used to generate entangled states between the solid-state qubit and local nuclear ensemble and to implement a deterministic quantum register using the same ensemble. These features are vital ingredients for building large-scale multi-node quantum networks.

The following examples demonstrate an embodiment of the auxiliary nuclear-spin-based quantum register using single rare-earth ion qubits, although other material systems (including non-nuclear spin systems) may be used.

1. First Example: System Implemented in Yb:YVO

FIGS. 1A-1E illustrate a highly coherent, optically addressed [171]Yb$^{3+}$ qubit doped into a nuclear spin-rich yttrium orthovanadate crystal [15] combined with a robust quantum control protocol to manipulate the multi-level nuclear spin states of neighbouring [51]V$^{5+}$ lattice ions. Via a dynamically-engineered spin exchange interaction, this nuclear spin ensemble is polarized to generate collective spin excitations, and subsequently used to implement a long-lived quantum memory. Unlike conventional, disordered nuclear spin based quantum memories [16-24], the platform is deterministic and reproducible, ensuring identical quantum registers for all [171]Yb$^{3+}$ qubits. The approach provides a framework for utilising the complex structure of dense nuclear spin baths, paving the way for building large-scale quantum networks using single rare-earth ion qubits [15,25-28].

Figures 6A, 6B:
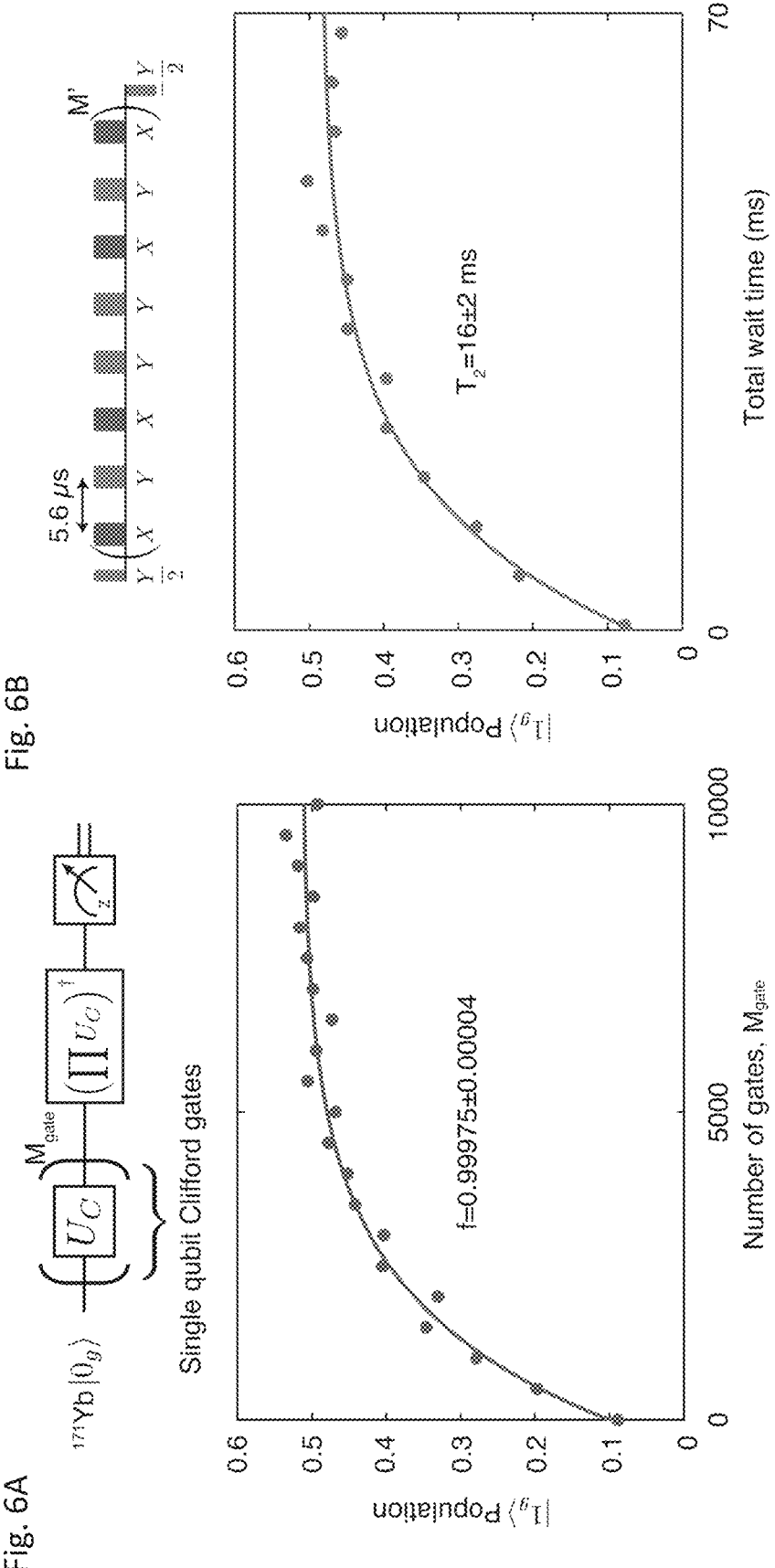
FIGS. 6A-6B. Randomised benchmarking and dynamical decoupling.

The hyperfine levels of single [171]Yb$^{3+}$ ions doped into yttrium orthovanadate (YVO$_4$), coupled to nanophotonic cavities, form high-quality optically addressable qubits [15]. The surrounding [51]V$^{5+}$ lattice ion nuclear spins generate a noisy magnetic field environment due to their large magnetic moment and high spin (I=7/2). Coherent [171]Yb qubit operation is enabled by magnetically-insensitive transitions, leading to long coherence times (16 ms) and high gate fidelities (0.99975) (FIG. 6). Whilst decoupling from sources of magnetic noise achieves an excellent operating regime for the [171]Yb qubit, the [51]V nuclear spins also provide a readily accessible, local resource for quantum information storage due to their inherently weak interactions with the environment. To date, most research regarding host nuclear spin utilisation has focused on several spectrally distinguishable impurity nuclear spins coupled to a localised electronic spin, e.g. [13]C coupled to colour centres in diamond or [29]Si coupled to defects in silicon carbide, rare-earth ions, quantum dots or donor qubits in silicon [10,16-24]. Recently, a regime consisting of a large number of indistinguishable nuclear spins coupled to the delocalised electronic spin in a quantum dot has also been explored [29,30]. In contrast, the system described herein addresses a new regime where a small, deterministic cluster of spectrally indistinguishable nuclear spins are coupled to a single localized electronic spin. Specifically, the [171]Yb electronic wavefunction is confined to the lattice site, and the YVO$_4$ crystal consists of highly isotopically pure, 99.8% [51]V, nuclear spins. This confined, dense nuclear spin ensemble could be used as a deterministic local quantum processor by creating and manipulating entangled states, such as collective spin wave-like excitations, for near-term quantum applications. Critically, interfacing with these nuclear spins whilst preserving high qubit coherence necessitates the development of novel quantum control protocols using magnetically insensitive transitions that are robust against environmental noise.

Figure 1A:
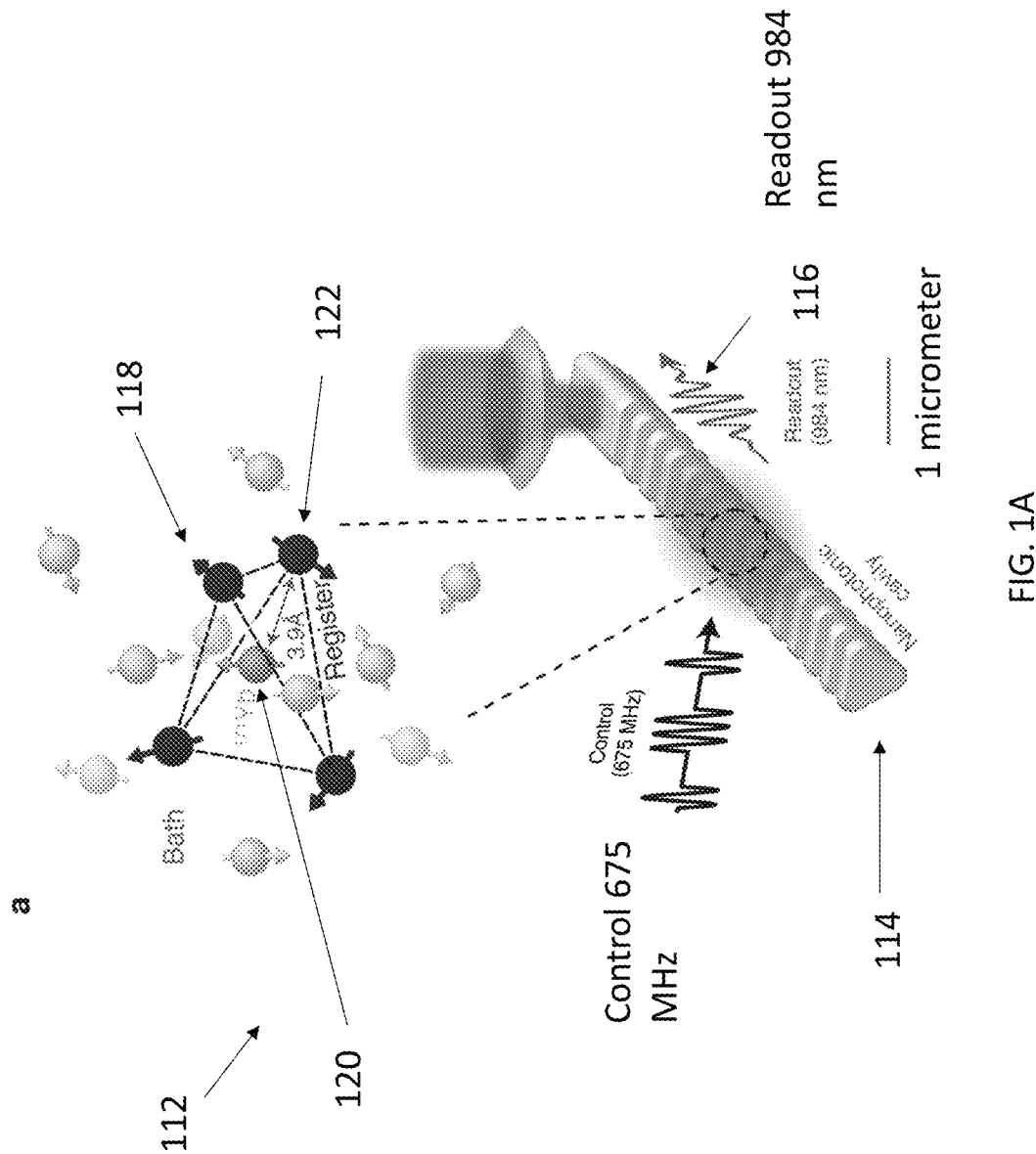
FIGS. 1A-1E. Schematic of a many-body nuclear spin register for optically-coupled $^{171}$Yb qubits in nanophotonic cavities.
Figure 1B:
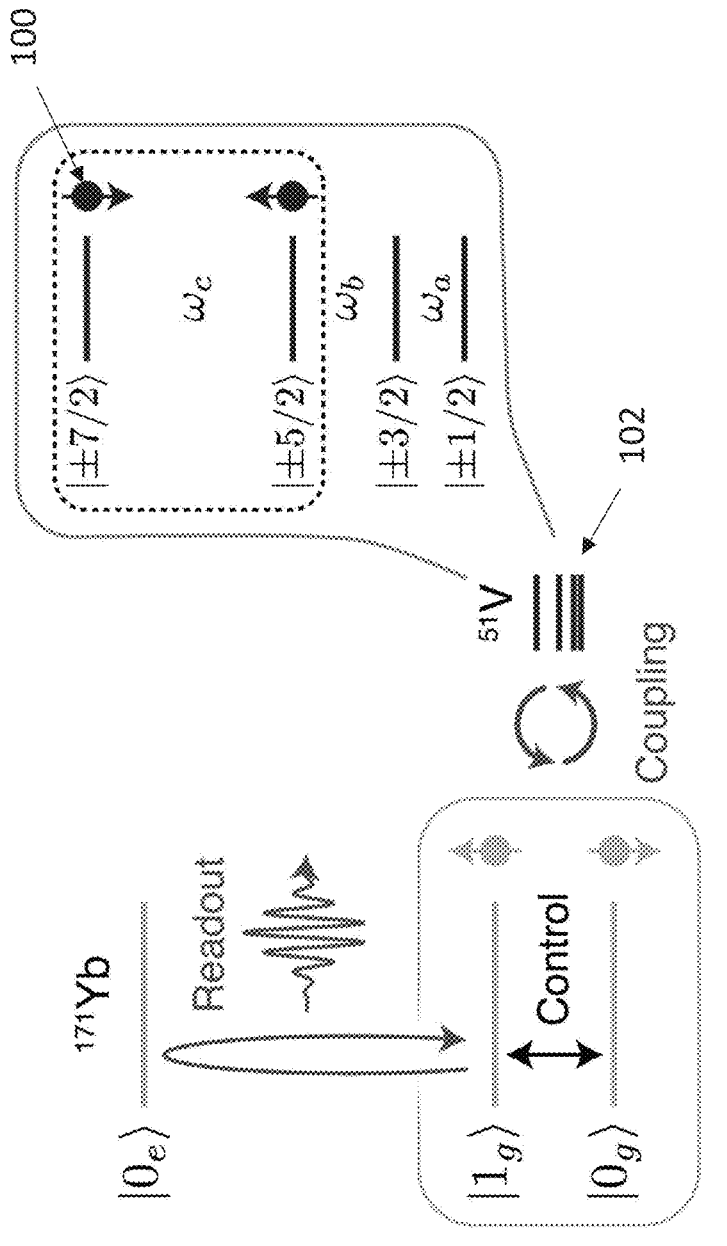
Figure 1D:
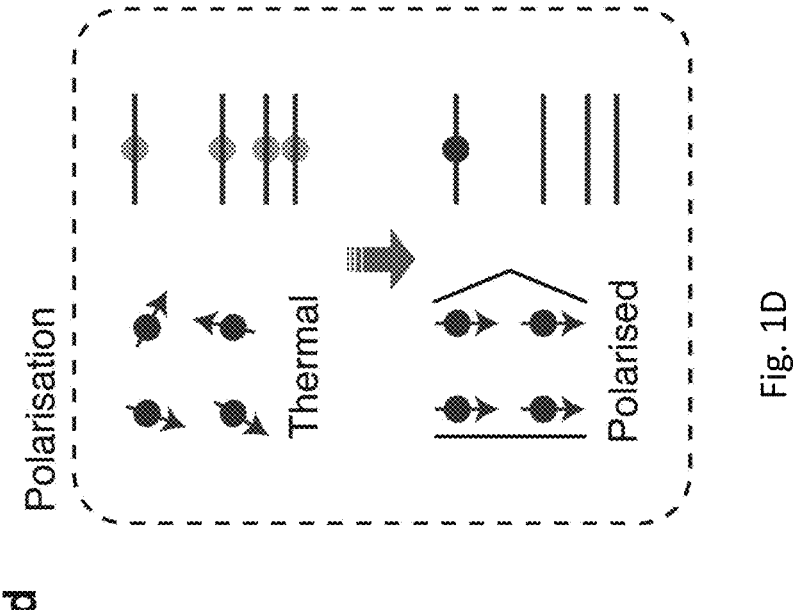

At zero-magnetic field the [171]Yb ground state contains a pair of levels $|0_g\rangle$ and $|1_g\rangle$, separated by 675 MHz, which form our qubit [31] (FIG. 1b). The $|1_g\rangle$ population is optically read out via a series of $\pi$ pulses at 984 nm, each followed by time-resolved detection of resonant photon emission (FIG. 5). This is enabled by coupling the [171]Yb ion to a nanophotonic cavity leading to high transition cyclicity, reduced optical lifetime and high photon collection efficiency [15]. The local crystalline environment consists of [89]Y, [51]V and $^{16}$O ions. Of these, [51]V with nuclear spin 7/2 has the largest magnetic dipole moment and zero-field structure due to a quadrupole interaction with the lattice electric field [32]. This leads to four quadratically-spaced, doubly degenerate energy levels, $\{|\pm m_I\rangle\}=\{|\pm\frac{1}{2}\rangle, |\pm3/2\rangle, |\pm5/2\rangle, |\pm7/2\rangle\}$, and three magnetic-dipole allowed transitions between these levels $\omega_a$, $\omega_b$, $\omega_c$ (FIG. 1b).

Local [51]V ions are categorised into two complementary ensembles: the register and the bath. The register spins fulfil two conditions: (1) they are constituents of the frozen core: a set of [51]V ions spectrally distinguished from the bath due to proximity to [171]Yb; (2) the [171]Yb[51]V interaction Hamiltonian can drive transitions between their quadrupole levels. As shown later, experimental evidence suggests that the register consists of four [51]V spins, equidistant from the central [171]Yb. At zero field, the [171]Yb $|0_g\rangle$, $|1_g\rangle$ states have no magnetic dipole moment and thus interactions with [51]V register spins are forbidden to first order. However, a weak [171]Yb dipole moment is induced by a random magnetic field originating from the bath (the nuclear Overhauser field, with z component $B_z^{OH}$), giving rise to an effective [171]Yb–[51]V register interaction. Specifically, a second-order pertur-bation analysis yields the following Hamiltonian:

$$\hat{H}_{int} = \tilde{\hat{S}}_z B_z^{OH} \sum_{i\in register} \left( a_x \hat{I}_x^{(i)} + a_z \hat{I}_z^{(i)} \right),$$

where $\tilde{\hat{S}}_z$ is the [171]Yb qubit operator along the z axis in a weakly perturbed basis, $\hat{I}_{x,z}^{(i)}$ are the nuclear spin-7/2 operators along the x,z axes, and $a_{x,z}$ are the coupling coefficients (Supplementary Information). Note that $B_z^{OH}$ varies randomly in time as the bath changes state in a stochastic fashion, rendering this interaction Hamiltonian unreliable for register quantum state manipulation and requiring an alternative approach. To this end, we develop a protocol to generate a deterministic [171]Yb–[51]V interaction via Hamiltonian engineering, which will be elaborated later.

Figure 1C:
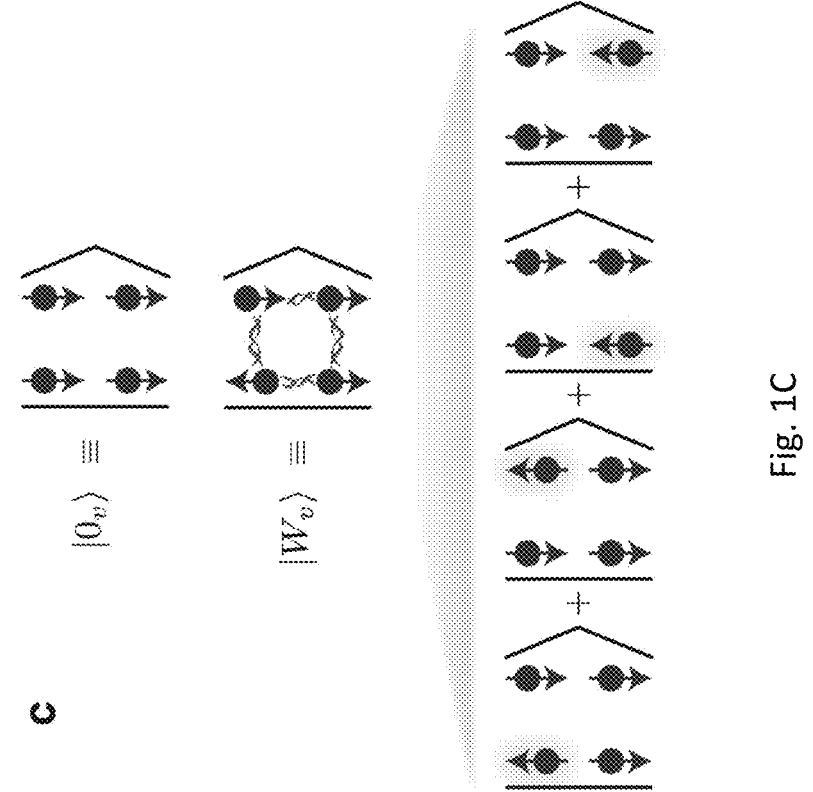

An additional challenge is presented by the spectral indistinguishability of the register spins, necessitating storage in collective states. As originally proposed for quantum dots [14], single spin excitations of a polarised nuclear spin ensemble can be used for quantum information storage. These states are often termed spin waves or nuclear magnons and are generated by spin-preserving exchange dynamics. Preparing these collective nuclear spin states relies firstly on initialising the thermal register ensemble into a pure state, $|0_v\rangle = \downarrow\downarrow\downarrow\downarrow\rangle$, where $\{|\uparrow\rangle, |\downarrow\rangle\}=\{|\pm5/2\rangle, |\pm7/2\rangle\}$ is a two-level sub-manifold of the nuclear spin-7/2 [51]V ion (FIG. 1c, d). Next, with access to exchange dynamics and [171]Yb initialised in $|1_g\rangle$, we can transfer a single excitation from the [171]Yb to the register. It is noted that the excitation is delocalised equally across the four register spins due to coupling homogeneity as determined by the lattice geometry, thus naturally realising the entangled four-body W-state $|W_v\rangle$ [33] given by $$|W_v\rangle = \frac{|\uparrow\downarrow\downarrow\downarrow\rangle + |\downarrow\uparrow\downarrow\downarrow\rangle + |\downarrow\downarrow\uparrow\downarrow\rangle + |\downarrow\downarrow\downarrow\uparrow\rangle}{2}$$

(FIG. 1C). If the [171]Yb qubit is initialised into $|0_g\rangle$ there are no spin excitations in the system and the [51]V register remains in $|0_v\rangle$. Crucially, these dynamics realise a quantum swap gate between a target state prepared by the [171]Yb qubit, $|\psi\rangle = \alpha|0_g\rangle + \beta|1_g\rangle$, and the $|0_v\rangle$ state of the [51]V register, leading to $$(\alpha|0_g\rangle + \beta|1_g\rangle)|0_v\rangle \rightarrow |0_g\rangle(\alpha|0_v\rangle + \beta|W_v\rangle).$$

Figure 1E:
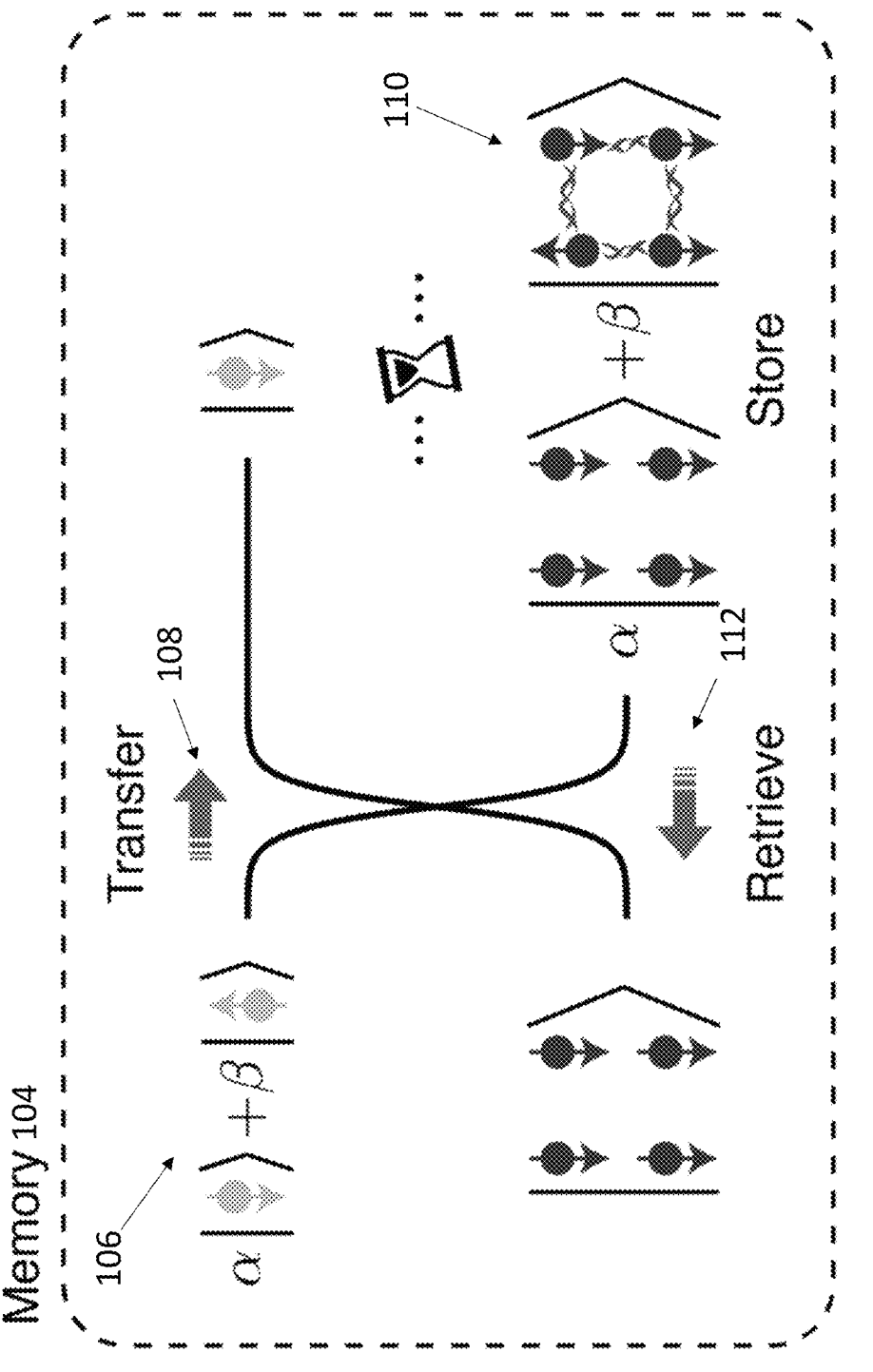

After waiting for a certain period of time, the stored quantum state can be retrieved from the nuclear register by applying a second swap gate (FIG. 1E). Note that the spin-wave like state $|W_v\rangle$ of the nuclear ensemble is being utilized as a constituent of the quantum memory basis.

Figure 2A:
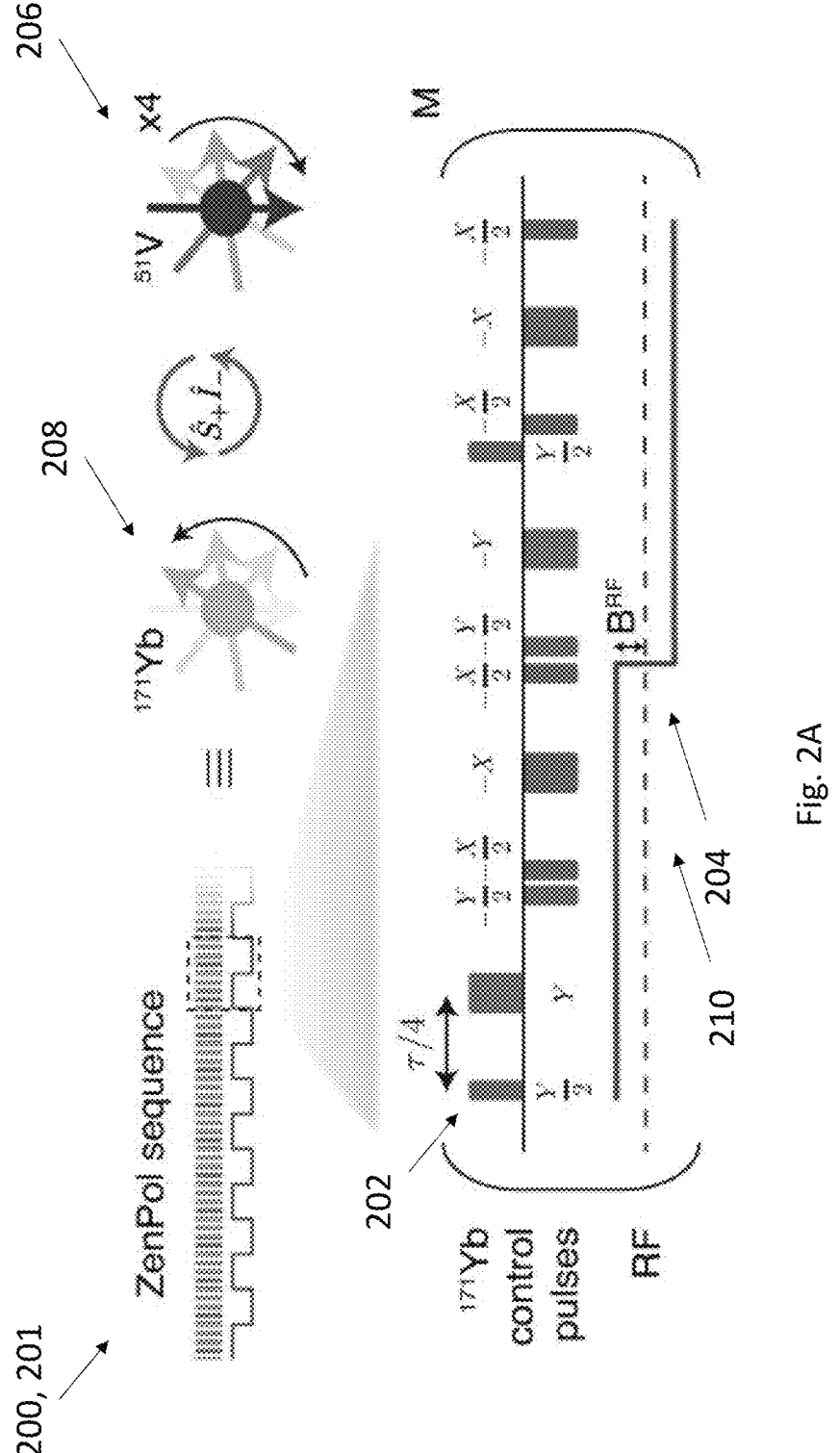
FIGS. 2A-2D. Pulse-based Hamiltonian engineering, nuclear register polarisation and spin exchange between $^{171}$Yb and $^{51}$V ions.
Figure 7A:
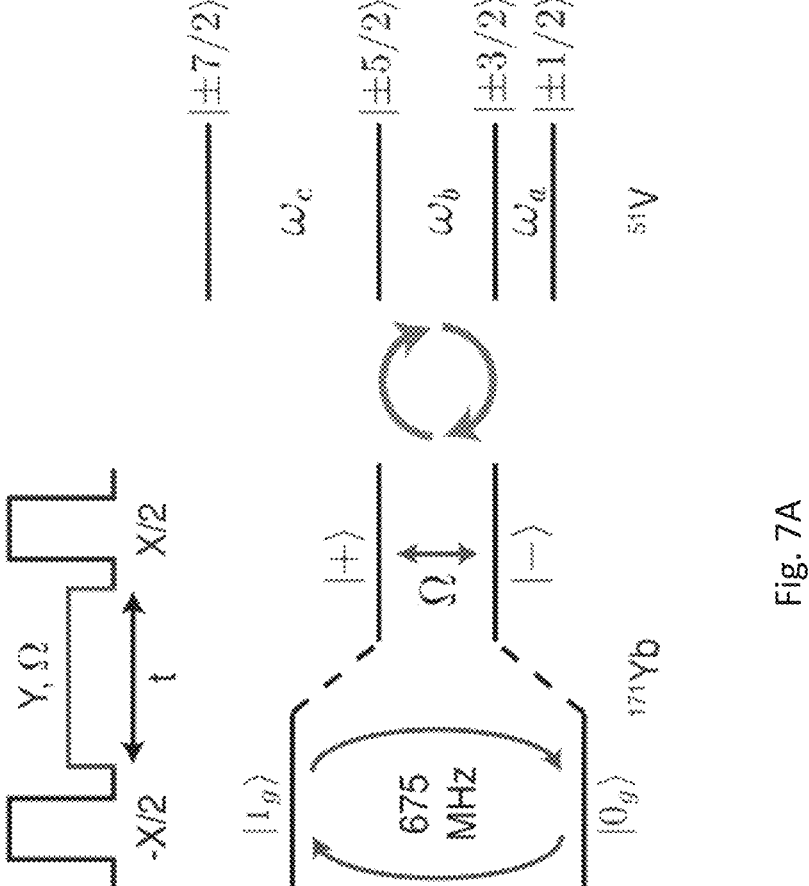
FIG. 7A, Hartmann Hahn (HH) sequence used to perform spectroscopy of the nuclear spin environment. During the HH pulse (red), the $^{171}$Yb$|0_g\big\langle\leftrightarrow|1_g\big\langle$ qubit transition is driven resonantly for duration t with y-phase leading to a pair of dressed states, $$|\pm\rangle = \frac{1}{\sqrt{2}}(|0_g\rangle \pm |1_g\rangle),$$

To realise this storage protocol, the [171]Yb[51]V spin-exchange interactions are rendered independent from the random, bath-induced dipole moment (equation (1)). Established pulse-based methods used to generate such interactions, e.g. Hartmann Hahn [34] and PulsePol [35], do not suit the requirements of the present application as they are susceptible to random noise from the bath (FIG. 7). To this end, the present invention uses a framework for robust dynamic Hamiltonian engineering [36] to design a new sequence tailored for qubits with no intrinsic magnetic moment (subsequently referred to as ZenPol for 'zero first order Zeeman nuclear-spin polarisation'). ZenPol comprises equidistant $\pi/2$ and $\pi$ pulses combined with a synchronous, z-directed, square-wave RF magnetic field with tuneable amplitude, $B^{RF}$, and period $2\tau$ (FIG. 2a). The sequence is repeated M times leading to a total interrogation duration of $t_M=2\tau M$. The RF field induces an alternating [171]Yb magnetic dipole moment, thereby generating a similar [171]Yb–[51]V interaction as $B_z^{OH}$ in equation (1) but in a controlled manner. The sequence is synchronised with the [51]V precession at one of the nuclear spin transition frequencies, $\omega_j$, by satisfying $$\frac{1}{2\tau} = \frac{\omega_j}{2\pi k},$$

with k an odd integer (FIG. 8). At this resonance condition the leading-order dynamics are understood by considering the temporal interference between time-varying [171]Yb spin operators and [51]V precession in the interaction picture (Methods). The ZenPol sequence is designed such that RF-induced spin-preserving dynamics interfere constructively, while all other dynamics, including the bath-induced incoherent interactions, undergo destructive interference. As a result, the [171]Yb–[51]V interaction is governed by the following timeaveraged effective Hamiltonian $$\hat{H}_{avg} b_{(k,\omega_j)} B^{RF} \sum_{i\in register} \left(\hat{S}_+ \hat{I}_-^{(i)} + \hat{S}_- \hat{I}_+^{(i)}\right),$$

where $b_{(k,\omega_j)}$ is a k-dependent prefactor for the $\omega_j$ transition, $\hat{I}_+=|\uparrow\rangle\langle\downarrow|$, $\hat{I}_-=|\downarrow\rangle\langle\uparrow|$ are the raising and lowering operators in an effective nuclear two-level manifold and $\tilde{\hat{S}}_+$ are similarly defined for the $^{171}$Yb qubit (Methods). While the nuclear spin can stochastically occupy either the $\{|+m_I\rangle\}$ or $\{|-m_I\rangle\}$ manifold of states, the protocol described herein is insensitive to this sign. Moreover, this pulse sequence operates at zero magnetic field where a long $^{171}$Yb coherence time can be maintained; it is insensitive to the presence of random noise from the bath; and is also robust to experimental imperfections, e.g. pulse rotation errors.

2. Example Protocol for the First Example

The ZenPol sequence is used to perform spectroscopy of the $^{171}$Yb nuclear spin environment. FIG. 2 *b* shows a ZenPol spectrum obtained by initialising the $^{171}$Yb into $|0_g\rangle$, applying an M=30 period ZenPol sequence with variable inter-pulse spacing ($\tau/4$) and reading out the $^{171}$Yb population. As a result of the engineered exchange interaction, the $|0_g\rangle$ population decreases significantly at expected t values corresponding to the odd-k $^{51}$V resonances (red line, FIG. 2b). Even-k resonances are also observed even in the absence of the RF field, which are attributed to the incoherent interaction dominated by the random nuclear Overhauser field (blue line, FIG. 2b).

Figure 2B:
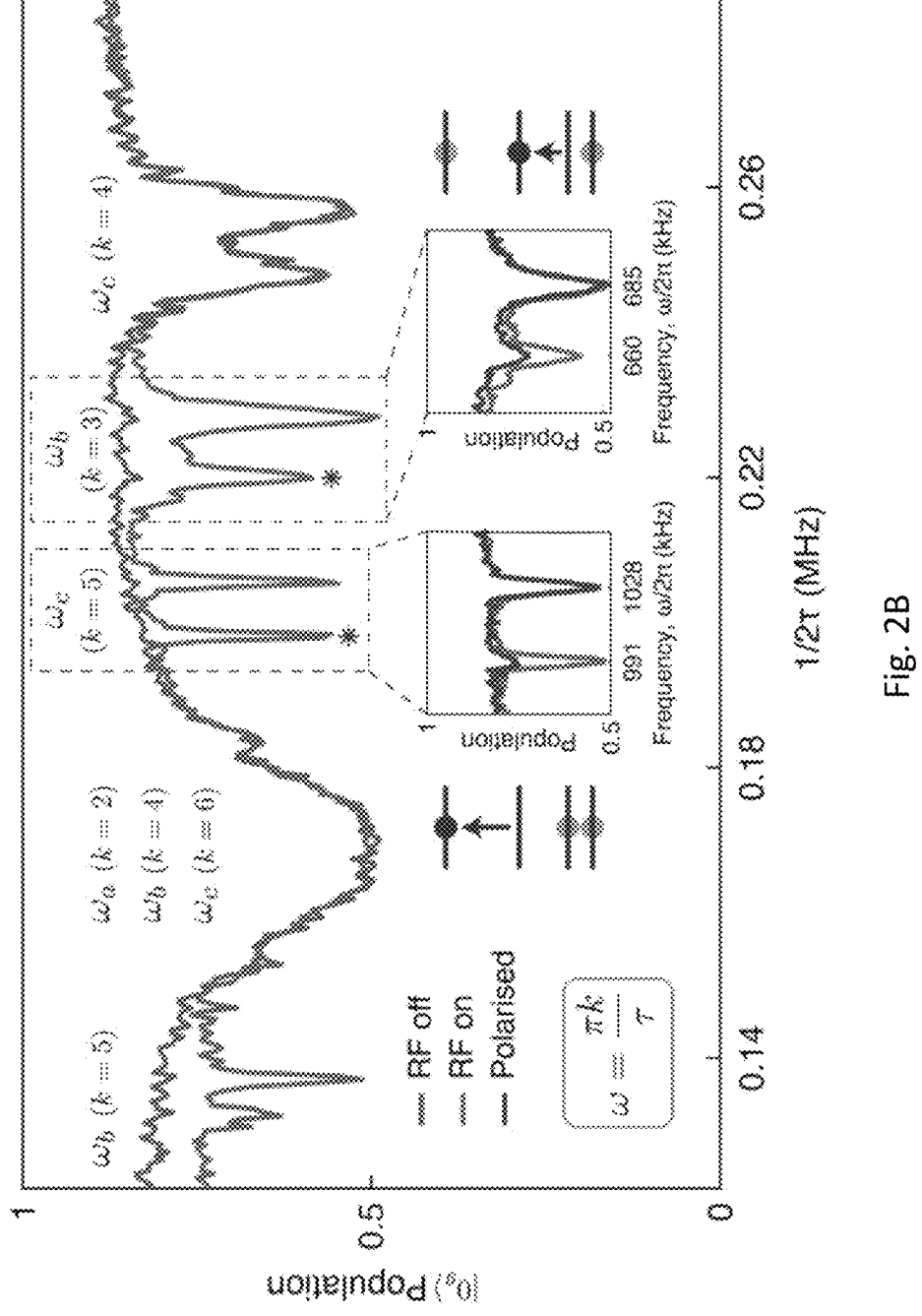

In particular, all the odd-k resonances are split near each isolated $^{51}$V transition (dotted boxes, FIG. 2b). For example, resonance frequencies of {660 kHz, 685 kHz} and {991 kHz, 1028 kHz} are identified around the $\omega_b$ (k=3) and $\omega_c$ (k=5) transitions, respectively. In both cases, the higher-frequency resonance agrees well with literature values extracted from NMR on YVO$_4$ crystals (685 kHz, 1027 kHz) [32]. The presence of two nuclear spin ensembles is postulated: a distant large ensemble with unperturbed frequency (constituents of the bath) and a local small ensemble with a frequency shift due to crystalline strain in the vicinity of the $^{171}$Yb ion (the register).

Polarisation of the entire nuclear spin register relies on repeated application of the ZenPol sequence, resonant with a targeted transition, interleaved with reinitialisation of the $^{171}$Yb qubit leading to unidirectional transfer of $^{51}$V population. (FIG. 5c). Since a the spin-7/2 $^{51}$V ions have four energy levels, high fidelity initialisation by independently polarising different transitions is achieved with different values of $\tau$. For example, to prepare the register spins in $|\pm7/2\rangle=|\downarrow\rangle$, a pair of ZenPol sequences is repeatedly applied which first polarise into $|\pm5/2\rangle$ using the $\omega_b$ transition, and then subsequently into $|\pm7/2\rangle$ using the $\omega_c$ transition (FIG. 9). The data confirms that both $\omega_b$ and $\omega_c$ transitions of the $^{51}$V register are successfully polarised as indicated by the near-complete disappearance of the initial resonances (insets, FIG. 2b). Note that the resonances at 685 kHz and 1028 kHz are unaffected, corroborating the existence of two distinct $^{51}$V ensembles discussed above. The $\omega_a$ transition is not directly addressed by the ZenPol sequence due to spectral overlap with other resonances, however, this does not limit our polarisation fidelity, estimated to be $\approx$84%, as discussed in Supplementary Examples.

Figure 2C:
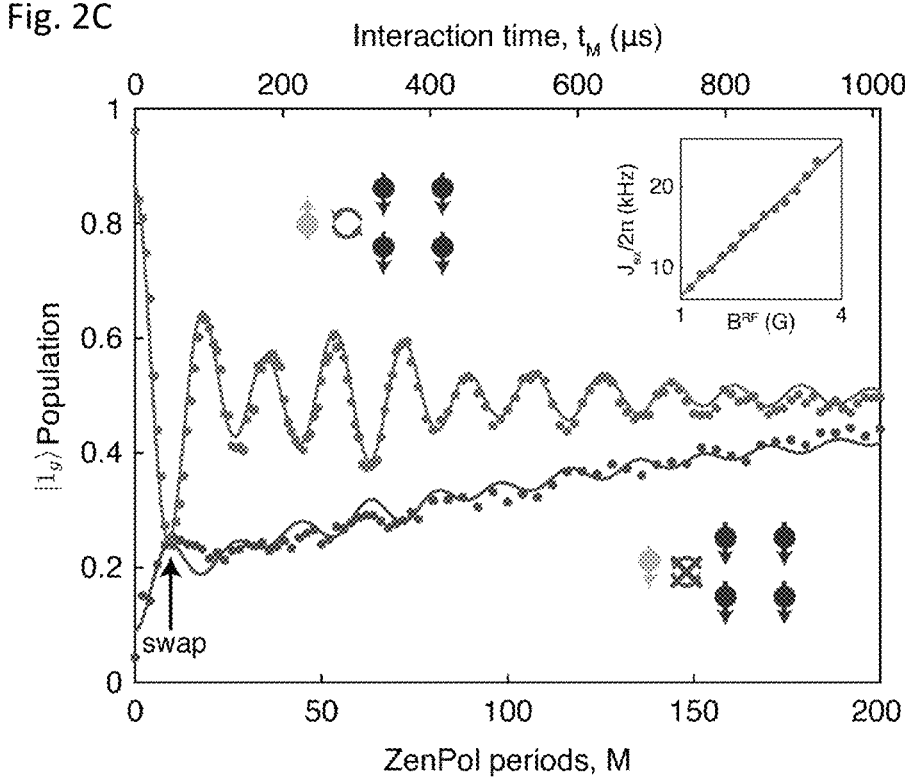

After initialising all four register $^{51}$V spins into a polarized state $|0_v\rangle=|\downarrow\downarrow\downarrow\downarrow\rangle$, the ZenPol sequence can also induce coherent oscillations of a single spin excitation between the $^{171}$Yb ion and the polarised $^{51}$V ensemble. FIG. 2c shows the $^{171}$Yb population as a function of sequence period, M, when the single-spin exchange is targeted at the $\omega_c$ transition. With $^{171}$Yb initialised in $|1_g\rangle$, the quantum state evolves according to:

$$|\psi(t_M)\rangle = |1_g\rangle|0_v\rangle\cos\left(J_{ex}\, t_M/2\right) - i|0_g\rangle|W_v\rangle\sin\left(J_{ex}\, t_M/2\right)$$

with spin-exchange rate $J_{ex}=4b_{(5,\omega_c)}B^{RF}$ (red, FIG. 2c). Note that when $J_{ex}t_M=\pi$, the sequence realises a swap gate (black arrow, FIG. 2c), whereby a single-spin excitation is completely transferred to the register, i.e., $|1_g\rangle|0_v\rangle\rightarrow|0_g\rangle|W_v\rangle$. Furthermore, $J_{ex}$ can be accurately controlled by varying $B^{RF}$, allowing for fidelity optimisation of the swap gate (inset, FIG. 2c). By contrast, with $^{171}$Yb initialised in $|0_g\rangle$, exchange interactions are forbidden and thus oscillations are suppressed (blue, FIG. 2c).

The spin-exchange rate is collectively enhanced by a factor of $\sqrt{N}$, where N is the number of indistinguishable spins forming the register. This is verified by controlling the number of spins in the $\omega_c$ transition manifold and measuring the effect on $J_{ex}$. This is implemented by first emptying the $\omega_c$ manifold via the application of downward-polarising ZenPol sequences, thereby pumping all four spins to $|\pm3/2\rangle$ and $|\pm1/2\rangle$. Subsequently, a single excitation is performed on the $\omega_b$ transition to flip one spin from $|\pm3/2\rangle$ to $|\uparrow\rangle(=|\pm5/2\rangle)$, leading to N=1 spins in the $\omega_c$ manifold. Applying a ZenPol sequence resonant with the $\omega_c$ transition, it is found that the resulting exchange frequency is reduced by a factor of $\approx\sqrt{4}$ (FIG. 2d); according to the YVO$_4$ lattice structure, the register likely consists of the second-nearest shell of four equidistant $^{51}$V ions (Supplementary Examples). This assumption is supported by close agreement between experiment and numerical simulation in all cases (FIG. 10).

3. Example Implementation of the First Example as Quantum Memory

To evaluate the performance of the $^{51}$V register as a quantum memory, its information storage times are characterized under various conditions. Specifically, a superposition state is first transferred from the $^{171}$Yb qubit, $$\frac{1}{\sqrt{2}}(|0_g\rangle+i|1_g\rangle),$$

to the $^{51}$V register via the ZenPolbased swap gate. Subsequently, the transferred state $$\frac{1}{\sqrt{2}}(|0_v\rangle+|W_v\rangle)$$

is stored tor a variable wait time, t, before being swapped back to the $^{171}$Yb and measured along the x-axis, thereby probing the coherence of the final state. As shown in FIG. 3$a$, there is a sinusoidal oscillation of the $^{171}$Yb population, modulated by a Gaussian coherence decay, whose contrast vanishes with a 1/e time of T$_2$*=58±4 μs. This oscillation has a frequency of $\omega_c$/2π=991 kHz, originating from relative phase accumulation between $|0_v\rangle$ and $|W_v\rangle$ during the wait time. The coherence time of the $^{51}$V register is predominantly limited by local magnetic field noise from two sources: a fluctuating $^{171}$Yb dipole moment ($^{171}$Yb Knight field) and the nuclear Overhauser field (Supplementary Information). As shown in FIG. 3$b$, the noise created by $^{171}$Yb can be effectively decoupled from the register by periodically flipping the $^{171}$Yb magnetic dipole orientation via a series of it pulses. Similar to the motional narrowing effect [37], the neutralization of the dipole moment arrests undesired phase diffusion of the register, leading to an increased 1/e coherence time of T$_2$*=225±9 μs. The coherence time can be further extended by performing dynamical decoupling on the $^{51}$V register to mitigate the decoherence effect of the nuclear spin bath. This relies on applying $^{51}$Vπ pulses resonant with the $\omega_c$ transition whilst leaving the bath unperturbed (FIG. 11). In FIG. 3$c$, we apply two $^{51}$Vπ pulses with variable inter-pulse delay, combined with periodic π pulses applied to the $^{171}$Yb qubit, significantly extending the 1/e coherence time to T$_2$*=760±14 μs.

The population relaxation times of the $|0_v\rangle$ and $|W_v\rangle$ states are characterized with measured lifetimes of T$_1^{(0)}$= 0.54±0.08 s and T$_1^{(W)}$=39.5±1.3 μs, respectively. Due to the entangled nature of the $|W_v\rangle$ state, T$_1^{(W)}$ is limited by dephasing and is extended to 127±8 μs and 640±20 μs by applying the same decoupling sequences as in FIG. 3$b$,$c$ respectively (FIG. 12). These dephasing processes can be sensitive to the stochastic occupation of the $|+m_I\rangle$ and $|-m_I\rangle$ states, depending on the degree of noise correlation between the four register spins (See Supplementary Examples).

4. Example Bell State Generation Using the First Example

The multi-spin register is benchmarked by characterizing fidelities of $^{171}$Yb $^{51}$V Bell state generation and detection, serving as a vital component of the quantum repeater protocol [3]. In particular, the maximally entangled Bell state $$|\Psi^+\rangle = \frac{1}{\sqrt{2}}(|1_g\rangle|0_v\rangle - i|0_g\rangle|W_v\rangle)$$

can be prepared by initialising the system in $|1_g\rangle|0_v\rangle$ and applying a $\sqrt{\text{swap}}$ gate based on the ZenPol sequence satisfying $J_{ex}t_M$=π/2 (equation (6)). The Bell state coherence is evaluated by monitoring the contrast of oscillation between a given Bell state and its parity conjugate [40]. In our system, the free evolution of $|\Psi^+\rangle$ gives rise to a parity oscillation at frequency $\omega_c$ with $$|\Psi^-\rangle = \frac{1}{\sqrt{2}}(|1_g\rangle|0_v\rangle + i|0_g\rangle|W_v\rangle)$$

Figures 4A, 4B, 4C:
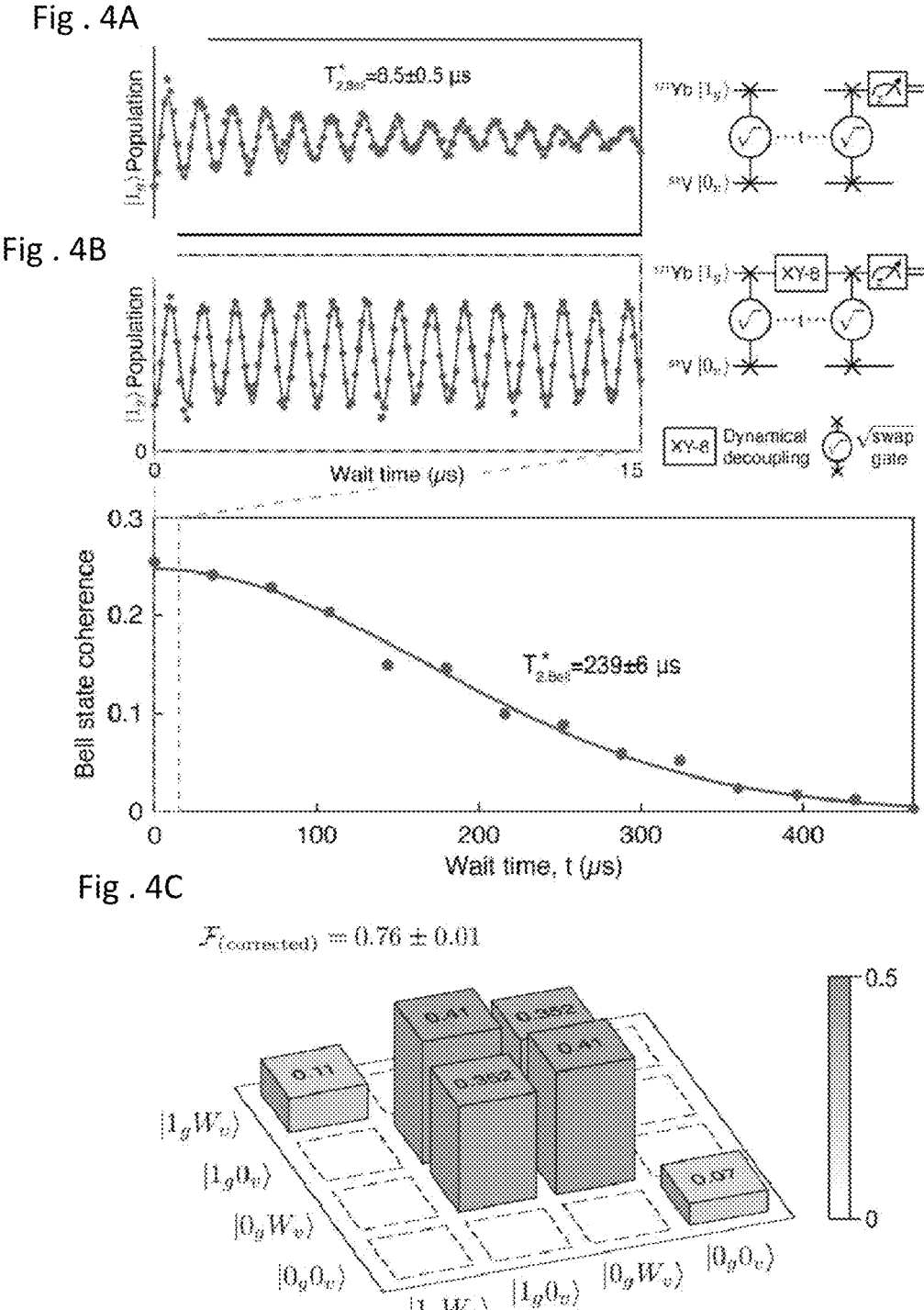
FIGS. 4A-4C. Characterization of maximally entangled $^{171}$Yb$^{51}$V register Bell state.

(See Supplementary Examples). This oscillation is read out by applying a second $\sqrt{\text{swap}}$ gate to the system, encoding the parity into $^{171}$Yb population. FIG. 4$a$ shows the measured parity oscillations decaying with a 1/e time of T$_{2,\,Bell}$*= 8.5±0.5 μs, limited by the T$^2$* dephasing time of the $^{171}$Yb qubit [15]. To improve the coherence, an XY–8 decoupling sequence [38] is applied to the $^{171}$Yb, leading to an enhanced value of T$_{2,Bell}$*=239±6 μs (FIG. 4$b$); this timescale is similar to that in FIG. 3$b$, indicating that the Bell state coherence is likely limited by the T$_2$* dephasing time of the $^{51}$V register.

Figures 13A, 13B, 13D:
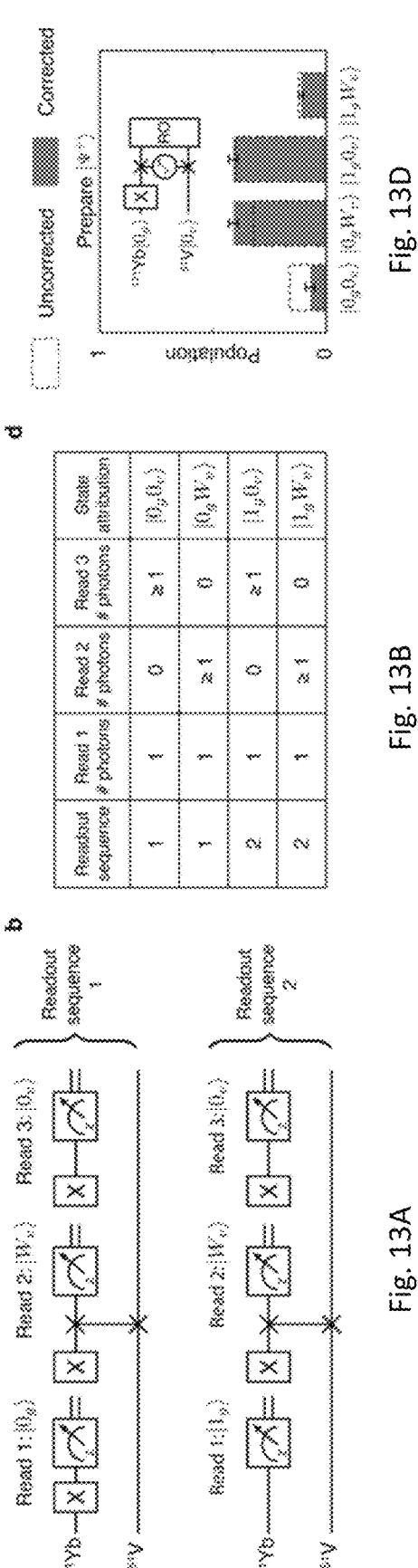

In order to estimate the Bell state preparation fidelity, defined as $\mathcal{F} = \langle\Psi^+|\rho|\Psi^+\rangle$, a sequential tomography protocol [39] is performed to reconstruct the system density matrix ρ in the effective manifold spanned by four states $\{|0_g0_v\rangle, |0_gW_v\rangle, |1_g0_v\rangle, |1_g W_v\rangle\}$ (FIG. 13). Taking into account errors in state readout, a corrected Bell state fidelity of 0.76±0.01 is obtained, as summarized in FIG. 4$c$ (the uncorrected fidelity is measured to be 0.61±0.01). Without being bound by a scientific theory, this may be limited by a combination of incomplete register initialisation, imperfect Hamiltonian engineering and detrimental dephasing of the register during Bell state generation. See Methods and Supplementary Examples for detailed discussions including error analysis.

Figure 14A:
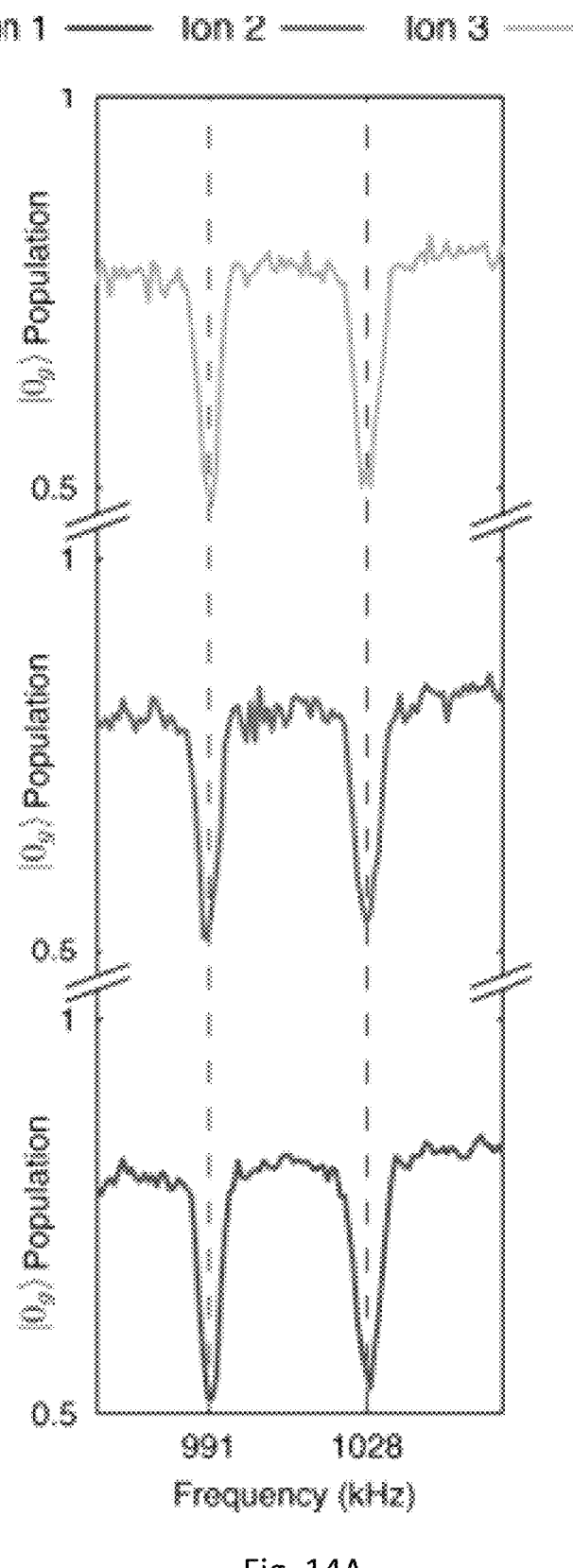
FIGS. 14A-14C. Experimental demonstration of deterministic nuclear spin register. To demonstrate the deterministic nature of the nuclear spin register, we perform the same measurements on two additional Yb ion qubits present in the device: Ion 2 (red) and Ion 3 (yellow). Results for Ion 1 (blue) are reproduced from the main text figures for ease of comparison. a, ZenPol spectra near the $\omega_c$(k=5) resonance of the $^{51}$V register spins. Notice that for all three ions, the bath and register transitions are identified at the same resonance frequencies of $\omega_c^{bath}/2\pi$=1028 kHz and $\omega_c/2\pi$=991 kHz, respectively.
Figure 14B:
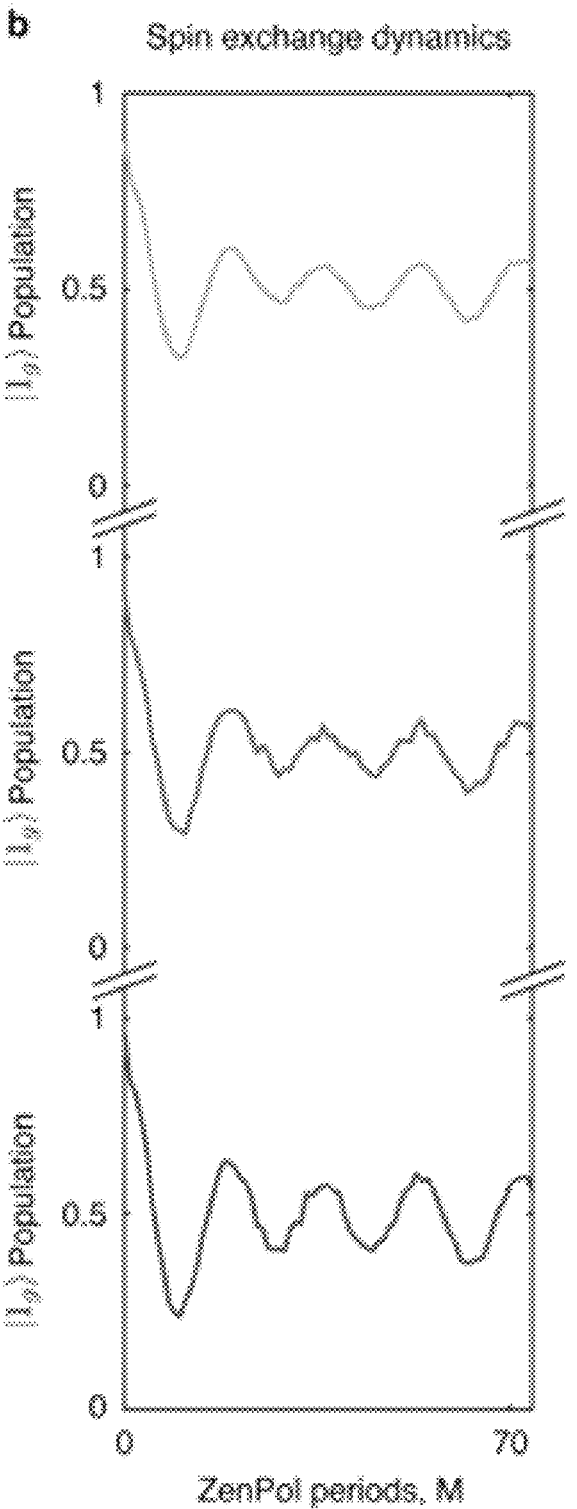
Figure 14C:
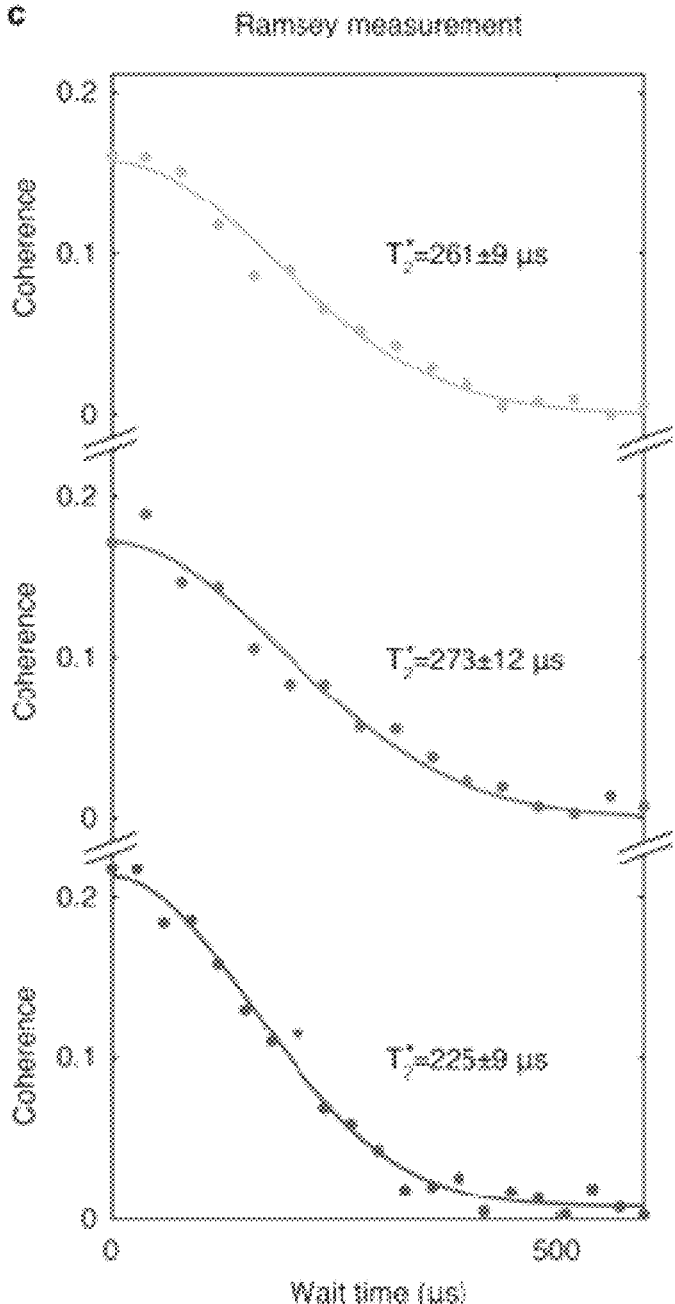

Thus, the above described examples demonstrate a noise-robust control protocol to coherently manipulate the local $^{51}$V nuclear ensemble surrounding a single optically-addressed $^{171}$Yb spin, enabling the polarisation of the high spin $$\left(I = \frac{7}{2}\right)$$

nuclear register, the creation of collective spinwave excitations, and the preparation of maximally entangled Bell states. Based on these capabilities, it is shown that the local nuclear spins realise an ensemble-based quantum memory exhibiting long coherence times. Crucially, this memory is deterministic and reproducible in that every $^{171}$Yb ion doped into a YVO$_4$ crystal accesses a near-identical nuclear register in its local environment (FIG. 14). This resource will enable the implementation of multi-node quantum network architectures using rare-earth ions with both enhanced connectivity and large-scale entanglement [3]. Furthermore, realising coherent quantum systems using dense lattice nuclear spins demonstrates the possibility of implementation in other materials for quantum information applications [13]. These multi-level nuclear spin ensembles offer an attractive, highly controllable platform to investigate the many-body dynamics of a much larger Hilbert space, paving the way for application of solidstate, noisy intermediate-scale quantum (NISQ) devices in the context of quantum simulation [12, 30]

REFERENCES FOR EXAMPLES 1-4

The following references are incorporated by reference herein

[1] Awschalom, D. D., Hanson, R., Wrachtrup, J. & Zhou, B. B. Quantum technologies with optically interfaced solid-state spins. Nat. Photonics 12, 516-527 (2018).

[2] Chatterjee, A. et al. Semiconductor qubits in practice. Nat. Rev. Phys. 3, 157-177 (2021).

[3] Briegel, H. J., Dür, W., Cirac, J. I. & Zoller, P. Quantum repeaters: The role of imperfect local operations in quantum communication. Phys. Rev. Lett. 81, 5932-5935 (1998)

[4] Hensen, B. et al. Loophole-free Bell inequality violation using electron spins separated by 1.3 kilometres. Nature 526, 682-686 (2015).

[5] Bhaskar, M. K. et al. Experimental demonstration of memory-enhanced quantum communication. Nature 580, 60-64 (2020).

[6] Pompili, M. et al. Realization of a multi-node quantum network of remote solid-state qubits. Science 372, 259 264 (2021).

[7] Waldherr, G. et al. Quantum error correction in a solidstate hybrid spin register. Nature 506, 204-207 (2014).

[8] Taminiau, T. H., Cramer, J., Van Der Sar, T., Dobrovitski, V. V. & Hanson, R. Universal control and error correction in multi-qubit spin registers in diamond. Nat. Nanotechnol. 9, 171-176 (2014).

[9] Zhong, M., Ahlefeldt, R. L. & Sellars, M. J. Quantum information processing using frozen core Y3+ spins in Eu3+:Y2SiO5. New J. Phys. 21 (2019).

[10] Bradley, C. E. et al. A Ten-Qubit Solid-State Spin Register with Quantum Memory up to One Minute. Phys. Rev. X. 9, 31045 (2019).

[11] Kinos, A. et al. Roadmap for Rare-earth Quantum Computing. Preprint at https://arxiv.org/abs/2103.15743 (2021)

[12] Randall, J. et al. Observation of a manybody-localized discrete time crystal with a programmable spin-based quantum simulator. Preprint at http://arxiv.org/abs/2107.00736 (2021).

[13] Wolfowicz, G. et al. Quantum guidelines for solid-state spin defects. Nature Reviews Materials (2021).

[14] Taylor, J. M., Marcus, C. M. & Lukin, M. D. Long-Lived Memory for Mesoscopic Quantum Bits. Phys. Rev. Lett. 90, 4 (2003).

[15] Kindem, J. M. et al. Control and single-shot readout of an ion embedded in a nanophotonic cavity. Nature 580, 201-204 (2020).

[16] Gurudev Dutt, M. V. et al. Quantum Register Based on Individual Electronic and Nuclear Spin Qubits in Diamond. Science 316, 1312-1317 (2007). Kolkowitz, S., Unterreithmeier, Q. P., Bennett, S. D. & Lukin, M. D. Sensing distant nuclear spins with a single electron spin. Phys. Rev. Lett. 109, 1-5 (2012).

[18] Taminiau, T. H. et al. Detection and control of individual nuclear spins using a weakly coupled electron spin. Phys. Rev. Lett. 109, 137602 (2012).

[19] Zhao, N. et al. Sensing single remote nuclear spins. Nat. Nanotechnol. 7, 657-662 (2012).

[20] Metsch, M. H. et al. Initialization and Readout of Nu—clear Spins via negatively charged Silicon-Vacancy Center in Diamond. Phys. Rev. Lett. 122, 190503 (2019).

[21] Bourassa, A. et al. Entanglement and control of single nuclear spins in isotopically engineered silicon carbide. Nat. Mater. 19, 1319-1325 (2020).

[22] Hensen, B. et al. A silicon quantum-dot-coupled nuclear spin qubit. Nat. Nanotechnol. 15, 13-17 (2020).

[23] Kornher, T. et al. Sensing Individual Nuclear Spins with a Single Rare-Earth Electron Spin. Phys. Rev. Lett. 124, 170402 (2020)

[24] Wolfowicz, G. et al. 29Si nuclear spins as a resource for donor spin qubits in silicon. New J. Phys. 18 (2016).

[25] Utikal, T. et al. Spectroscopic detection and state preparation of a single praseodymium ion in a crystal. Nat. Commun. 5, 1-8 (2014).

[26] Siyushev, P. et al. Coherent properties of single raree-arth spin qubits. Nat. Commun. 5, 1-6 (2014).

[27] Zhong, T. et al. Optically Addressing Single Rare-Earth Ions in a Nanophotonic Cavity. Phys. Rev. Lett. 121, 183603 (2018)

[28] Chen, S., Raha, M., Phenicie, C. M., Ourari, S. & Thompson, J. D. Parallel single-shot measurement and coherent control of solid-state spins below the diffraction limit. Science 370, 592-595 (2020).

[29] Gangloff, D. A. et al. Quantum interface of an electron and a nuclear ensemble. Science 364, 62-66 (2019). 1812.07540.

[30] Gangloff, D. A. et al. Revealing beyond-mean-field correlations in a nuclear ensemble via a proxy qubit. Preprint at https://arxiv.org/abs/2012.11279 (2020).

[31] Kindem, J. M. et al. Characterization of Yb3+:171: YVO4 for photonic quantum technologies. Phys. Rev. B 98, 1-10 (2018).

[32] Bleaney, B., Gregg, J. F., De Oliveira, A. C. & Wells, M. R. Nuclear magnetic resonance of 51V (I=7/2) in lanthanide vanadates: II. The nuclear electric quadrupole interaction. J. phys., C, Solid state phys. 15, 5293-5303 (1982).

[33] Weimer, H., Yao, N. Y. & Lukin, M. D. Collectively enhanced interactions in solid-state spin qubits. Phys. Rev. Lett. 110, 1-5 (2013).

[34] Hartmann, S. R. & Hahn, E. L. Nuclear double resonance in the rotating frame. Phys. Rev. 128, 2042-2053 (1962).

[35] Schwartz, I. et al. Robust optical polarization of nuclear spin baths using Hamiltonian engineering of nitrogenvacancy center quantum dynamics. Sci. Adv. 4, 1-8 (2018).

[36] Choi, J. et al. Robust Dynamic Hamiltonian Engineering of Many-Body Spin Systems. Phys. Rev. X. 10, 31002 (2019)

[37] Bauch, E. et al. Ultralong Dephasing Times in Solid-State Spin Ensembles via Quantum Control. Phys. Rev. X. 8, 031025 (2018).

[38] Gullion, T., Baker, D. B. & Conradi, M. S. New, compensated Carr-Purcell sequences. J. Magn. Reson. 89, 479-484 (1990).

[39] Kalb, N. et al. Entanglement distillation between solidstate quantum network nodes. Science 356, 928-932 (2017).

[40] Levine, H. et al. High-Fidelity Control and Entanglement of Rydberg-Atom Qubits. Phys. Rev. Lett. 121, 1-6 (2018)

[41] Zhong, T., Rochman, J., Kindem, J. M., Miyazono, E. & Faraon, A. High quality factor nanophotonic resonators in bulk rare-earth doped crystals. Opt. Express 24, 536 (2016).

[42] Zhong, T. et al. Nanophotonic rare-earth quantum memory with optically controlled retrieval. Science 1395, 1392-1395 (2017).

[43] Drever, R. W. P. et al. Laser Phase and Frequency Stabilization Using an Optical Resonator. Appl. Phys. B 31, 97-105 (1983).

[44] Slichter, C. P. Principles of Magnetic Resonance (Springer-Verlag, New York, 1992), 3rd edn.

[45] Degen, C. L., Reinhard, F. & Cappellaro, P. Quantum sensing. Rev. Mod. Phys. 89, 1-39 (2017).

[46] Bernien, H. et al. Heralded entanglement between solidstate qubits separated by three metres. Nature 497, 86-90 (2013).

[47] Nguyen, C. T. et al. An integrated nanophotonic quantum register based on silicon-vacancy spins in diamond. Phys. Rev. B 100, 1-19 (2019).

5. Supplementary Example Methods for Implementing the First Example a. Experimental Setup

FIG. 5 illustrates a schematic of the complete experimental setup used for characterization of the first example.

The YVO$_4$ crystal used in this project was cut and polished from an undoped boule (Gamdan Optics) with a residual total $^{171}$Yb concentration of 140 ppb. Nanophotonic cavities were fabricated from this material using focused ion beam milling, see [41,42] for more detail on this process. The cavity used in this work has a Qfactor of ≈10,000 leading to Purcell enhancement and consequent reduction of the $^{171}$Yb excited state lifetime from 267µ to 2.3µ as described and measured in [15] and >99% of ion emission coupling to the cavity mode. The reduced optical lifetime enables detection of single $^{171}$Yb ions. The cavity is under-coupled with $\kappa_{in}/\kappa \approx 0.14$ leading to 14% of emitted light entering the waveguide mode. Waveguide-freespace coupling is achieved via angled couplers with an efficiency of ≈25% and the end-toend system efficiency (probability of detecting an emitted photon) is ≈1%.

The device sits on the still-plate of a $^3$ He cryostat (Bluefors LD-He250) with base temperature of 460 mK. Optical signals are fed into the fridge through optical fibre and focused onto the device with an aspheric lens doublet mounted on a stack of x-y-z piezo nanopositioners (Atto-cube). The device is tuned on-resonance with the $^{171}$Yb optical transitions via nitrogen condensation. Residual magnetic fields are cancelled along the crystal c≡z axis with a set of home-built superconducting magnet coils.

Figure 5A:
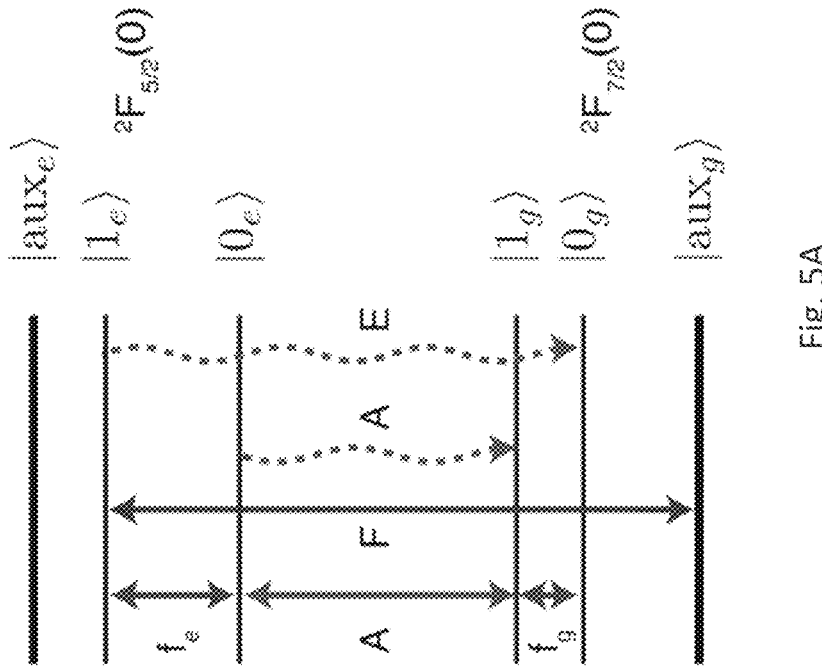
FIGS. 5A-5C. Experimental setup and sequence detail.
Figure 5B:
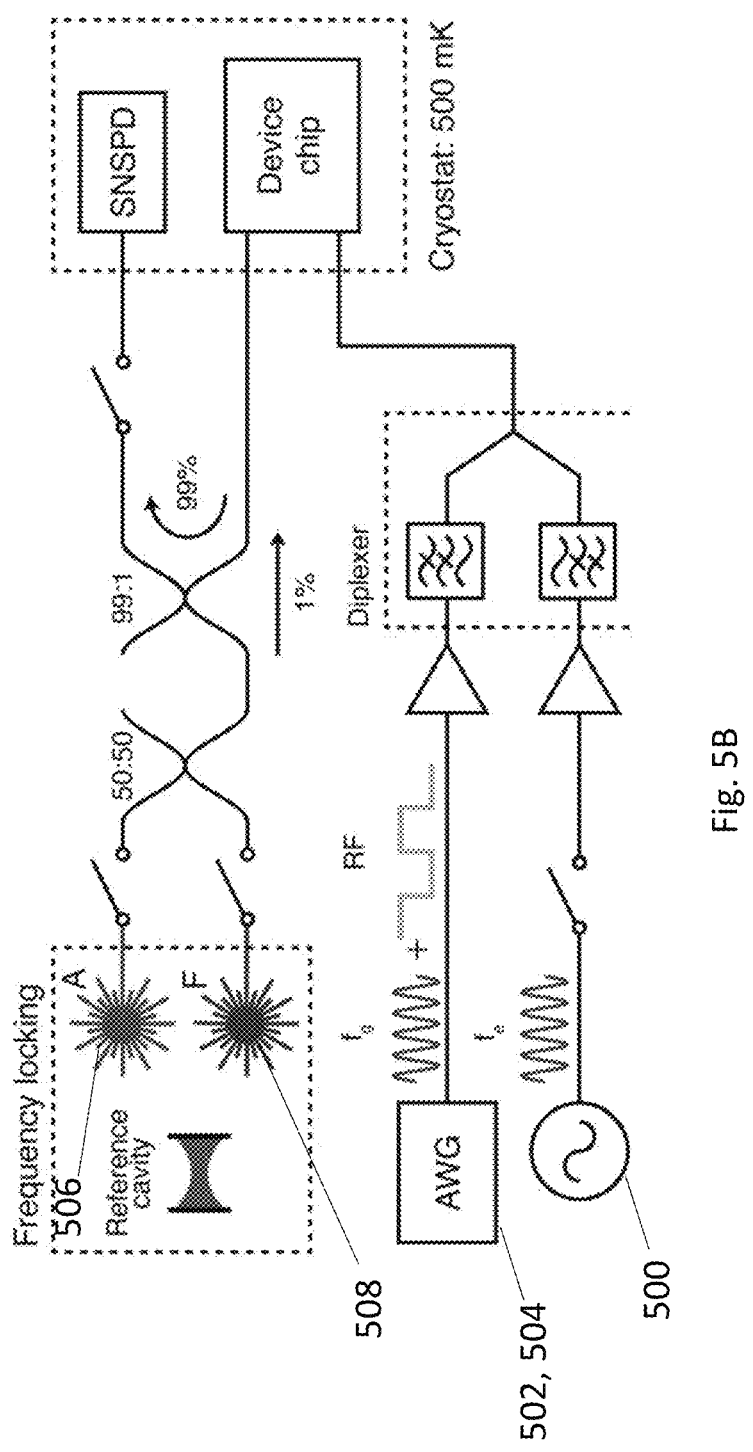
Figure 5C:
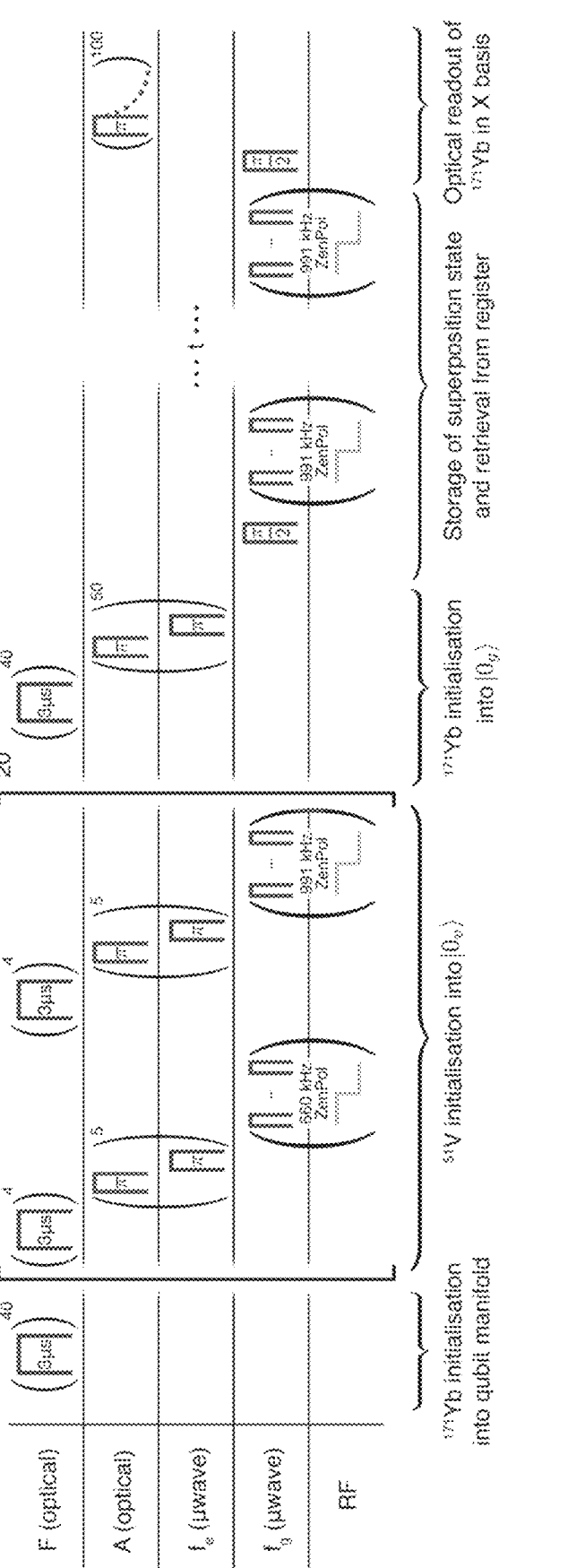

The various optical transitions of a single $^{171}$Yb qubit are employed for state readout and initialisation (FIG. 5a). Optical addressing of the A transition for readout is established with a continuous-wave (CW) titanium sapphire (Ti:Sapph) laser (M$^2$ Solstis) which is frequency-stabilised to a high-finesse reference cavity (Stable Laser Systems) using Pound-Drever-Hall locking [43]. The laser double-passes through two freespace acousto-optic-modulator (AOM) setups leading to single-photon level extinction of the input beam, and pulse generation with ≈10 ns rise times. A second CW external cavity diode laser (Toptica DL-Pro) is used to address the F transition during initialisation. The laser passes through an identical AOM setup and is frequency stabilised via offset-frequency locking to the Ti:Sapph.

The light output from the cavity is separated from the input with a 99:1 fibre beamsplitter, and passed through a single AOM which provides time-resolved gating of the light to prevent reflected laser pulses from saturating the detector. The light is then sent to a tungsten-silicide super-conducting nanowire single photon detector (SNSPD) (Photonspot) which also sits on the still-plate of the cryostat. Photon detection events are subsequently timetagged and histogrammed (Swabian Timetagger 20).

Microwave pulses to control the ground-state qubit transition (675 MHz) and square-wave RF to generate the $^{171}$Yb$^{51}$V interaction (100-300 kHz) are directly synthesised with an arbitrary waveform generator (Tektronix 5204AWG) and amplified (Amplifier Research 10U1000). A second microwave path is used for the excited state microwave control (3.4 GHz) necessary for qubit initialisation. The control pulses are generated by switching the output of a signal generator (SRS SG386) and amplifying (Minicir-cuits ZHL-16 W-43-S+). The two microwave signal paths are combined with a diplexer (Marki DPXN2) and sent into the fridge to the device. A gold coplanar waveguide fabricated on the YVO$_4$ surface enables microwave driving of the ions.

b. $^{171}$Yb Initialisation, Readout and Experiment Sequence

At the 500 mK experiment operating temperature and at zero magnetic field, the equilibrium $^{171}$Yb population is distributed between the $|aux_g>$, $|0_g\rangle$ and $|1_g\rangle$ states (FIG. 5a). All experiments start by initialising the single $^{171}$Yb ion into $|0_g\rangle$ via a two-stage protocol [15]. Firstly the $|aux_g>$ state is emptied with a series of 3 µs pulses applied to the optical F transition each followed by a 3 µs wait period. When the $^{171}$Yb ion is successfully excited from $|aux_g>$ to $|1_e>$, the population in $|1_e>$ will preferentially decay to $|0_g\rangle$ during the wait time via the cavity-enhanced E transition.

Subsequently, the $|1_g\rangle$ state is also emptied by applying an optical π pulse to the A transition followed by a microwave π pulse to the $f_e$ transition in rapid succession, which similarly leads to excitation from $|1_g>$ to $|1_e>$ and decay into $|0_g\rangle$. This process is repeated several times for improved fidelity.

Readout of the $^{171}$Yb$|1_g\rangle$ state is performed by applying a series of 100π pulses to the A transition, each of which is followed by a 10 µs photon detection window. This process is enabled by the cyclic nature of the A transition. To read out the $|0_g>$ population we apply an additional π pulse to swap the $|0_g\rangle \leftrightarrow |1_g\rangle$ populations before performing the same optical readout procedure.

FIG. 5c shows an exemplary pulse sequence used to store and retrieve a superposition state from the register consisting of four $^{51}$V lattice ions. The sequence starts with initialisation of the $^{171}$Yb qubit into $|0_g\rangle$ and the $^{51}$V register into $|0_v>=|\pm 7/2)^{\otimes 4}$. A series of ZenPol polarisation operations are interleaved with $^{171}$Yb re-initialisation sequences and alternate between $\omega_b$ and $\omega_c$ transition control to sequentially polarize the spin-7/2 $^{51}$V register towards the $|\pm 7/2)$ level. After the initialization sequence, a single π/2 pulse is applied to the $^{171}$Yb qubit to prepare a superposition state. Subsequently, the state is transferred to the $^{51}$V register using a swap operation resonant with the $\omega_c$ transition as detailed in the main text. After a variable wait time, the superposition state is retrieved with a second swap gate and measured in the x-basis via a π/2 pulse followed by optical readout on the A transition as detailed above.

25

26 c. ZenPol Sequence

Consider a system of a single $^{171}$Yb qubit coupled to four neighbouring nuclear spin-7/2 $^{51}$V ions. This hybrid spin system is described by the effective Hamiltonian (setting $\hbar=1$):

$$\hat{H} = \Delta(t)\hat{S}_z + \sum_{i\in register} Q(\hat{I}_z^{(i)})^2 + \sum_{i\in register} \hat{S}_z[B_z^{OH} + B^{RF}(t)][a_x\hat{I}_x^{(i)} + a_z\hat{I}_z^{(i)}]$$

where $\Delta(t)=\gamma_z^2(B_z^{OH}+B^{RF}(t))^2/2\omega_{01}$ is the effective energy shift due to both z-directed nuclear Overhauser ($B_z^{OH}$) and external RF($B^{RF}(t)$) magnetic fields, $\omega_{01}/2\pi=675$ MHz is the $^{171}$Yb qubit transition frequency, $\gamma_z/2\pi=8.5$ MHz/G is the $^{171}$Yb ground-state longitudinal gyromagnetic ratio, $Q/2\pi=165$ kHz is the $^{51}$V register nuclear quadrupole splitting, $\hat{S}_z$ is the $^{171}$Yb qubit operator along the z-axis, $\hat{I}_{x,z}$ are the $^{51}$V spin-7/2 operators along the x- and z-axis, and $a_{x,z}$ are the effective coupling strengths between $^{171}$Yb and $^{51}$V along the x- and z-axes. See Supplementary Information for a detailed derivation of this effective Hamiltonian.

Figure 8A:
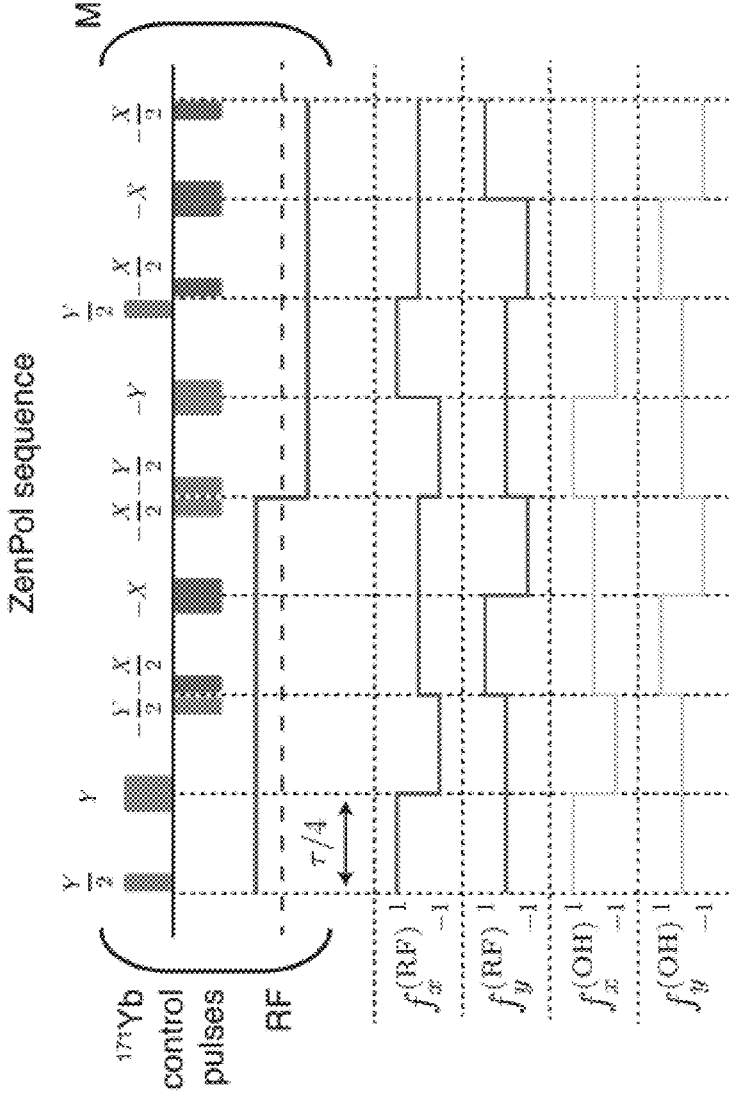
FIGS. 8A-8B ZenPol sequence detail.

As discussed in the main text, polarisation of the $^{51}$V register and preparation of collective spin-wave states relies on induced polarisation transfer from the $^{171}$Yb to $^{51}$V and is achieved via periodic driving of the $^{171}$Yb qubit. Specifically, periodic pulsed control can dynamically engineer the original Hamiltonian (equation (7)) to realize effective spin-exchange interaction between $^{171}$Yb and $^{51}$V ions of the form, $\hat{S}_+\hat{I}_-+\hat{S}_-\hat{I}_+$, in the average Hamiltonian picture [36], [44]. One example of such a protocol is the recently developed PulsePol sequence [35], however, it relies on states with a constant, nonzero magnetic dipole moment and therefore cannot be used in our system since the $^{171}$Yb qubit has no intrinsic magnetic dipole moment. Motivated by this approach, we have developed a variant of the PulsePol sequence that accompanies a square-wave RF field synchronized with the sequence (FIG. 8a). The base sequence has a total of 8 free-evolution intervals with equal duration ($\tau/4$) defined by periodically spaced short pulses and is repeatedly applied to $^{171}$Yb. Following the sequence design framework presented in Ref. [36], we judiciously choose the phase and ordering of the constituent $\pi/2$ and $\pi$ pulses such that the resulting effective interaction has spin-exchange form with strength proportional to the RF magnetic field amplitude ($B^{RF}$), whilst decoupling from interactions induced by the Overhauser field ($B_z^{OH}$). The sequence was designed to cancel detuning induced by both of these fields and to retain robustness against pulse rotation errors to leading order. We term this new sequence 'ZenPol' for 'zero first-order Zeeman nuclear-spin polarisation'.

To understand how the ZenPol sequence works, one can consider a toggling-frame transformation of the $^{171}$Yb spin operator along the quantisation axis ($\hat{S}_{z,tog}(t)$): we keep track of how this operator is transformed after each preceding pulse. For example, the first $\pi/2$ pulse around the y-axis transforms $\hat{S}_z$ into $-\hat{S}_x$ and the subsequent $\pi$ pulse around the y-axis transforms $-\hat{S}_x$ into $+\hat{S}_x$. Over one sequence period, the toggling frame transformation generates a time-dependent Hamiltonian $\hat{H}_{tog}(t)$ that is piecewise constant for each of 8 free-evolution intervals, which can be expressed as $$\hat{H}_{tog}(t) = \Delta(t)\left[f_x^{OH}(t)\hat{S}_x + f_y^{OH}(t)\hat{S}_y\right] + \sum_{i\in register} Q(\hat{I}_z^{(i)})^2 +$$
$$\sum_{i\in register} B_z^{OH}\left[f_x^{OH}(t)\hat{S}_x + f_y^{OH}(t)\hat{S}_y\right][a_x\hat{I}_x^{(i)} + a_z\hat{I}_z^{(i)}] +$$
$$\sum_{i\in register} B^{RF}\left[f_x^{RF}(t)\hat{S}_x + f_y^{RF}(t)\hat{S}_y\right][a_x\hat{I}_x^{(i)} + a_z\hat{I}_z^{(i)}]$$

Here, $f_{x,y}^{OH}(t)$ describes the time-dependent modulation of the $^{171}$Yb z-spin operator ($\hat{S}_{z,tog}(t)=f_x^{OH}(t)\hat{S}_x+f_y^{OH}(t)\hat{S}_y$) (FIG. 8a). Note that $f_z^{OH}(t)=0$ for all intervals. Since the externally-applied squarewave RF field is constant for each half-sequence period, we can replace $B^{RF}(t)$ with the amplitude $B^{RF}$ and transfer the time dependence to $f_{x,y}^{OH}$ by applying sign flips, thus leading to redefined modulation functions $f_{x,y}^{RF}$ (FIG. 8a).

The spin-7/2 $^{51}$V ion exhibits three distinct transitions at frequencies $\omega_{a,b,c}$ (FIG. 1b). In the following, we consider an effective spin-½ system for the $^{51}$V ions using the $\omega_c$ manifold, $\{|\uparrow\rangle=|\pm5/2\rangle, |\downarrow\rangle=|\pm7/2\rangle\}$, with $$\hat{I}_x = \frac{1}{2}(|\uparrow\rangle\langle\downarrow|+|\downarrow\rangle\langle\uparrow|),$$
$$\hat{I}_y = \frac{1}{2i}(|\uparrow\rangle\langle\downarrow|-|\downarrow\rangle\langle\uparrow|) \text{ and}$$
$$\hat{I}_z = \frac{1}{2}(|\uparrow\rangle\langle\uparrow|-|\downarrow\rangle\langle\downarrow|).$$

In a rotating frame with respect to the target frequency $\omega_c$, the nuclear spin operators become $\hat{I}_x\rightarrow\hat{I}_x\cos(\omega_c t)+\hat{I}_y\sin(\omega_c t)$ and $\hat{I}_z\rightarrow\hat{I}_z$. Thus, the leading-order average Hamiltonian, $$\hat{H}_{avg} = \frac{1}{2\tau}\int_0^{2\tau} dt\hat{H}_{tog}(t),$$

in the rotating frame is given by:

$$\hat{H}_{Avg} = \sum_{i\in register} \frac{a_x\sqrt{7}}{2\tau}$$
$$\int_0^{2\tau} dt\Big\{B_z^{OH}\left[f_x^{OH}(t)\hat{S}_x + f_y^{OH}(t)\hat{S}_y\right]\left[\hat{I}_x^{(i)}\cos(\omega_c t)+\hat{I}_y^{(i)}\sin(\omega_c t)\right] +$$
$$B^{RF}\left[f_x^{RF}(t)\hat{S}_x + f_y^{RF}(t)\hat{S}_y\right]\left[\hat{I}_x^{(i)}\cos(\omega_c t)+\hat{I}_y^{(i)}\sin(\omega_c t)\right]\Big\}.$$

Figure 8B:
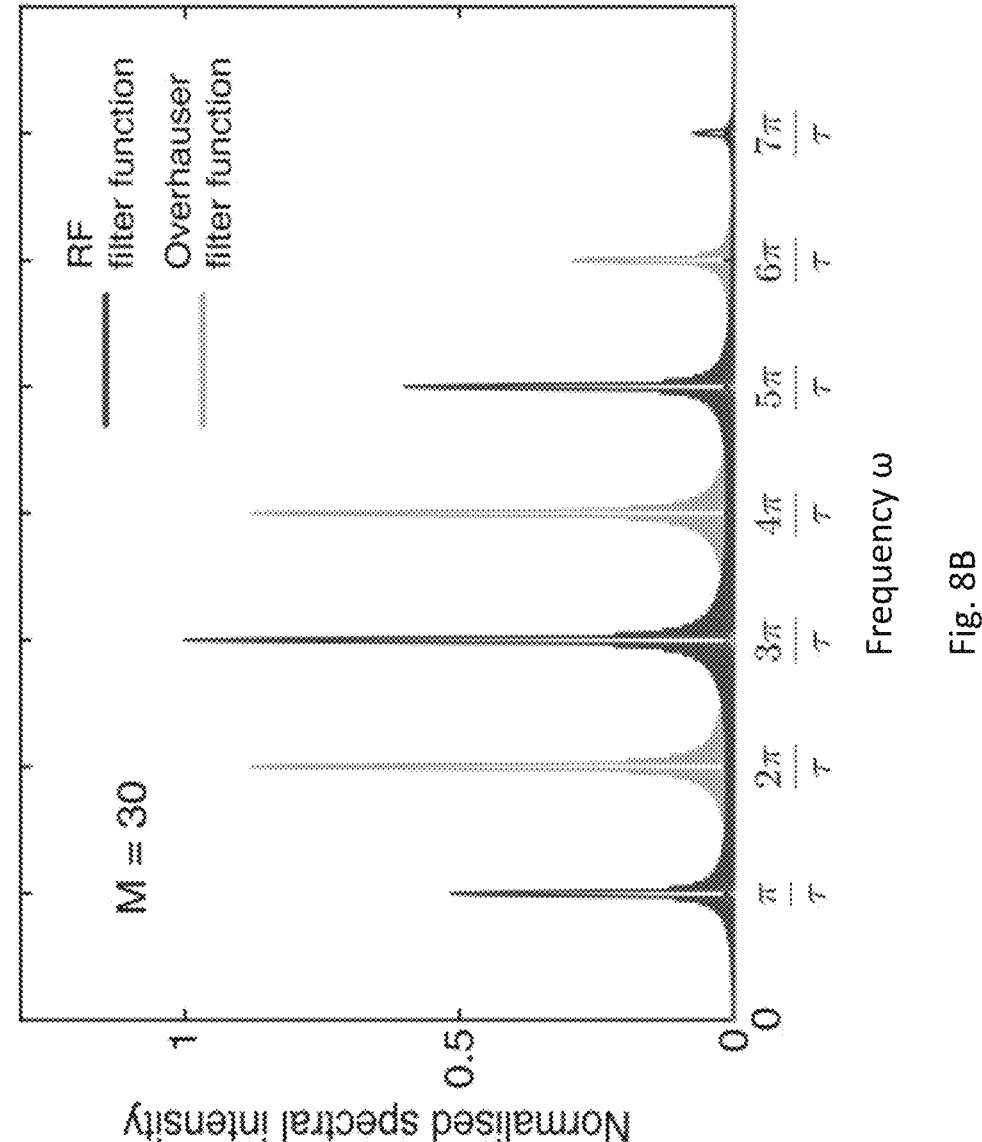

Here, various terms are excluded as they time average to zero (rotating-wave approximation). The $\sqrt{7}$ prefactor comes from mapping the original spin-7/2 operators to the effective spin-½ ones. Additionally, the energy shift induced by $B_z^{OH}$ and time-dependent $B^{RF}$ is cancelled since we are using square-wave RF. The Fourier transforms of the modulation functions $f_{x,y}(t)$, termed the filter functions [45], directly reveal resonance frequencies at which equation (9) yields non-zero contributions (FIG. 8b). Resonant interactions with strength proportional to the nuclear Overhauser field are achieved at sequence periods $2\tau$ which satisfy $$\frac{1}{2\tau} = \frac{\omega_c}{2\pi\times2}, \frac{\omega_c}{2\pi\times4}, \frac{\omega_c}{2\pi\times6}, \dots;$$

interactions proportional to the RF field occur at sequence periods satisfying $$\frac{1}{2\tau} = \frac{\omega_c}{2\pi \times 1}, \frac{\omega_c}{2\pi \times 3}, \frac{\omega_c}{2\pi \times 5}, \cdots .$$

These two sets of resonances occur at different values of $2\tau$, hence we can preferentially utilise the coherent, RF-induced interactions whilst decoupling from those induced by the randomised Overhauser field. This is experimentally demonstrated in FIG. 2 *b* where the RF-induced resonances are spectrally resolved. In this measurement the linewidth of the register resonances are limited by that of the filter function. We also note that the $\omega_a$ transition cannot be independently addressed by the ZenPol sequence due to the multiplicity of the three $^{51}$V transitions determined by the quadratic Hamiltonian ($\omega_a = \omega_b/2 = \omega_c/3$).

We use the RF-driven resonance identified at $$\frac{1}{2\tau_r} = \frac{\omega_c}{2\pi \times 5}$$

by setting the free-evolution interval to $$\frac{\tau}{4} = \frac{5\pi}{4\omega_c}.$$

Under this resonance condition, the average Hamiltonian (equation (9)) is simplified to $$\hat{H}_{avg} = -\sqrt{7}\left(\frac{1+\sqrt{2}}{5\pi}\right)a_x B^{RF} \times \sum_{i \in register}\left(\left(\hat{S}_x + \hat{S}_y\right)\hat{I}_x^{(i)} + \left(-\hat{S}_x + \hat{S}_y\right)\hat{I}_y^{(i)}\right)$$

$$= -\sqrt{7}\left(\frac{\sqrt{2}+2}{5\pi}\right)a_x B^{RF} \sum_{i \in register}\left(\tilde{S}'_x \hat{I}_x^{(i)} + \tilde{S}'_y \hat{I}_y^{(i)}\right)$$

$$= b_{(5,\omega_c)}B^{RF} \sum_{i \in register}\left(\tilde{S}'_+ \hat{I}_-^{(i)} + \tilde{S}'_- \hat{I}_+^{(i)}\right).$$

Here, going from the first to the second line, we change the local $^{171}$Yb basis by rotating 45 degrees around the z axis such that $\tilde{S}'_x = (\tilde{S}_x + \tilde{S}_y))/\sqrt{2}$, $\tilde{S}'_y = (-\tilde{S}_x + \tilde{S}_y)/\sqrt{2}$, and from the second to the third line, $\tilde{S}'_\pm = \tilde{S}'_x \pm i\tilde{S}'_y$ and $\hat{I}_\pm = \hat{I}_x \pm i\hat{I}_y$ are used. We define the coefficient $b_{(k,\omega_j)}$ which determines the interaction strength for the $k^{th}$ resonance addressing transition $\omega_j$ (for example, $b_{(5,\omega_c)} = -\sqrt{7}(\sqrt{2}+2)a_x/10\pi$). In the discussion in the first example above, we omitted the primes on the $^{171}$Yb spin operators for the sake of notational simplicity. The same analysis can be performed for other transitions, yielding a similar spinexchange Hamiltonian, albeit with different interaction 9) strength.

d. Direct Drive Gates for $^{51}$V Register

Figures 11A, 11B, 11C:
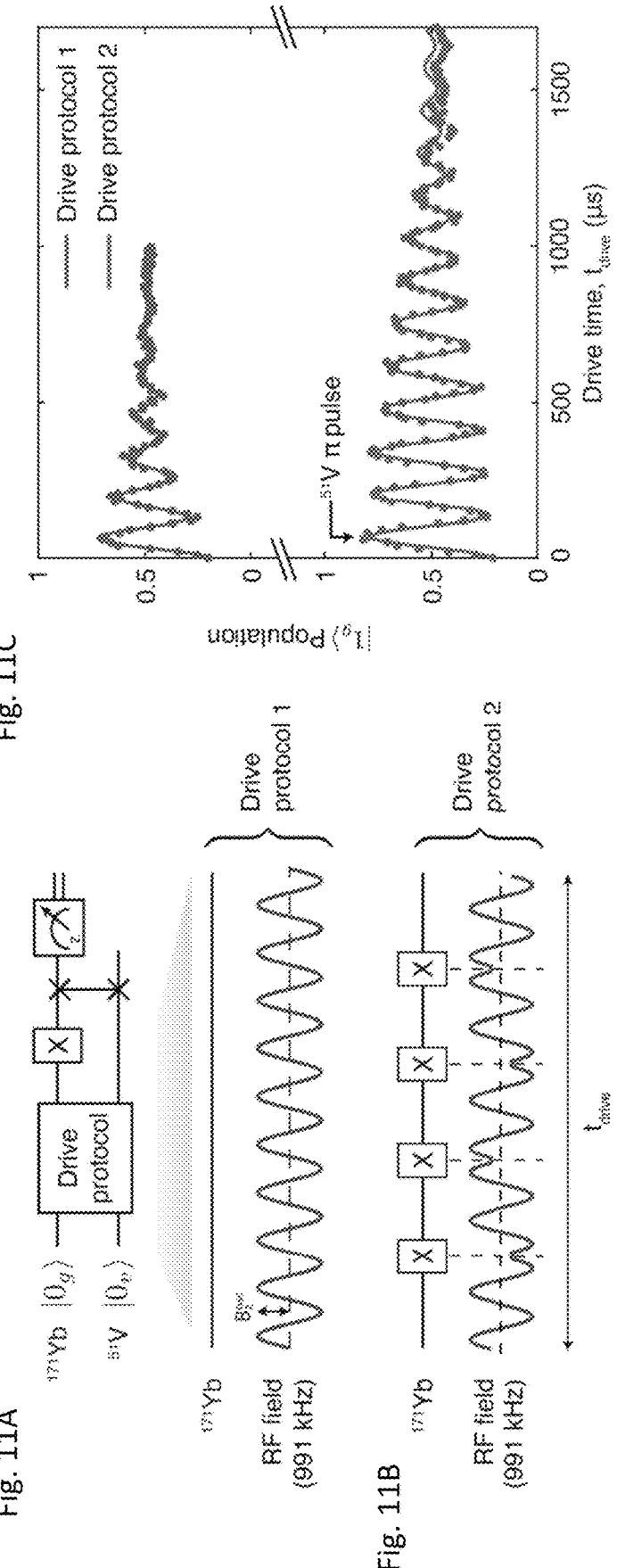
FIGS. 11A-11C. Direct $^{51}$V nuclear spin driving.

Performing dynamical decoupling on the register requires selective driving of the froze-core $^{51}$V nuclear spins without perturbing the bath and is achieved through a two-fold mechanism. Firstly we initialise the $^{171}$Yb qubit into $|0_g\big\langle$ and apply a sinusoidal z-directed RF magnetic field at $\omega_c/2\pi = 991$ kHz through the coplanar waveguide to induce an oscillating $^{171}$Yb magnetic dipole moment (FIG. 11*a*). This generates an x-directed field component at each $^{51}$V spin, where the driving Hamiltonian is given by $\hat{H}_{drive} = \mu_N g_{vx} A_x B_z^{osc} \sin(\omega_c t)\hat{I}_x$ with $A_x = 3 \ln \mu_0 \gamma_z^2/8\pi r^3 \omega_{01}$. Here, $\mu_N$ is the nuclear magneton, $g_{vx}$ is the $^{51}$Vx directed g-factor, $B_z^{osc}$ is the sinusoidal RF magnetic field amplitude, $\hat{I}_x$ is the nuclear spin-7/2 operator along the x-axis, $\{l,n\}$ are the $\{x,z\}$ directional cosines of the $^{171}$Yb–$^{51}$V displacement vector, $\mu_0$ is the vacuum permittivity, and r is the $^{171}$Yb–$^{51}$V ion distance (Supplementary Information). The lattice symmetry of the host leads to equidistant spacing of the four proximal $^{51}$V spins from the central $^{171}$Yb qubit allowing homogeneous coherent driving of all register spins.

In this direct driving scheme, we note that the effect of $B_z^{osc}$ is amplified by a factor of $A_x \approx 6.7$ for the frozen core register spins at a distance of r=3.9 Å (Supplementary Information). Crucially, the amplification factor scales as $A_x \propto 1/r^3$ with distance r from the $^{171}$Yb qubit, leading to a reduced driving strength for distant $^{51}$V bath spins. Moreover, the transition frequency of the bath, $\omega_c^{bath}/2\pi = 1028$ kHz, is detuned by 37 kHz from that of the register, $\omega_c/2\pi = 991$ kHz, further weakening the bath interaction due to off-resonant driving provided that the Rabi frequency is less than the detuning.

In a rotating frame at frequency $\omega_c$, the driving Hamiltonian $\hat{H}_{drive}$ gives rise to Rabi oscillation dynamics of the register spins within the $\omega_c$ manifold, $\{|\uparrow\rangle = |\pm 5/2\rangle, |\downarrow\rangle = \pm 7/2)\}$. To calibrate $^{51}$V π pulse times, we initialise the register into $|0_v\rangle = |\downarrow\downarrow\downarrow\downarrow\rangle$, drive the register for variable time, and read out the $|0_v\rangle$ population by preparing the $^{171}$Yb qubit in $|1_g\big\langle$ and applying a swap gate to the $\omega_c$ transition. If the final $^{51}$V spin state is in $|0_g\big\langle (|\uparrow\rangle)$ the swap will be successful (unsuccessful) and the $^{171}$Yb qubit will end up in $|0_g\big\langle (|1_g\big\langle)$. Using this method, we induce resonant Rabi oscillations of the register at a Rabi frequency of $2\pi \times (7.65 \pm 0.05)$ kHz (blue markers, FIG. 11*c*) which exhibit exponential decay on a $280 \pm 30$ μs timescale, limited by dephasing caused by the fluctuating $^{171}$Yb Knight field. This can be decoupled using motional narrowing techniques whereby we periodically apply n pulses to the $^{171}$Yb every 6 μs during the drive period. In order to drive the $^{51}$V spins in a phase –continuous manner, we compensate for the inversion of the $^{171}$Yb magnetic dipole moment after each π pulse by applying a n phase shift to the sinusoidal driving field (FIG. 11*b*). This leads to an extended 1/e Gaussian decay time of $1040 \pm 70$ μs (red markers, FIG. 11*c*). The arrow in FIG. 11*c* indicates the 69 μs $^{51}$Vπ pulse time used for dynamical decoupling. In contrast to the spin-preserving exchange interaction, this direct drive protocol provides independent, local control of the four $^{171}$V spins with no constraints on the number of excitations, thereby coupling the $^{51}$V register to states outside the two-level manifold spanned by $|0_v\rangle$ and $|W_v\big\langle$. For example, at odd multiple π times, we find $$|0_v\rangle \rightarrow |\uparrow\uparrow\uparrow\uparrow\rangle$$

$$|W_v\rangle \rightarrow \frac{(|\downarrow\uparrow\uparrow\uparrow\rangle + |\uparrow\downarrow\uparrow\uparrow\rangle + |\uparrow\uparrow\downarrow\uparrow\rangle + |\uparrow\uparrow\uparrow\downarrow\rangle)}{2},$$

both of which contain more than a single excitation. For this reason, we use an even number of n pulses in our decoupling sequences to always return the $^{51}$V register to the memory manifold prior to state retrieval.

e. Population Basis Measurements

We developed a sequential tomography protocol [39] to read out the populations of the joint $^{171}\text{Yb}$–$^{51}\text{V}$ density matrix $\rho$ in the effective four-state basis, $\{|0_g 0_v\rangle,$ $|0_g W_v\rangle, |1_g 0_v\rangle, |1_g W_v\rangle\}$. This is achieved using two separate sequences: Readout sequence 1 and Readout sequence 2, applied alternately, which measure the $\{|0_g 0_v\rangle,$ $|0_g W_v\rangle\}$ and $\{|1_g 0_v\rangle, |1_g W_v\rangle\}$ populations respectively. As shown in FIG. 13$a$, these sequences are distinguished by the presence (absence) of a single $\pi$ pulse applied to the $^{171}\text{Yb}$ qubit at the start of the sequence. This is followed by a single optical readout cycle on the A transition; results are post-selected on detection of a single optical photon during this period. Hence the presence (absence) of the first n pulse results in $|0_g\rangle(|1_g\rangle)$ state readout after post selection. Furthermore, in all post-selected cases the $^{171}\text{Yb}$ qubit is initialised to $|1_g\rangle$ by taking into account this conditional measurement outcome. Subsequently, an unconditional $\pi$ pulse is applied to the $^{171}\text{Yb}$, preparing it in $|0_g\rangle$ and a swap gate is applied, thereby transferring the $^{51}\text{V}$ state to the $^{171}\text{Yb}$. Finally, we perform single-shot readout of the $^{171}\text{Yb}$ state according to the protocol developed in [15]. Specifically, we apply two sets of 100 readout cycles to the A transition separated by a single $\pi$ pulse which inverts the $^{171}\text{Yb}$ qubit population. The $^{51}\text{V}$ state is ascribed to $|W_v\rangle$ $(|0_v\rangle)$ if $\geq 1(0)$ photons are detected in the second readout period and $0(\geq 1)$ photons are detected in the third. The possible photon detection events and state attributions are summarized in FIG. 13$b$.

This protocol was demonstrated by characterizing the state preparation fidelities of the four basis states, the measured histograms are presented in FIG. 13$c$ alongside the respective gate sequences used for state preparation. The resulting uncorrected (corrected) preparation fidelities for these four basis states are:

$$\mathcal{F}_{|0_g 0_v\rangle} = 0.79 \pm 0.01 (0.82 \pm 0.02),$$

$$\mathcal{F}_{|0_g W_v\rangle} = 0.50 \pm 0.02 (0.64 \pm 0.02),$$

$$\mathcal{F}_{|1_g 0_v\rangle} = 0.79 \pm 0.01 (0.82 \pm 0.02),$$

$$\mathcal{F}_{|1_g W_v\rangle} = 0.50 \pm 0.02 (0.64 \pm 0.02)$$

The reduced fidelity of $|0_g W_v\rangle$ and $|1_g W_v\rangle$ relative to $|0_g 0_v\rangle$ and $|1_g 0_v\rangle$ arises from the swap gate used for the $|W_v\rangle$ state preparation. Finally, we characterized the fidelity of the maximally entangled $^{171}\text{Yb}$–$^{51}\text{V}$ Bell state, $$|\Psi^+\rangle = \frac{1}{\sqrt{2}}(|1_g 0_v\rangle - i|0_g W_v\rangle),$$

prepared using a single $\sqrt{\text{swap}}$ gate as described in the first example (FIG. 13$d$). The corresponding uncorrected (corrected) populations for the four basis states, denoted $p_{ij}(c_{ij})$ are:

$$p_{00} = \langle 0_g 0_v | \rho | 0_g 0_v \rangle = 0.16 \pm 0.01 (c_{00} = 0.07 \pm 0.02),$$

$$p_{01} = \langle 0_g W_v | \rho | 0_g W_v \rangle = 0.32 \pm 0.01 (c_{01} = 0.41 \pm 0.02),$$

$$p_{10} = \langle 1_g 0_v | \rho | 1_g 0_v \rangle = 0.40 \pm 0.02 (c_{10} = 0.41 \pm 0.02),$$

$$p_{11} = \langle 1_g W_v | \rho | 1_g W_v \rangle = 0.12 \pm 0.01 (c_{11} = 0.11 \pm 0.01).$$

f. Swap Gate Fidelity Correction

Since $^{171}\text{Yb}$ readout fidelity is >95% [15], the dominant error introduced during the population basis measurements arises from the swap gate. Its fidelity in the population basis was measured by preparing either the $|0_g 0_v\rangle$ state (zero spin excitations) or the $|1_g 0_v\rangle$ state (single spin excitation) and applying two consecutive swap gates such that the system is returned to the initial state. By comparing the $^{171}\text{Yb}$ population before $(p_{pre})$ and after $(p_{post})$ the two gates are applied, fidelity estimates can be extracted independently from the $^{51}\text{V}$ state initialisation. Assuming the swap and swapback processes are symmetric, a gate fidelity $\mathcal{F}_{sw} = \sqrt{(1-2p_{post})/(1-2p_{pre})}$ is obtained. This quantity is measured for zero spin excitations leading to $\mathcal{F}_{sw,0} = 0.83$ and with a single spin excitation leading to $\mathcal{F}_{sw,1} = 0.52$.

When measuring the joint $^{171}\text{Yb}$–$^{51}\text{V}$ populations $\{p_{00}, p_{01}, p_{10}, p_{11}\}$, these fidelities can be used to extract a set of corrected populations $\{c_{00}, c_{01}, c_{10}, c_{11}\}$ according to the method described in [46,47] using $$\begin{pmatrix} c_{11} \\ c_{10} \\ c_{01} \\ c_{00} \end{pmatrix} = E^{-1} \begin{pmatrix} p_{11} \\ p_{10} \\ p_{01} \\ p_{00} \end{pmatrix}$$

where $$E = \frac{1}{2} \begin{pmatrix} 1 + \mathcal{F}_{sw,1} & 1 - \mathcal{F}_{sw,0} & 0 & 0 \\ 1 - \mathcal{F}_{sw,1} & 1 + \mathcal{F}_{sw,0} & 0 & 0 \\ 0 & 0 & 1 + \mathcal{F}_{sw,1} & 1 - \mathcal{F}_{sw,0} \\ 0 & 0 & 1 - \mathcal{F}_{sw,1} & 1 + \mathcal{F}_{sw,0} \end{pmatrix}.$$

A similar approach to correct the $\sqrt{\text{swap}}$ gate was used to read out the Bell state coherence.

6. Supplementary Example Derivations for Interactions and Hamiltonians Described Herein a. $^{171}\text{Yb}$–$^{51}\text{V}$ Interactions (i). Ground State $^{171}\text{Yb}$ Hamiltonian The effective spin-½ Hamiltonian for the $^2F_{7/2}(0)^{171}\text{Yb}^{3+}$ ground state is given by [1]:

$$\hat{H}_{eff} = u_B B \cdot g \cdot \hat{S} + \hat{I}_{Yb} \cdot A \cdot \hat{S}$$

where B is the magnetic field, $\hat{S}$ and $\hat{I}_{Yb}$ are vectors of $^{171}\text{Yb}$ electron and nuclear spin-½ operators respectively and we neglect the nuclear Zeeman term. The uniaxial ground state g tensor is given by:

$$g = \begin{pmatrix} g_x & 0 & 0 \\ 0 & g_x & 0 \\ 0 & 0 & g_z \end{pmatrix} = \begin{pmatrix} 0.85 & 0 & 0 \\ 0 & 0.85 & 0 \\ 0 & 0 & -6.08 \end{pmatrix}$$

which is a uniaxial tensor with the extraordinary axis parallel to the c-axis of the crystal and the two ordinary axes aligned with the crystal a-axes. The ground state A tensor is given by:

$$A = 2\pi \times \begin{pmatrix} 0.675 & 0 & 0 \\ 0 & 0.675 & 0 \\ 0 & 0 & -4.82 \end{pmatrix} GHz$$

FIG. 5a shows the zero magnetic field energy level structure with hybridised [171]Yb electron-nuclear spin eigenstates. Note that the zero-field [171]Yb qubit states, $|0_g\rangle$ and $|1_g\rangle$, have no magnetic dipole moment. See [1] for more details. Throughout this work we adopt an $\hbar=1$ convention.
(ii). Local Nuclear Spin Environment The [171]Yb[3+] ion substitutes for yttrium in a single site of the YVO$_4$ crystal, furthermore naturally abundant Y and V contain 99.8% [51]V and 100% [89]Y isotopes. Hence each 171Yb ion experiences a near-identical nuclear spin environment. The [51]V ions have nuclear spin-7/2 leading to electric quadrupole interactions that cause a zero-field splitting. The resulting zero-field energy level structure of the bath is given by:

$$\hat{H}_V = Q_{bath} \hat{I}_z^2$$

with $Q_{bath}/2\pi=171$ kHz measured using nuclear magnetic resonance (NMR) on bulk YVO$_4$ crystals [2] and $\hat{I}_z$ the [51]V nuclear spin-7/2 spin operator along the c≡z axis. Note that the local [51]V register ions surrounding the [171]Yb qubit experience a frozen-core detuning as discussed in the main text, leading to a smaller quadrupolar splitting with $Q/2\pi=165$ kHz. The energy level structure of these register ions is shown in FIG. 1b. The [89]Y ion, on the other hand, has no zero-field structure.

The positions of the six nearest [51]V ions are tabulated below, where r=[xyz] is the [171]Yb–[51]V position vector with magnitude r and direction cosines {l,m,n}.

| [51]V ion # | Shell | r (Å) | x (Å) | y (Å) | z (Å) | l | m | n |
|---|---|---|---|---|---|---|---|---|
| 1 | 1st | 3.1 | 0 | 0 | −3.1 | 0 | 0 | −1 |
| 2 | 1st | 3.1 | 0 | 0 | 3.1 | 0 | 0 | 1 |
| 3 | 2nd | 3.9 | 0 | −3.6 | 1.6 | 0 | −0.91 | 0.40 |
| 4 | 2nd | 3.9 | 0 | 3.6 | 1.6 | 0 | 0.91 | 0.40 |
| 5 | 2nd | 3.9 | −3.6 | 0 | −1.6 | −0.91 | 0 | −0.40 |
| 6 | 2nd | 3.9 | 3.6 | 0 | −1.6 | 0.91 | 9 | −0.40 |

Note that the two nearest [51]V ions (1 and 2) are located directly above and below the [171]Yb qubit along the z-axis, due to their positions they cannot be driven by the induced [171]Yb magnetic dipole moment and thus belong to the bath (Supplementary Information Section IC). In contrast, ions 3-6 are symmetrically positioned in the lattice with non-zero x/y and z coordinates, forming the frozen-core register spins utilized as a quantum memory. The [51]V ions have a uniaxial g-tensor with form [3]:

$$g_v = \begin{pmatrix} g_{vx} & 0 & 0 \\ 0 & g_{vx} & 0 \\ 0 & 0 & g_{vz} \end{pmatrix}$$

(iii) [171]Yb–[51]V Interactions

The magnetic dipole-dipole interaction between the [171]Yb qubit and a single [51]V ion can be described by the following Hamiltonian:

$$\hat{H}_{dd} = \frac{\mu_0}{4\pi}\left[\frac{\mu_{Yb}\cdot\mu_V}{r^3} - \frac{3(\mu_{Yb}\cdot r)(\mu_V\cdot r)}{r^5}\right]$$

where $\mu_{Yb}=-\mu_B g\cdot\hat{S}$, $\mu_V=\mu_N g_V\hat{I}$ (note that $\hat{I}$ is a vector of [51]V nuclear spin operators), $\mu_B$ is the Bohr magneton, $\mu_N$ is the nuclear magneton, $\mu_0$ is the vacuum permeability and r is the [171]Yb[51]V displacement vector with magnitude r. Due to the highly off-resonant nature of the [171]Yb[51]V interaction, a secular approximation would be appropriate. To first order, however, all secular terms involving the [171]Yb qubit basis are zero, i.e., $$\langle 0_g|\hat{H}_{dd}|0_g\rangle=0, \langle 1_g|\hat{H}_{dd}|1_g\rangle=0$$

To proceed, consider that second-order effects which generally scale as $\sim g^2/\Delta E$, where $\Delta E$ is the energy separation between a pair of unperturbed eigenstates. By taking into account the fact that $g_z$ is roughly 7 times larger than $g_x$, $g_y$ and $\hat{S}_z$ terms in $\hat{H}_{dd}$ mix $|0_g\rangle$ and $|1_g\rangle$ with small $\Delta E$ whereas $\hat{S}_x$ and $\hat{S}_y$ mix the [171]Yb qubit states and $|aux\ g\rangle$ with large $\Delta E$, we restrict our consideration to the $\hat{S}_z$ terms in $\hat{H}_{dd}$:

$$\hat{H}_{dd} \approx \frac{\mu_0\mu_B\mu_N g_z}{4\pi r^3}\hat{S}_z\left[3ln\,g_{vx}\hat{I}_x + 3mng_{vx}\hat{I}_y + (3n^2-1)g_{vz}\hat{I}_z\right]$$

where {l,m,n} are direction cosines of the [171]Yb[51]V displacement vector. Note that the $\hat{S}_z$ operator is the electron spin-½ operator defined as $\hat{S}_z=\frac{1}{2}(|0_g\rangle\langle 1_g|+|1\rangle\langle 0_g|)$ in the basis of the hybridised eigenstates of the [171]Yb qubit.
(iv) Nuclear Overhauser Field As discussed in the first example, the [51]V spins can be divided into two ensembles: register spins and bath spins. The bath spins comprise [51]V ions which are not driven by the [171]Yb qubit for the following two reasons:

1 Ions which aren't driven due to position: certain ions (such as 1 and 2 in the above table) only interact via an Ising-type $\hat{S}_z\hat{I}_z$ Hamiltonian. Hence the [171]Yb qubit cannot be used to drive transitions between the [51]V z-quantised quadrupole levels.

2 Ions which aren't driven due to detuning: As observed in the ZenPol spectra (FIG. 2b in the main text), more distant spins are spectrally separated from the nearby ions comprising the register.

It is assumed that the bath spins are in an infinite-temperature mixed state: $\rho_V=\mathbb{1}_V/Tr\{\mathbb{1}_V\}$, where $\mathbb{1}_V$ is the identity matrix in the Hilbert space for the bath spins. In the mean field picture, their effect on the $^{171}$Yb can be approximated as a classical fluctuating magnetic field, commonly termed the nuclear Overhauser field. As mentioned previously, since $g_z^2 >>> g_{x,y}^2$, the z-component of the Overhauser field is dominant, given by $$B_z^{OH} = \sum_{i \in bath} \frac{\mu_0 \mu_N g_{vz}}{4\pi(r^{(i)})^3}(3(n^{(i)})^2 - 1)m_I^{(i)},$$

where $r^{(i)}$ and $n^{(i)}$ are the distance and z-direction cosine between the $^{171}$Yb and $i^{th}$ bath spin, and $m_I^{(i)} \in \{-7/2,-5/2, \ldots, 5/2, 7/2\}$ is the nuclear spin projection at site i. Note that $B_z^{OH}$ is randomly fluctuating due to the stochastic occupation of the 8 possible $|m_I\rangle$ states, however, it is quasi-static on the timescale of our control sequences, hence we do not label the time dependence. The nuclear Overhauser field generates some weak mixing between $|0_g\langle$ and $|1_g\langle$ leading to perturbed eigenstates $|\tilde{0}_g\rangle$ and $|\tilde{1}_g\langle$ which have a small, induced, z-directed dipole moment. x These states have the form $$|\tilde{0}_g\rangle = |0_g\rangle + \frac{\gamma_z(B_z^{OH} + B^{RF}(t))}{2\omega_{01}}|1_g\rangle$$

$$|\tilde{1}_g\rangle = |1_g\rangle - \frac{\gamma_z(B_z^{OH} + B^{RF}(t))}{2\omega_{01}}|0_g\rangle$$

where $\gamma_z = g_z \mu_B$ is the longitudinal gyromagnetic ratio of the $^{171}$Yb qubit and $\omega_{01}/2\pi = 675$ MHz is the unperturbed $^{171}$Yb$|0_g\langle \leftrightarrow |1_g\langle$ transition frequency. Here we have added the effect of an externally applied, z-directed, square wave RF magnetic field $B^{RF}(t)$ with amplitude $B^{RF}$ used in the ZenPol sequence; note that this field is piecewise constant for each half-sequence period, hence the time dependence corresponds to periodic flips between $\pm B^{RF}$. In addition, these fields induce a detuning of the $^{171}$Yb$|0_g\langle \leftrightarrow |1_g\langle$ transition, which can be calculated using second-order perturbation theory as $\Delta(t) = \gamma_z^2(B_z^{OH} + B^{RF}(t))^2/2\omega_{01}$.

(v) Interaction with Register Ions

We postulate that the second nearest shell of four $^{51}$V ions (ions 3-6 in the table above) comprise the register. These four ions are equidistant from the $^{171}$Yb and interact via both an $\hat{S}_z \hat{I}_z$ term and $\hat{S}_z \hat{I}_x$ or $\hat{S}_z \hat{I}_y$ terms. To identify an effective interaction Hamiltonian in the perturbed basis $\{|\tilde{0}_g\langle, |\tilde{1}_g\langle\}$, only secular matrix elements of $\hat{H}_{dd}$ (equation (S7)) are considered:

$$\hat{H}_{dd} = \langle\tilde{0}_g|\hat{H}_{dd}|\tilde{0}_g\rangle|\tilde{0}_g\rangle\langle\tilde{0}_g| + \langle\tilde{1}_g|\hat{H}_{dd}|\tilde{1}\rangle|\tilde{1}_g\rangle\langle\tilde{1}_g|$$

where $$\langle\tilde{0}_g|\hat{H}_{dd}|\tilde{0}_g\rangle = +\frac{\mu_0 \mu_N \gamma_z^2(B_z^{OH} + B^{RF}(t))}{8\pi r^3 \omega_{01}}[3\ln g_{vx}\hat{I}_x + 3mng_{vx}\hat{I}_y + (3n^2-1)g_{vz}\hat{I}_z]$$

-continued $$\langle\tilde{1}_g|\hat{H}_{dd}|\tilde{1}_g\rangle =$$

$$-\frac{\mu_0 \mu_N \gamma_z^2(B_z^{OH} + B^{RF}(t))}{8\pi r^3 \omega_{01}}[3\ln g_{vx}\hat{I}_x + 3mng_{vx}\hat{I}_y + (3n^2-1)g_{vz}\hat{I}_z].$$

Hence the effective interaction between the $^{171}$Yb qubit and the four register spins, $\hat{H}_{int} = \Sigma_{i \in register}\tilde{\hat{H}}_{dd}^{(i)}$, can be described by $$\hat{H}_{int} = \hat{S}_z(B_z^{OH} + B^{RF}(t)) \sum_{i \in register} \left(J_x^{(i)}\hat{I}_x^{(i)} + J_y^{(i)}\hat{I}_y^{(i)} + J_z^{(i)}I_z^{(i)}\right)$$

with $$I_x^{(i)} = \frac{-3\mu_0 \mu_N \gamma_z^2 g_{vx} l^{(i)} n^{(i)}}{4\pi(r^{(i)})^3 \omega_{01}}$$

$$I_y^{(i)} = \frac{-3\mu_0 \mu_N \gamma_z^2 g_{vx} m^{(i)} n^{(i)}}{4\pi(r^{(i)})^3 \omega_{01}}$$

$$J_z^{(i)} = \frac{-3\mu_0 \mu_N \gamma_z^2 g_{vz}(3(n^{(i)})^2 - 1)}{4\pi(r^{(i)})^3 \omega_{01}}$$

and $$\hat{S}_z = \frac{1}{2}(|\tilde{1}_g\rangle\langle\tilde{1}_g| - |\tilde{0}_g\rangle\langle\tilde{0}_g|).$$

Finally, local basis transformations of each $^{51}$V ion are performed to further simplify the Hamiltonian form. Specifically, we apply the following unitary rotation:

$$\hat{H}_{int} \to U\hat{H}_{int}U^\dagger$$

$$U = \prod_{j \in register} \exp[i\theta^{(j)}\hat{I}_z^{(j)}],$$

where $\theta^{(j)} = \tan^{-1}(m^{(j)}/I^{(j)})$, which leads to $$\hat{H}_{int} = \hat{S}_z(B_z^{OH} + B^{RF}(t)) \sum_{i \in register}[a_x\hat{I}_x^{(i)} + a_z\hat{I}_z^{(i)}]$$

with $a_x = \sqrt{(J_x^{(i)})^2 + (J_y^{(i)})^2}$ and $a_z = J_z^{(i)}$.

Note that the coupling coefficients $a_x$ and $a_z$ are homogeneous (i.e. independent of site index i) since the four register spins are equidistant from the central $^{171}$Yb and have directional cosine factors with equal magnitude.

The same result can also be derived using the Schrieffer-Wolff transformation [4, 5], where the interaction Hamiltonian obtained here corresponds to the dominant second-order perturbation terms. Hereafter notation can be simplified by using $|0_g\langle$ and $|1_g\langle$ without tildes to represent the weakly perturbed eigenstates in the presence of any small magnetic field.

(vi) Full System Hamiltonian

Combining the various energy and interaction terms, the full system Hamiltonian (in a $^{171}$Yb frame rotating at $\omega_{01}/2\pi = 675$ MHz) becomes:

$$\hat{H}_{full} = \frac{\gamma_z^2(B_z^{OH} + B^{RF}(t))^2}{2\omega_{01}}\hat{S}_z +$$

energy levels are quantised along the z-axis, magnetic fluctuations along the z-direction dominate, which can be captured by the following Hamiltonian $$\hat{H}_{nz} = \sum_{i \in register} \mu_N g_{vz} B_z^{OH}(r_i) \hat{I}_z^{(i)}$$

where $B_z^{OH}(r_i)$ is the z-component of the Overhauser field evaluated at the position of the $i^{th}$ register ion, $r_i$.

2 Nuclear magnetic dipole-dipole interactions of the register spins:

$$\hat{H}_{ndd} = \sum_{\substack{i,j \in register \\ i<j}} \frac{\mu_0}{4\pi} \left[ \frac{\mu_V^{(i)} \cdot \mu_V^{(j)}}{r_{ij}^3} - \frac{3(\mu_V^{(i)} \cdot r_{ij})(\mu_V^{(j)} \cdot r_{ij})}{r_{ij}^5} \right]$$

with $r_{ij}$ the displacement vector between [51]V register spins at site i and j.3. [171]Yb-enhanced register spin-spin interactions: These terms are derived by considering second-order perturbations using the Schrieffer-Wolff transformation [4,5]. For example, the dominant Ising-type terms take the form $$\hat{H}_{edd} = \sum_{i,j \in register} \frac{1}{2\omega_{01}} \left[ (3n^2 - 1) \frac{\mu_0 \mu_N \gamma_z g_{vz}}{4\pi r^3} \right]^2 \hat{S}_z \hat{I}_z^{(i)} \hat{I}_z^{(j)},$$

where r and n are the magnitude and z-direction cosine of the [171]Yb [51]V register ion displacement vector. However, we note that the ZenPol sequence cancels these interactions to first order.

By simulating [171]Yb Ramsey coherence times, $g_{vz} \approx 1.6$ is extracted. Estimation of the bare [51]V coherence time indicates a potential discrepancy in this value $g_{vz}$ by up to 25%, discussed further in Supplementary Information, however, this has a negligible impact on the ZenPol sequence simulations. An estimate for $g_{vx} \approx 0.6$ is obtained by calibrating the RF field amplitude and comparing with the experimental results of direct [51]V spin driving in FIG. 11.

The nuclear Overhauser field $B_z^{OH}$ is computed according to equation (S8) by randomly sampling the bath states for each Monte-Carlo simulation repetition. A simple model of the bath dynamics is included by incorporating stochastic jumps of the bath spins on magnetic-dipole allowed transitions.

The register spin dynamics are simulated in a reduced Hilbert space by considering only the $\omega_c$ manifold. This enables fast simulation of all four register spins plus the [171]Yb qubit transition (Hilbert space with dimension 32). Imperfect polarisation of the [51]V register into $|\downarrow\rangle = |\pm 7/2\rangle$ is categorised into two distinct types:

1 Imperfect polarisation within the $\omega_c$ transition i.e. a small residual population $\epsilon_1$ in $|\uparrow\rangle = |\pm 5/2\rangle$.
2 Imperfect polarisation outside the $\omega_c$ manifold i.e. a small residual population $\epsilon_2$ in $|\pm 1/2\rangle$ and $|\pm 3/2\rangle$.

This leads to a $|\downarrow\rangle$ population of $1 - \epsilon_1 - \epsilon_2$. Incomplete polarization is incorporated by sampling different register initial states for each Monte-Carlo repetition. For case 1, this involves occasionally initialising a given [51]V ion into $|\uparrow\rangle$, while for case 2 this involves reducing the Hilbert space dimension by removing the [51]V ion from the simulation.

Figure 10A:
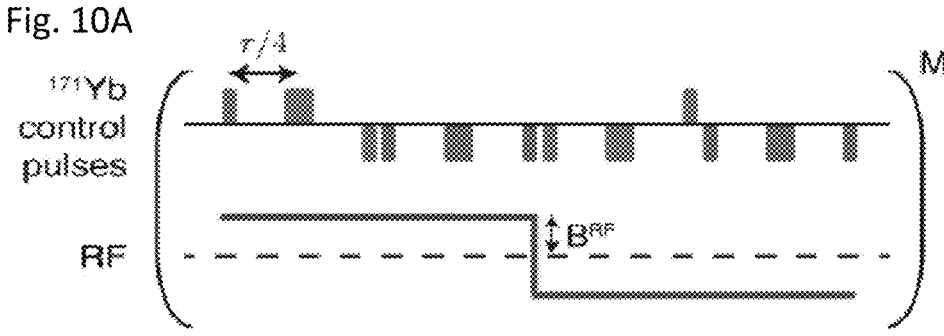
FIGS. 10A-10D. Tunable spin-exchange rate.
Figure 10B:
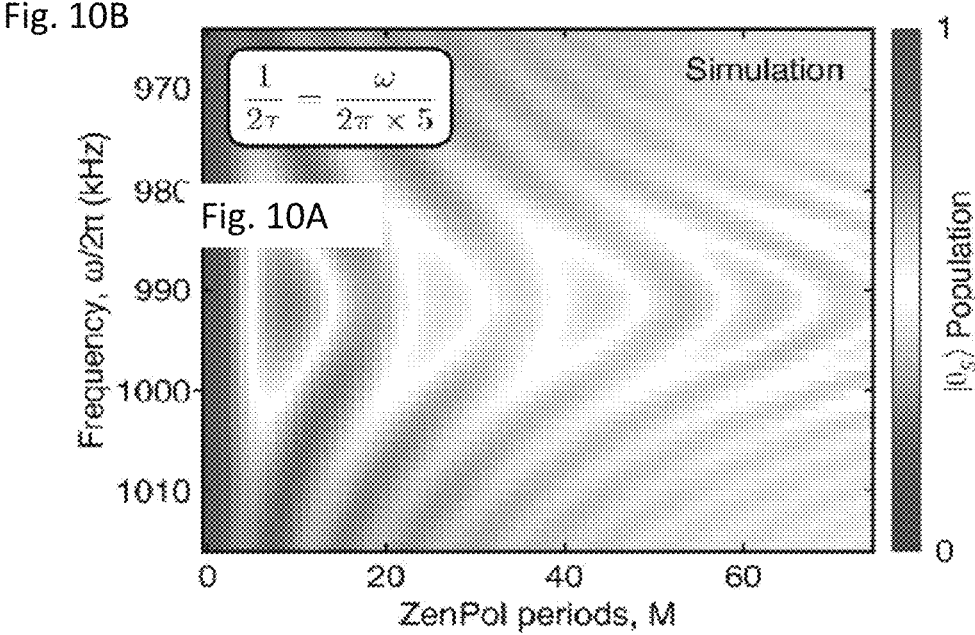

Finite pulse duration effects are taken into account by modeling the ZenPol sequence using 25 ns$\pi/2$ and 50 ns$\pi$ pulses (FIG. 10a).

As shown in Extended Data FIG. 6d, the spin-exchange oscillations from numerical simulation (red dashed line) exhibit slower decay than the measured experimental results (red markers). A phenomenological exponential decay envelope, $ce^{-M/\tau_M}$, is added to the simulation results where c and $\tau_M$ are free parameters, and M is the ZenPol sequence period. The additional decay could be caused by heating due to the RF field, excess [171]Yb dephasing or additional register spin interactions which we haven't considered here. This model is fitted by optimising multiple parameters: $\epsilon_1$, $\epsilon_2$, $B^{RF}$, c and $\tau_M$. The resulting values of $\epsilon_1$ and $\epsilon_2$ are 0.12 and 0.04, respectively, indicating $\approx 84\%$ polarisation into $|\downarrow\rangle$; the RF magnetic field amplitude is $B^{RF} \approx 1.6$G and the phenomenological exponential decay parameters are c=0.8 and $\tau_M=90$ leading to a close fit with the experimental results (red solid line, FIG. 2c and FIG. 10d). Additional simulation results following this methodology with varying $B^{RF}$ and $\tau$ are presented in FIG. 10.

Figure 2D:
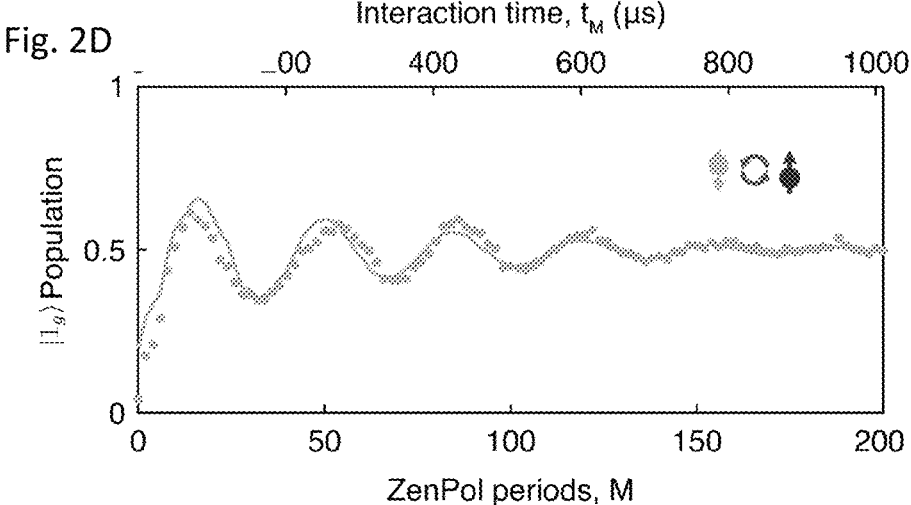

Finally, the results are modeled with a single-spin excitation in the $\omega_c$-manifold by including the $|\pm 3/2\rangle$ level in the simulation (FIG. 2d and Supplementary Information). The initial state used in this simulation is partially polarised between the $|\pm 3/2\rangle$ level with population $1 - \epsilon$ and the $|\pm 1/2\rangle$ level with population E. We use the same value of $B^{RF}=1.6$G as in FIG. 2c, and optimise the polarisation level leading to $1 - \epsilon = 0.8$. The close correspondence between the measured and simulated oscillation profiles suggests that the register consists of the second shell of four homogeneously coupled [51]V ions.

e. Hartmann Hahn Spectroscopy

Figure 7B:
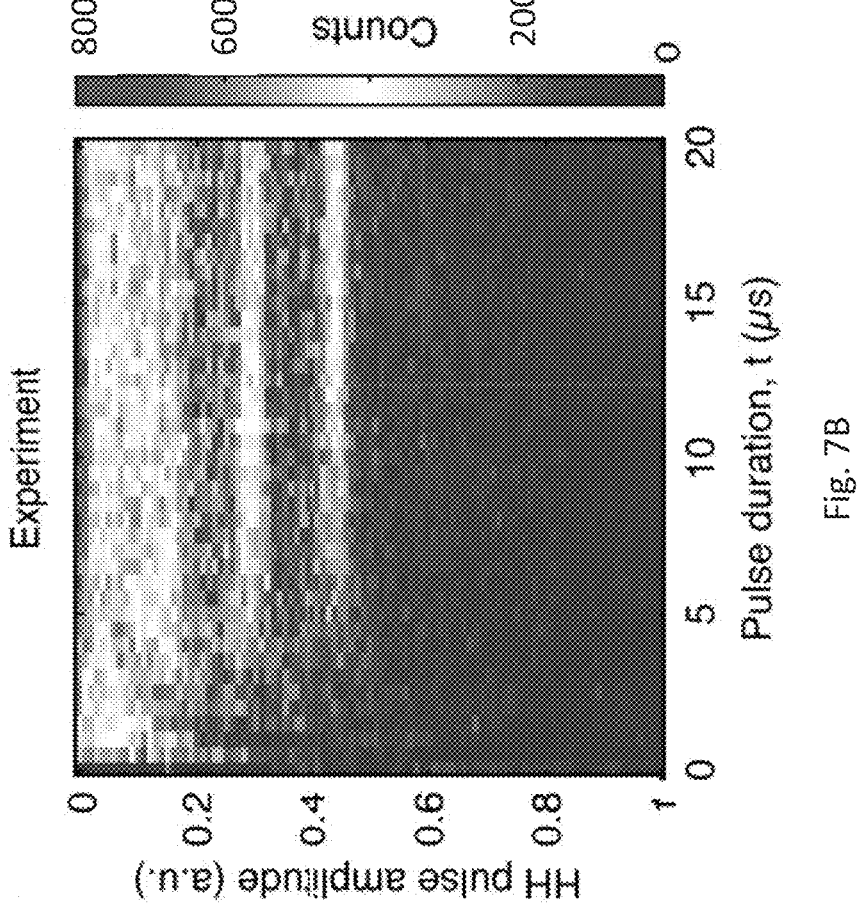
FIG. 7B, HH spectroscopy experimental results. To identify nuclear spin resonances, both the HH pulse amplitude and duration are varied. The three evenly-spaced horizontal resonance features occurring at pulse amplitudes of 0.15, 0.3, and 0.45 (in arbitrary units, a.u.) correspond to interaction with the $\omega_a$, $\omega_b$ and $\omega_c$ transitions, respectively. In the no driving (Ω=0) case, the sequence probes the decoherence dynamics of the prepared |−> state i.e. it measures the Ramsey coherence time.
Figure 7C:
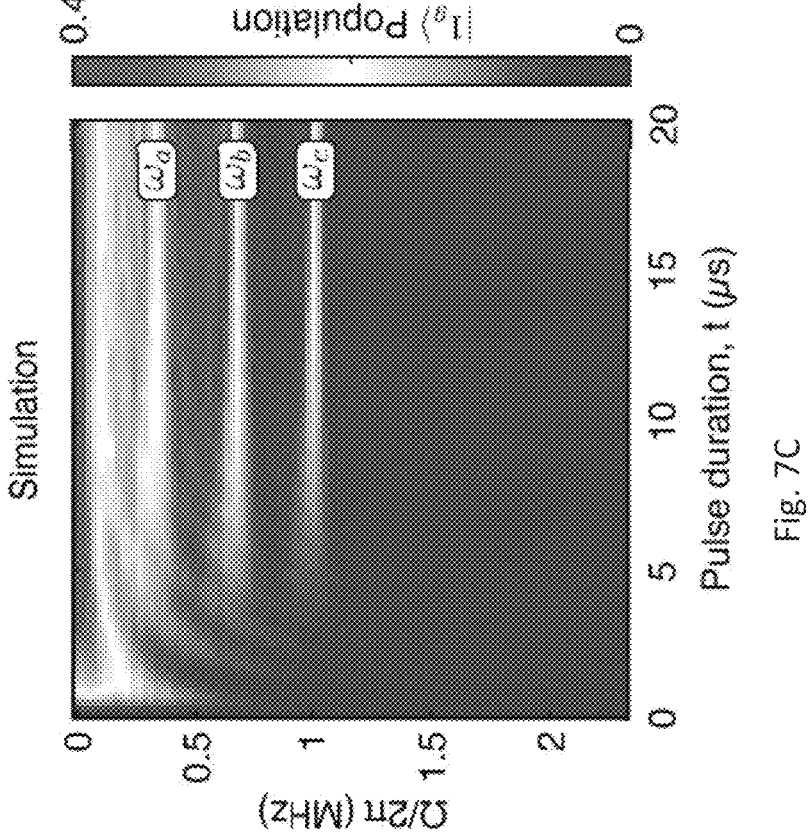
FIG. 7C, HH spectroscopy simulation results. Simulation results agree well with the experiment, verifying that the $^{171}$Yb–$^{51}$V interactions are dominant in our system.

In addition to the ZenPol spectra discussed above, Hartmann-Hahn (HH) double resonance is used to perform spectroscopy of the nuclear spin environment. This method enables spin exchange between two systems with different transition frequencies by resonantly driving a qubit with a Rabi frequency that matches the energy level splitting of the environmental nuclear spins. In our case, we resonantly drive the [171]Yb at 675 MHz to generate a pair of dressed states $$|\pm\rangle = \frac{1}{\sqrt{2}} \left( |0_g\rangle \pm i|1_g\rangle \right)$$

with splitting $\Omega$ which we sweep over a range$\approx 2\pi \times (0-2.3)$ MHz (FIG. 7). The [171]Yb qubit is initialised into the $|-\rangle$ dressed state by a $\pi/2$ pulse preceding the driving period. If resonant with a nuclear spin transition, the [171]Yb qubit undergoes spin exchange at a rate dictated by the interaction strength. Finally we read out the [171]Yb$|+\rangle$ dressed state population to determine whether spin exchange has occurred. FIG. 7b shows experimental results of Hartmann-Hahn spectroscopy where we vary both the HH drive Rabi frequency ($\Omega$) and also the HH pulse duration (t). The counts plotted on the colour-bar are proportional to the $|+\rangle$ dressed state population. Three clear resonances are found at evenly spaced pulse amplitudes 0.15, 0.30 and 0.45 corresponding to the $\omega_a$, $\omega_b$ and $\omega_c$ [51]V transitions; notably, unlike ZenPol, the HH sequence only has one harmonic leading to a single resonant interaction per transition. Also note the lack of oscillations when varying the pulse duration, t, on resonance with either of the three transitions: this is because the spin exchange is driven by the randomised, Overhauser field induced $^{171}$Yb dipole moment. For this reason, the HH sequence cannot be used to generate the coherent exchange interaction necessary to realise a swap gate for our system. In the case of no driving ($\Omega=0$), the signal rapidly saturates as t increases as a result of Ramsey dephasing of the initial state. However, as $\Omega$ exceeds the $^{171}$Yb spin linewidth (~50 kHz[8]), this effect diminishes due to the emergence of spin-locking effects and consequently leads to an increased saturation timescale when not resonant with the $^{51}$V transitions. The resolution of this measurement is also limited by the $^{171}$Yb spin linewidth, and we therefore cannot resolve the split-resonance structure observed in the ZenPol spectra. The results agree well with simulations (FIG. 7c) verifying that interactions with the $^{51}$V quadrupolar structure dominate these measurements.

f. Polarisation of Multi-Level Register Nuclear Spins

Figure 9A:
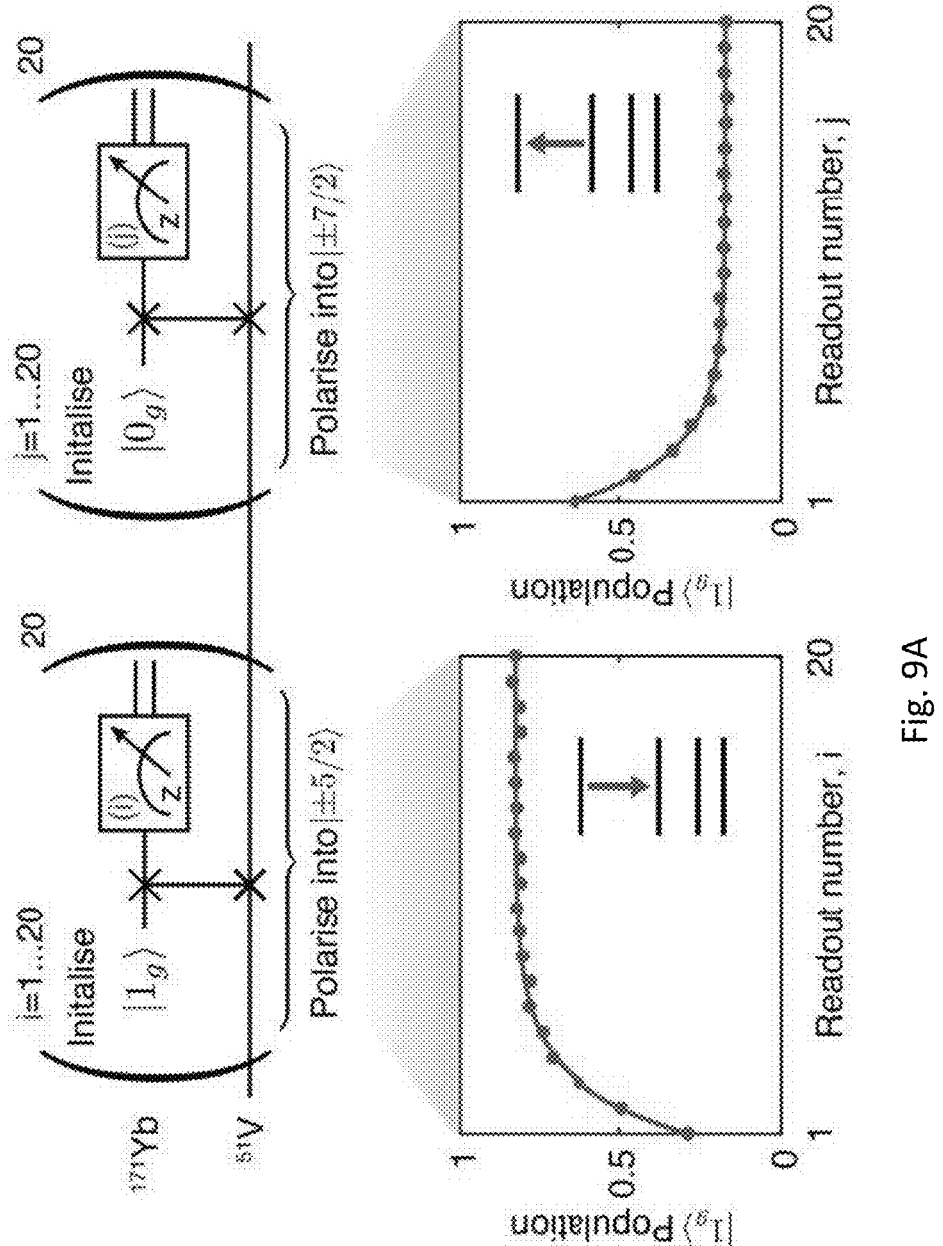

Polarisation dynamics are explored using the PROPI method (polarisation readout by polarisation inversion) [11]. This sequence uses the back-action of the $^{51}$V spins on the $^{171}$Yb to measure the register polarisation after successive ZenPol polarisation cycles. For instance, when polarising into $|\uparrow\rangle=|\pm5/2\rangle$ on the $\omega_c$ transition, the $^{171}$Yb is initialised into $|1_g\rangle$ and undergoes spin exchange with any $^{51}$V population in $|\downarrow\rangle=|\pm7/2\rangle$. The $^{171}$Yb$|0_g\rangle$ population after interaction is therefore related to the residual $^{51}$V$|\downarrow\rangle$ population. As presented in FIG. 9a, the $^{171}$Yb population is measured after each of 20 consecutive polarisation cycles and a saturation is observed after 10 cycles, indicating that the $^{171}$Yb polarisation has been transferred to the $^{51}$V register. The high-contrast signal obtained in this measurement is enabled by alternating the $^{51}$V polarisation direction, i.e. periods of polarisation into $|\uparrow\rangle$ are interleaved with periods of polarisation into $|\downarrow\rangle$. This mitigates the need to wait for slow register thermalisation ($T_0^{(0)}\approx0.5$ s, see Supplementary Information Section X) between consecutive experiment repetitions. These measurements are repeated with ZenPol sequences on the $\omega_b$ transition, demonstrating similar levels of polarisation saturation after approximately 10 cycles (FIG. 9b).

Figure 9C:
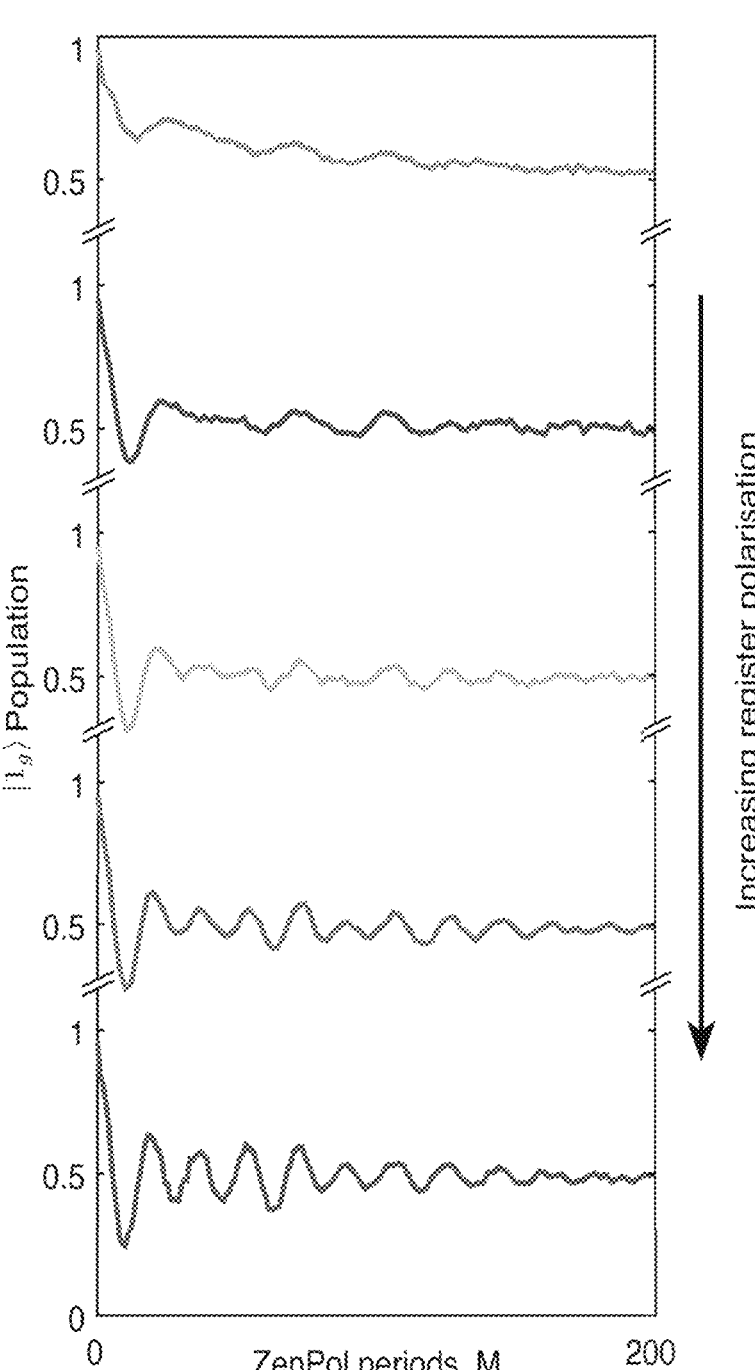

We also demonstrate the effect of incomplete register polarization on the spin-exchange oscillation by varying the number of polarisation cycles on the $\omega_b$ and $\omega_c$ transitions before each experiment (FIG. 9c). As expected, the coherent spin-exchange oscillations emerge as an increasing number of polarisation cycles are applied.

These results inform the design of polarisation sequences used in subsequent single-spin excitation experiments where 40 polarisation cycles interleaved between the $\omega_b$ and $\omega_c$ transitions are sufficient to polarise the register into $|0_v\rangle=|\downarrow\downarrow\downarrow\downarrow\downarrow\rangle$. Based on simulations discussed in Supplementary Information, we estimate this protocol achieves $\approx84\%$ polarisation into the $|0_v\rangle$ state. Note the ZenPol sequence is not used to directly polarise the $\omega_a$ transition due to spectral overlap with $\omega_b$ and $\omega_c$ (FIG. 2b). We postulate that the high degree of polarisation can still be achieved even in the absence of direct $\omega_a$ transition control due to two factors:

1 The thermalisation timescale of the $\omega_a$ transition is significantly shorter than the interrogation time. Specifically, our experiments typically run for several minutes whereas the $\omega_a$ thermalisation rate is likely similar to $T_1^{(0)}=0.54$ s. Thus, undesired population in the $|\pm1/2\rangle$ level can still pumped to $|\pm7/2\rangle$ once it relaxes to $|\pm3/2\rangle$.

2 Once successfully initialised into the $\omega_c$ manifold the probability of shelving into the $|\pm1/2\rangle$ level is small as it necessitates two consecutive decays on the $\omega_b$ and $\omega_a$ transitions, both of which are considerably slower than our experiment/polarisation repetition rate (20 ms).

We tried to improve the polarisation fidelity by incorporating direct driving on the $\omega_a$ transition during the polarisation protocol. This leads to fast population exchange between $|\pm1/2\rangle$ and $|\pm3/2\rangle$, however, there was no improvement to the contrast of the resulting spin exchange oscillations thereby indicating that shelving into $|\pm1/2\rangle$ is not a limiting factor in our experiments.

g. Analysis of Spin Exchange Dynamics

In this section, an analysis of the spin exchange dynamics on the $\omega_c$ register transition is presented. The spin-exchange measurements in FIG. 2c are measured at a fixed ZenPol period of $2\tau=5.048$ µs leading to resonant interactions with the 991 kHz $\omega_c$-transition. However, analogous to the Rabi oscillations in a two-level system, the oscillation frequency and contrast of these spin transfer oscillations also depend on the detuning of the ZenPol sequence relative to the $^{51}$V transition. Specifically, we expect the following relations:

$$J_{ex}(\delta) = \sqrt{J_{ex}(0)^2 + \delta^2}$$

$$C(\delta) = \frac{J_{ex}(0)^2}{J_{ex}(0)^2 + \delta^2}$$

Figure 10C:
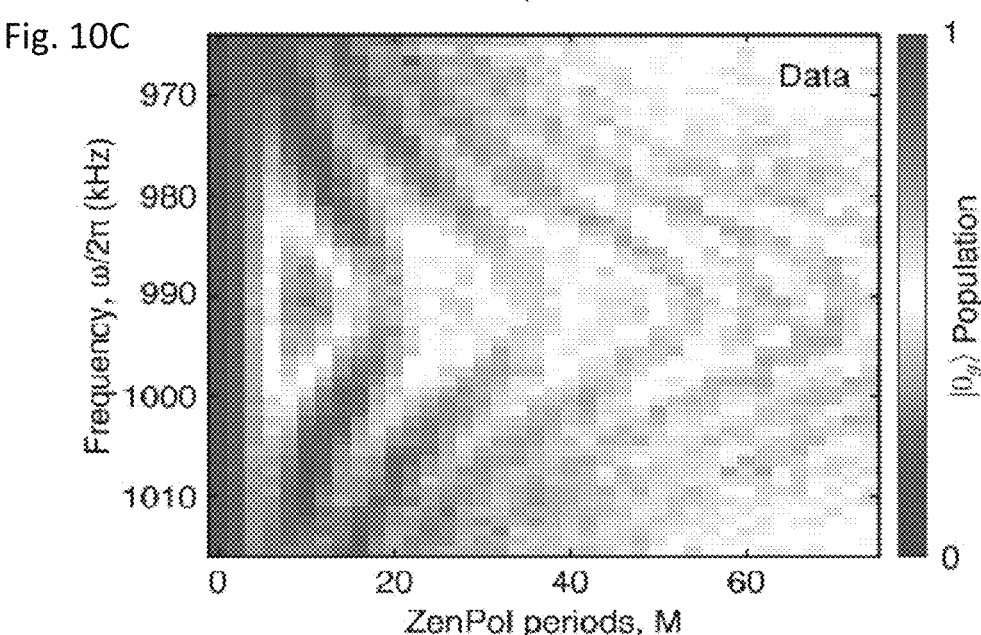

Here $J_{ex}$ and C are the spin-exchange frequency and oscillation contrast, respectively, and $\delta$ is the detuning of the ZenPol sequence resonance relative to a target nuclear spin transition. The register is polarized into $|0_v\rangle$ and FIG. 10C shows measurement of the frequency detuning dependence of the spin-exchange oscillations. These results agree well with the corresponding simulations shown in FIG. 10c.

Figure 10D:
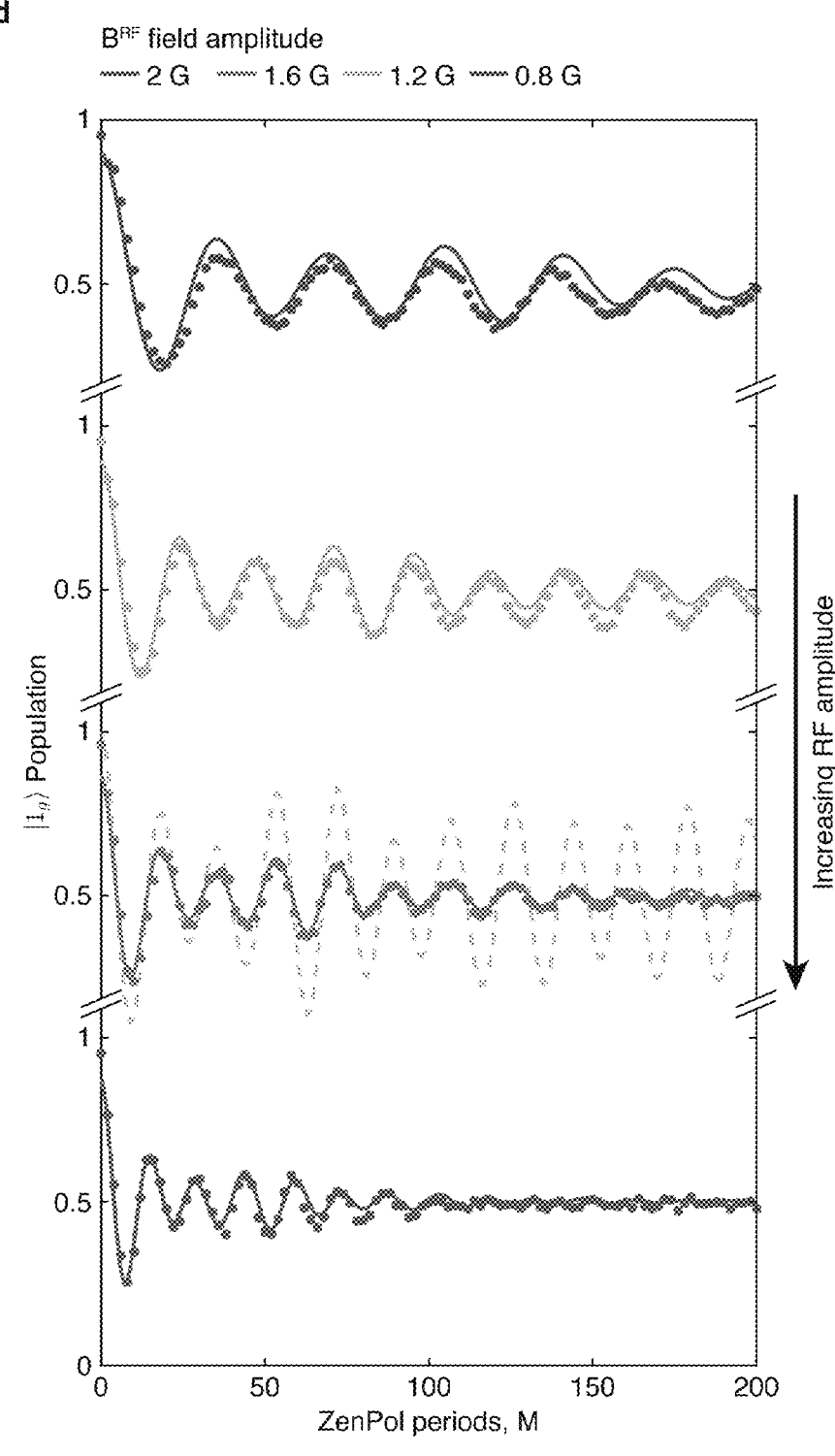

Control of the spin exchange frequency by varying the RF magnetic field amplitude ($B^{RF}$) is also demonstrated. FIG. 10D shows the spin-exchange dynamics for four different values of $B^{RF}=0.8$G, 1.2G, 1.6G and 2.0 G. The inset in FIG. 2C plots extracted spin exchange frequencies $J_{ex}$ for a range of different $B^{RF}$ demonstrating linear dependence as expected and leading to accurate control of the engineered interaction strength (see First Example for details).

h. Single Excitation in $\omega_c$ Manifold

The ability to shelve populations in different quadrupole levels enables the operation of the $^{51}$V register with an alternative set of many-body states: $|0_v'\rangle$ and $|1_v'\rangle$. For this experiment the $^{51}$V spins are polarized down the energy ladder on the $\omega_b$ and $\omega_c$ transitions leading to polarisation primarily into the $|\pm3/2\rangle$level, with a small residual population in $|\pm1/2\rangle$. For the purpose of this analysis, perfect polarisation into $|\pm3/2\rangle$ is assumed, however $\omega_a$ transition polarisation/addressability would be required for this.

The register $|1_v'\rangle$ state is prepared by injecting a single spin excitation on the $\omega_b$ transition (i.e. from $|\pm3/2\rangle\rightarrow|\uparrow\rangle=|\pm5/2\rangle$), this is achieved using the corresponding ZenPol resonance at $\omega_b$, k=3:

$$|1_v'\rangle = \frac{1}{2}\left(\left|\uparrow,\frac{3}{2},\frac{3}{2},\frac{3}{2}\right\rangle + \left|\frac{3}{2},\uparrow,\frac{3}{2},\frac{3}{2}\right\rangle + \left|\frac{3}{2},\frac{3}{2},\uparrow,\frac{3}{2}\right\rangle + \left|\frac{3}{2},\frac{3}{2},\frac{3}{2},\uparrow\right\rangle\right)$$

Here the $\pm$ sign is omitted in the state label for simplicity.

Subsequently, the $^{171}$Yb in $|0_g\rangle$ and induce a spin exchange

41 oscillation between $|\!\uparrow\rangle$ and $|\!\downarrow\rangle=|\pm7/2\rangle$ via a ZenPol sequence resonant with the $\omega_c$ transition. The resulting time evolution is given by $$|\psi(t)\rangle = |0_g\rangle|1_v'\rangle\cos\left(\frac{J_{ex}'t}{2}\right) - i|1_g\rangle|0_v'\rangle\sin\left(\frac{J_{ex}'t}{2}\right)$$

where $$|0_v'\rangle = \frac{1}{2}\left(\left|\downarrow, \frac{3}{2}, \frac{3}{2}, \frac{3}{2}\right\rangle + \left|\frac{3}{2}, \downarrow, \frac{3}{2}, \frac{3}{2}\right\rangle + \left|\frac{3}{2}, \frac{3}{2}, \downarrow, \frac{3}{2}\right\rangle + \left|\frac{3}{2}, \frac{3}{2}, \frac{3}{2}, \downarrow\right\rangle\right)$$

and $J_{ex}=2b_{(k,\omega_c)}B^{RF}$ with k=5. Notice that the spin-exchange oscillation rate, $J_{ex}'$, no longer has a $\sqrt{N}$ rate enhancement, this is because every ket in the $|1_v'\rangle$ and $|0_v'\rangle$ states contains only a single spin in the $\omega_c$-transition manifold. Using this manifold for information storage would have several benefits. For instance, direct microwave driving of the register $\omega_c$-transition would lead to Rabi oscillation between $|0_v'\rangle$ and $|1_v'\rangle$ and could therefore be used to realise local gates in this basis. Additionally, a second spin excitation is not allowed in this scheme, therefore the ZenPol sequence reproduces a complete two-qubit swap gate regardless of the $^{171}$Yb state. For these reasons, we believe that there may be some advantages to working with the $\{|0_v'\rangle, |1_v'\rangle\}$ manifold if the state initialisation fidelity into $|\pm3/2\rangle$ can be improved via direct da transition polarisation.

i. $T_2^*$ Coherence Discussion

Here we provide detailed discussions regarding the $^{51}$V register coherence decay processes described in the main text. There are two magnetic interactions which limit the $T_2^*$ dephasing timescale: (1) the direct nuclear Zeeman interaction of each register spin with the Overhauser field (equation (S20)) and (2) a contribution from the $^{171}$Yb Knight field [12]. In the latter case, the bath-induced $^{171}$Yb dipole moment generates a randomly fluctuating magnetic field at each $^{51}$V ion, the Knight field, which is described by $$\hat{H}_{nz,eff} = \pm g_{vz}\mu_N B_z^{OH} A_z \hat{I}_z$$

with $$A_z = \frac{\mu_0 \gamma_z^2 (1-3n^2)}{8\pi r^3 \omega_{01}}.$$

Here, the + and − cases in equation (S28) correspond to $^{171}$Yb in $|1_g\rangle$ and $|0_g\rangle$, respectively. The constants are defined in Supplementary Information Section. We note that $A_z$ corresponds to an effective local field amplification factor with value $A_z\approx3.1$ for the register spins. We define the $^{171}$Yb Knight field to be $\pm A_z B_z^{OH}$.

By applying periodic $\pi$ pulses to the $^{171}$Yb, we flip its state between $|0_g\rangle$ and $|1_g\rangle$, thereby switching the sign of the Knight field. This leads to the cancellation of $^{51}$V phase accumulation between successive free evolution periods, resulting in a longer coherence time. We numerically simulate the register coherence times using the method outlined in Supplementary Information Section IV. When limited by the $^{171}$Yb Knight field, simulation yields a Gaussian decay with a 1/e coherence time of 33 μs (equivalent to experimental results in FIG. 3a). We also predict an upper bound for the coherence time when decoupled from the $^{171}$Yb Knight field by turning off Hamiltonian terms associated with equation (S28), yielding an extended Gaussian decay of 417 μs (equivalent to experimental results in FIG. 3b). These simulated values are consistent with the corresponding experimental results (58±4 μs and 225±9 μs respectively) to within a factor of two. We note that this could indicate an error in our estimation of $g_{vz}$ by up to 25%, potentially caused by a small discrepancy in the position of the two $^{51}$V bath spins closest to $^{171}$Yb. Further analysis of these parameters is left for future work.

j $T_1$ Lifetime Discussion

We measure the population decay of both the $|0_v\rangle$ and $|W_v\rangle$ states (timescales $T_1^{(0)}$ and $T_1^{(W)}$ respectively) by preparing the $^{51}$V register in the appropriate state and waiting for a variable time, t, before swapping to the $^{171}$Yb for readout.

Figures 12A, 12B:
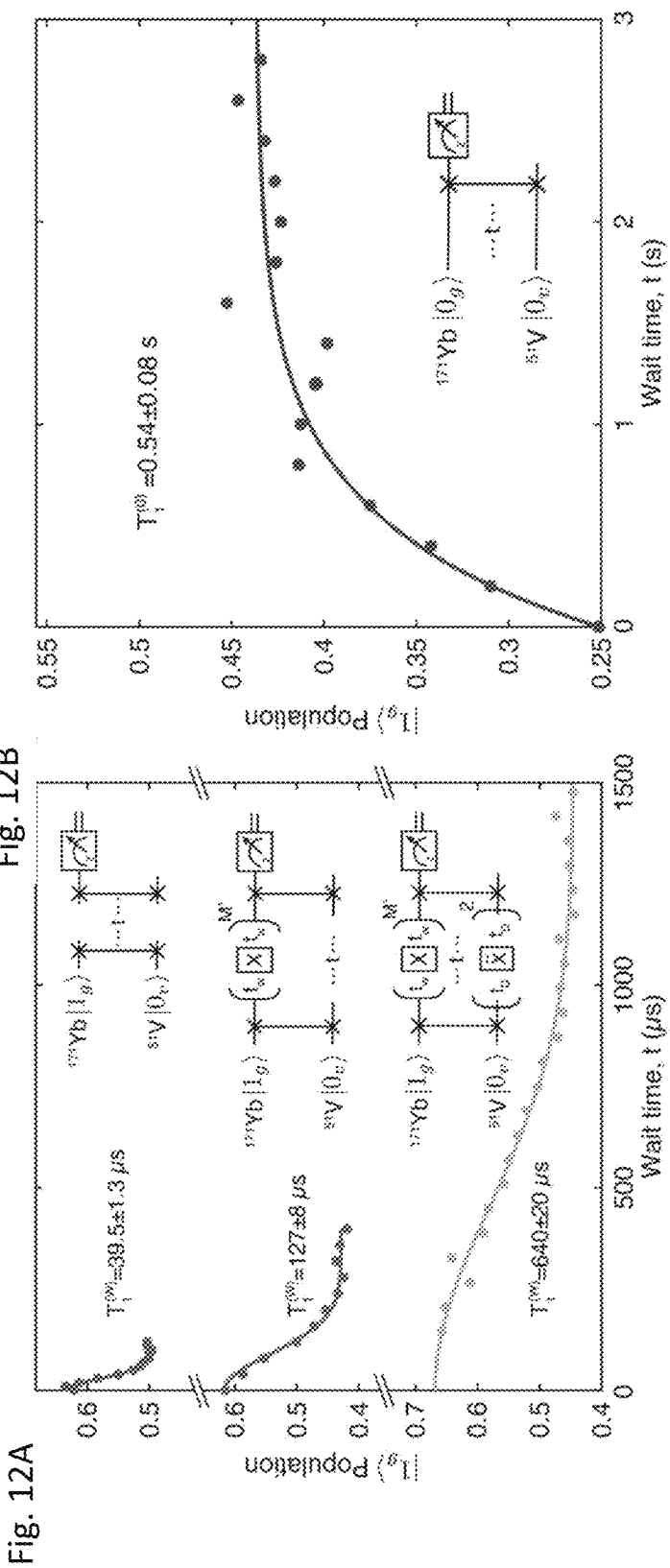
FIGS. 12A-12B. $^{51}$V spin register population relaxation.

The $|0_v\rangle$ state exhibits slow exponential decay with 1/e time constant $T_1^{(0)}=0.54\pm0.08$ s (FIG. 12b). There are two contributions which could be limiting this decay:

1 Resonant population exchange between the register spins and unpolarised frozen-core 'dark spins'. For instance, the two nearest $^{51}$V ions (ions 1 and 2 in the table in Supplementary Information Section) may interact resonantly with the neighbouring register spins. However, we cannot detect or polarise these dark spins since they only interact with the $^{171}$Yb via Ising-like $\hat{S}_z \hat{I}_z$ terms.

2 Off-resonant population exchange between the register and detuned unpolarised bath spins.

As for the $|W_v\rangle$ state, it exhibits a Gaussian decay with a much faster 1/e time constant of $T_1^{(W)}=39.5\pm1.3$ μs (FIG. 12a). This can be explained by considering the effect of dephasing on the register spins. Specifically, the $|W_v\rangle$ state which our $^{171}$Yb qubit interacts with is given as $$|W_v\rangle=\tfrac{1}{2}(|\!\uparrow\downarrow\downarrow\downarrow\rangle+|\!\downarrow\uparrow\downarrow\downarrow\rangle+|\!\downarrow\downarrow\uparrow\downarrow\rangle+|\!\downarrow\downarrow\downarrow\uparrow\rangle).$$

Crucially, there are three additional orthogonal states required to span the $^{51}$V register single excitation subspace:

$$|\alpha_v\rangle=\tfrac{1}{2}(|\!\uparrow\downarrow\downarrow\downarrow\rangle+|\!\downarrow\uparrow\downarrow\downarrow\rangle-|\!\downarrow\downarrow\uparrow\downarrow\rangle-|\!\downarrow\downarrow\downarrow\uparrow\rangle).$$

$$|\beta_v\rangle=\tfrac{1}{2}(|\!\uparrow\downarrow\downarrow\downarrow\rangle-|\!\downarrow\uparrow\downarrow\downarrow\rangle+|\!\downarrow\downarrow\uparrow\downarrow\rangle-|\!\downarrow\downarrow\downarrow\uparrow\rangle).$$

$$|\gamma_v\rangle=\tfrac{1}{2}(|\!\uparrow\downarrow\downarrow\downarrow\rangle-|\!\downarrow\uparrow\downarrow\downarrow\rangle-|\!\downarrow\downarrow\uparrow\downarrow\rangle+|\!\downarrow\downarrow\downarrow\uparrow\rangle).$$

We assume uncorrelated noise at each of the four $^{51}$V spins and apply a pure-dephasing master equation model. In the single excitation subspace, this becomes:

$$\dot{\rho} = 2\Gamma[\mathcal{D}(|\!\uparrow\downarrow\downarrow\downarrow\rangle\langle\uparrow\downarrow\downarrow\downarrow|) + \mathcal{D}(|\!\downarrow\uparrow\downarrow\downarrow\rangle\langle\downarrow\uparrow\downarrow\downarrow|) + \mathcal{D}(|\!\downarrow\downarrow\uparrow\downarrow\rangle$$
$$\langle\downarrow\downarrow\uparrow\downarrow|) + \mathcal{D}(|\!\downarrow\downarrow\downarrow\uparrow\rangle\langle\downarrow\downarrow\downarrow\uparrow|)]\rho$$

where the dephasing channel (Lindbladian) is given by $$\mathcal{D}(\hat{a})\rho=\hat{a}\rho\hat{a}^\dagger-\tfrac{1}{2}\{\hat{a}^\dagger\hat{a},\rho\}$$

and $\Gamma$ is the dephasing rate on the $\omega_c$ transition of a single $^{51}$V spin. We solve this equation for different initial states $\rho(0)$. When $\rho(0)=|0_v\rangle\langle0_v|$, dephasing does not contribute to $T_1^{(0)}$, i.e. $\rho(t)=\rho(0)$. However, when $\rho(0)=|W_\nu\rangle\langle W_\nu|$ the state evolves according to $\rho(t)=|W_\nu\rangle\langle W_\nu|e^{-2\Gamma t}+\frac{1}{4}(1-e^{-2\Gamma t})\mathbb{1}^{(SEM)}$ where $\mathbb{1}^{(SEM)}$ is the single excitation manifold identity operator:

$\mathbb{1}^{(SEM)}=|W_\nu\rangle\langle W_\nu|+|\alpha_\nu\rangle\langle\alpha_\nu|+|\beta_\nu\rangle\langle\beta_\nu|+|\gamma_\nu\rangle\langle\gamma_\nu|$ i.e. dephasing leads to decay of $|W_\nu\rangle$ into $\mathbb{1}^{(SEM)}$ at rate $2\Gamma$. For completeness we also consider the decay of the off-diagonal coherence term $\rho_{01}=>0_\nu|\rho|W_\nu\rangle$ and find that $\rho_{01}(t)=\rho_{01}(0)e^{-\Gamma t}$.

Essentially, the pure dephasing model predicts $T_2^*=2T_1^{(W)}$ for our system.

We verify that dephasing is the main source of $|W_\nu\rangle$ population decay by demonstrating lifetime extension using the same motional narrowing approach employed to improve the coherence time. Specifically, during the wait time, we apply a series of $\pi$ pulses to the $^{171}$Yb separated by 6 μs leading to an extended lifetime of $T_1^{(W)}=127\pm8$ μs (FIG. 12a). We note that both the bare and motionally-narrowed $T_1^{(W)}$ and $T_2^*$ times are close to the $T_2^*=2T_1^{(W)}$ limit identified above. We further extend the $T_1^{(W)}$ lifetime to $640\pm20$ μs using two $^{51}$V $\pi$ pulses applied during the wait time, thereby achieving dynamical decoupling from the nuclear Overhauser field (equivalent to the results in FIG. 3c).

Finally we note that if $T_1^{(W)}$ is limited by the $^{171}$Yb Knight field as a common noise source, there may be some discrepancy in the predictions of this model due to a high degree of noise correlation between the four $^{51}$V register spins arising from lattice symmetry. However, when performing motional narrowing we decouple the $^{171}$Yb Knight field and are likely limited by the, considerably less correlated, local Overhauser field.

k. Parity Oscillations and Coherence

Here we derive an expression for the $^{171}$Yb $^{51}$V Bell-state coherence $\rho_{01}=\langle 1_g 0_\nu|\rho|0_g W_\nu\rangle$ in terms of the parity oscillation contrast with a correction factor. In particular, when reading out this coherence, we apply a $\sqrt{swap}$ gate which maps $|\Psi^+\rangle=\frac{1}{2}(|1_g 0_\nu\rangle-i|0_g W_\nu\rangle)$ to $|0_g W_\nu\rangle$ and $|\Psi^-\rangle=\frac{1}{2}(|1_g 0_\nu\rangle+i|0_g W_\nu\rangle)$ to $|1_g 0_\nu\rangle$. Note that reading out the $^{171}$Yb state is sufficient to distinguish the $|\Psi^+\rangle$ and $|\Psi^-\rangle$ states in this measurement. We can account for the readout fidelity of the $|\Psi^+\rangle$ states by using a $\sqrt{\mathcal{F}_{sw,1}}$ factor (Methods), i.e. if the state $|\Psi^+\rangle(|\Psi^-\rangle)$ is perfectly prepared, $^{171}$Yb will be measured in state $|0_g\rangle(|1_g\rangle)$ with probability $\frac{1}{2}(1+\sqrt{\mathcal{F}_{sw,1}})$. To span the $^{171}$Yb$-^{51}$V Hilbert space, we also need to consider the effect of the readout $\sqrt{swap}$ gate when the system is initialised into the other two states: $|1_g W_\nu\rangle$ or $|0_g 0_\nu\rangle$. To this end, we assign imperfect readout probabilities of $q_{11}$ and $q_{00}$ for $|1_g W_\nu\rangle$ and $|0_g 0_\nu\rangle$, respectively.

Specifically, we can represent the dependence of the parity readout on the input state using the following matrix relation:

$$\begin{pmatrix} p_{1,Yb} \\ p_{0,Yb} \end{pmatrix} = \mathcal{M}_{swap}\mathcal{M}_{wait}\begin{pmatrix} p_{11} \\ p_{\Psi^+} \\ p_{\Psi^-} \\ p_{00} \end{pmatrix}$$

with $$\mathcal{M}_{swap} = \begin{pmatrix} q_{11} & \frac{1}{2}(1-\sqrt{\mathcal{F}_{sw,1}}) & \frac{1}{2}(1+\sqrt{\mathcal{F}_{sw,1}}) & 1-q_{00} \\ 1-q_{11} & \frac{1}{2}(1+\sqrt{\mathcal{F}_{sw,1}}) & \frac{1}{2}(1-\sqrt{\mathcal{F}_{sw,1}}) & q_{00} \end{pmatrix}$$

$$\mathcal{M}_{wait} = \begin{pmatrix} 1 & 0 & 0 & 0 \\ 0 & \cos^2(\omega_c t/2) & \sin^2(\omega_c t/2) & 0 \\ 0 & \sin^2(\omega_c t/2) & \cos^2(o_c t/2) & 0 \\ 0 & 0 & 0 & 1 \end{pmatrix}$$

Here $p_{1,Yb}$ and $p_{0,Yb}$ are the probabilities of measuring the $^{171}$Yb qubit in $|1_g\rangle$ and $|0_g\rangle$, respectively, and $p_{\Psi\pm}=\langle\Psi^\pm|\rho|\Psi^\pm\rangle$ are the probabilities of being in the $|\Psi^\pm\rangle$ Bell states. The contrast $C_{parity}$ of the parity oscillation between $|^+\rangle$ and $|\Psi^-\rangle$ is extracted by measuring the difference in the $^{171}$Yb$|1_g\rangle$ populations measured at t=0 and $t=\pi/\omega_c$, allowing us to estimate the Bell state coherence as $|\rho_{01}|=C_{parity}/2\sqrt{\mathcal{F}_{sw,1}}$. This implies that uncorrected and corrected Bell state coherence values differ by a factor of $\sqrt{\mathcal{F}_{sw,1}}=0.72$. Using the results presented in FIG. 4 b we obtain corrected and uncorrected estimates for $|\rho_{01}|$ of $0.352\pm0.004$ and $0.254\pm0.003$ respectively.

1. Bell State Fidelity Error Analysis

To extract the Bell state fidelity and uncertainty, we perform a maximum likelihood analysis of the population and parity oscillation measurements, adopting a similar approach as in [13]. The population measurement involves a series of n experiments with outcomes distributed between the four population states: $\{n_{00}, n_{01}, n_{10}, n_{11}\}$ where $n=n_{00}+n_{01}+n_{10}+n_{11}$. The likelihood function for the uncorrected populations, $\{p_{00}, p_{01}, p_{10}, p_{11}\}$ has multinomial form:

$$\mathcal{L}(\{p_{ij}\}\,|\,\{n_{ij}\}) = \frac{n!}{n_{00}!n_{01}!n_{10}!n_{11}!}p_{00}^{n_{00}}p_{01}^{n_{01}}p_{10}^{n_{10}}p_{11}^{n_{11}}$$

where we have assumed a prior uniform over the physical values of $\{p_{ij}\}$, i.e. $0\leq p_{ij}\leq1$ and $\Sigma p_{ij}=1$. The likelihood function for the corrected populations, $\{c_{00}, c_{01}, c_{10}, c_{11}\}$, is obtained by substituting equation (11) into equation (S35) and assuming a prior uniform over the physical values of $\{c_{ij}\}$, i.e. $0\leq c_{ij}\leq1$ and $\Sigma c_{ij}=1$. Corrected populations are obtained by maximising this likelihood function. The error for a specific population (say $c_{00}$) is obtained by marginalising $\mathcal{L}(\{c_{ij}\}|\{n_{ij}\})$ over the other three ($c_{01}$, $c_{10}$, $c_{11}$) and taking a 68% symmetric confidence interval.

We extract a likelihood function for the coherence by considering the following model:

$y_i=0.5+\sqrt{\mathcal{F}_{sw,1}}\rho_{01}\cos(\omega_c t_i)+\epsilon_i$ where $\{t_i, y_i\}$ are the parity oscillation data at the $i^{th}$ point, $\rho_{01}$ is the corrected coherence, $\mathcal{F}_{sw,1}$ is the parity oscillation correction factor associated with the swap gate infidelity, and $\epsilon_i$ is the experimental error assumed to be normally distributed with $\mu=0$ and unknown $\sigma$. The likelihood function is given by $$\mathcal{L}(\rho_{01}, \sigma|\{t_i, y_i\}) = \prod_i \frac{1}{\sqrt{2\pi}\sigma} \exp\left[\frac{\left(y_i - 0.5 - \sqrt{\mathcal{F}_{sw,1}}\,\rho_{01}\cos\left(\omega_c t_i\right)\right)^2}{2\sigma^2}\right].$$

We obtain a likelihood for the corrected coherence, $\mathcal{L}(\rho_{01}|\{t_i, y_i\})$ by marginalising over $\sigma$.

The likelihood function for the fidelity is obtained by taking a product of the likelihood function for the populations with the likelihood function for the coherence and evaluating a contour integral at constant $\mathcal{F}$, given as $$\mathcal{L}(\mathcal{F}) = \int_{\mathcal{F}} \mathcal{L}(\{c_{ij}\}|\{n_{ij}\})\mathcal{L}(\rho_{01}|\{t_i, y_i\})d\rho_{01}\prod_{ij}dc_{ij}.$$

The Bell state fidelity is extracted by maximising this likelihood and the error is evaluated as a symmetric 68% confidence interval.

Hardware Environment

Figure 15:
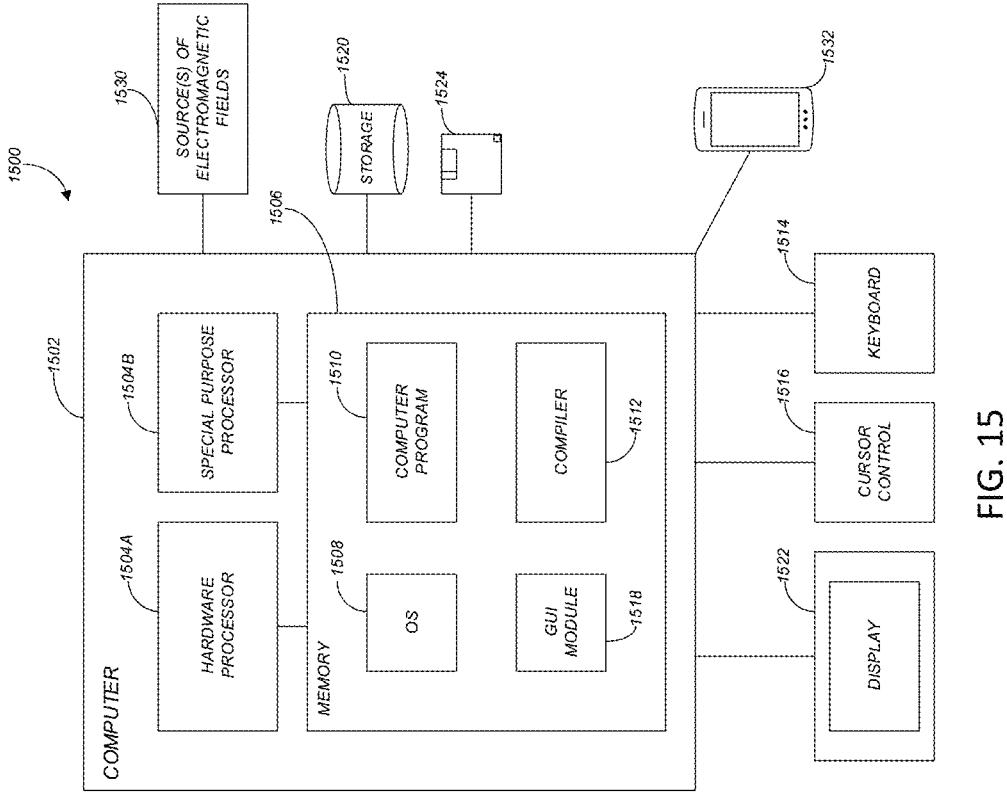
FIG. 15. Hardware environment for implementing one or more embodiments of the present invention.

FIG. 15 is an exemplary hardware and software environment 1500 (referred to as a computer-implemented system and/or computer-implemented method) used to implement one or more embodiments of the invention. The hardware and software environment includes a computer 1502 and may include peripherals. Computer 1502 may be a user/client computer, server computer, or may be a database computer. The computer 1502 comprises a hardware processor 1504A and/or a special purpose hardware processor 1504B (hereinafter alternatively collectively referred to as processor 1504) and a memory 1506, such as random access memory (RAM). The computer 1502 may be coupled to, and/or integrated with, other devices, including input/output (I/O) devices such as a keyboard 1514, a cursor control device 1516 (e.g., a mouse) a pointing device, pen and tablet, touch screen, multi-touch device, etc.) and a printer 1528. In one or more embodiments, computer 1502 may be coupled to, or may comprise, a portable or media viewing/listening device 1532. In yet another embodiment, the computer 1502 may comprise a multi-touch device, mobile phone, or other internet enabled device executing on various platforms and operating systems.

In one embodiment, the computer 1502 operates by the hardware processor 1504A performing instructions defined by the computer program 1510 under control of an operating system 1508. The computer program 1510 and/or the operating system 1508 may be stored in the memory 1506 and may interface with the user and/or other devices to accept input and commands and, based on such input and commands and the instructions defined by the computer program 1510 and operating system 1508, to provide output and results.

Output/results may be presented on the display 1522 or provided to another device for presentation or further processing or action. The image may be provided through a graphical user interface (GUI) module 1518. Although the GUI module 1518 is depicted as a separate module, the instructions performing the GUI functions can be resident or distributed in the operating system 1508, the computer program 1510, or implemented with special purpose memory and processors.

Some or all of the operations performed by the computer 1502 according to the computer program 1510 instructions may be implemented in a special purpose processor 1504B. In this embodiment, some or all of the computer program 1510 instructions may be implemented via firmware instructions stored in a read only memory (ROM), a programmable read only memory (PROM) or flash memory within the special purpose processor 1504B or in memory 1506. The special purpose processor 1504B may also be hardwired through circuit design to perform some or all of the operations to implement the present invention. Further, the special purpose processor 1504B may be a hybrid processor, which includes dedicated circuitry for performing a subset of functions, and other circuits for performing more general functions such as responding to computer program 1510 instructions. In one embodiment, the special purpose processor 1504B is an application specific integrated circuit (ASIC) or field programmable gate array (FPGA). In other examples, special purpose processor may comprise a graphics processing unit (GPU).

The computer 1502 may also implement a compiler 1512 that allows an application or computer program 1510 written in a programming language such as C, C++, Assembly, SQL, PYTHON, PROLOG, MATLAB, RUBY, RAILS, HASKELL, or other language to be translated into processor 1504 readable code. Alternatively, the compiler 1512 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1510 accesses and manipulates data accepted from I/O devices and stored in the memory 1506 of the computer 1502 using the relationships and logic that were generated using the compiler 1512.

The computer 1502 also optionally comprises an external communication device such as a modem, satellite link, Ethernet card, or other device for accepting input from, and providing output to, other computers 1502.

In one embodiment, instructions implementing the operating system 1508, the computer program 1510, and the compiler 1512 are tangibly embodied in a non-transitory computer-readable medium, e.g., data storage device 1520, which could include one or more fixed or removable data storage devices, such as a zip drive, floppy disc drive 1524, hard drive, CD-ROM drive, tape drive, etc. Further, the operating system 1508 and the computer program 1510 are comprised of computer program 1510 instructions which, when accessed, read and executed by the computer 1502, cause the computer 1502 to perform the steps necessary to implement and/or use the present invention or to load the program of instructions into a memory 1506, thus creating a special purpose data structure causing the computer 1502 to operate as a specially programmed computer executing the protocol or method steps described herein. Computer program 1510 and/or operating instructions may also be tangibly embodied in memory 1506 and/or embodied in or coupled to source 1530 of the pulses 202 comprising electromagnetic fields (e.g., 1530 may comprise sources 500, 506), thereby making a computer program product or article of manufacture according to the invention. As such, the terms "article of manufacture," "program storage device," and "computer program product," as used herein, are intended to encompass a computer program accessible from any computer readable device or media. Computer 1500 may comprise or be coupled to 1530.

Of course, those skilled in the art will recognize that any combination of the above components, or any number of different components, peripherals, and other devices, may be used with the computer 1502.

Figure 16:
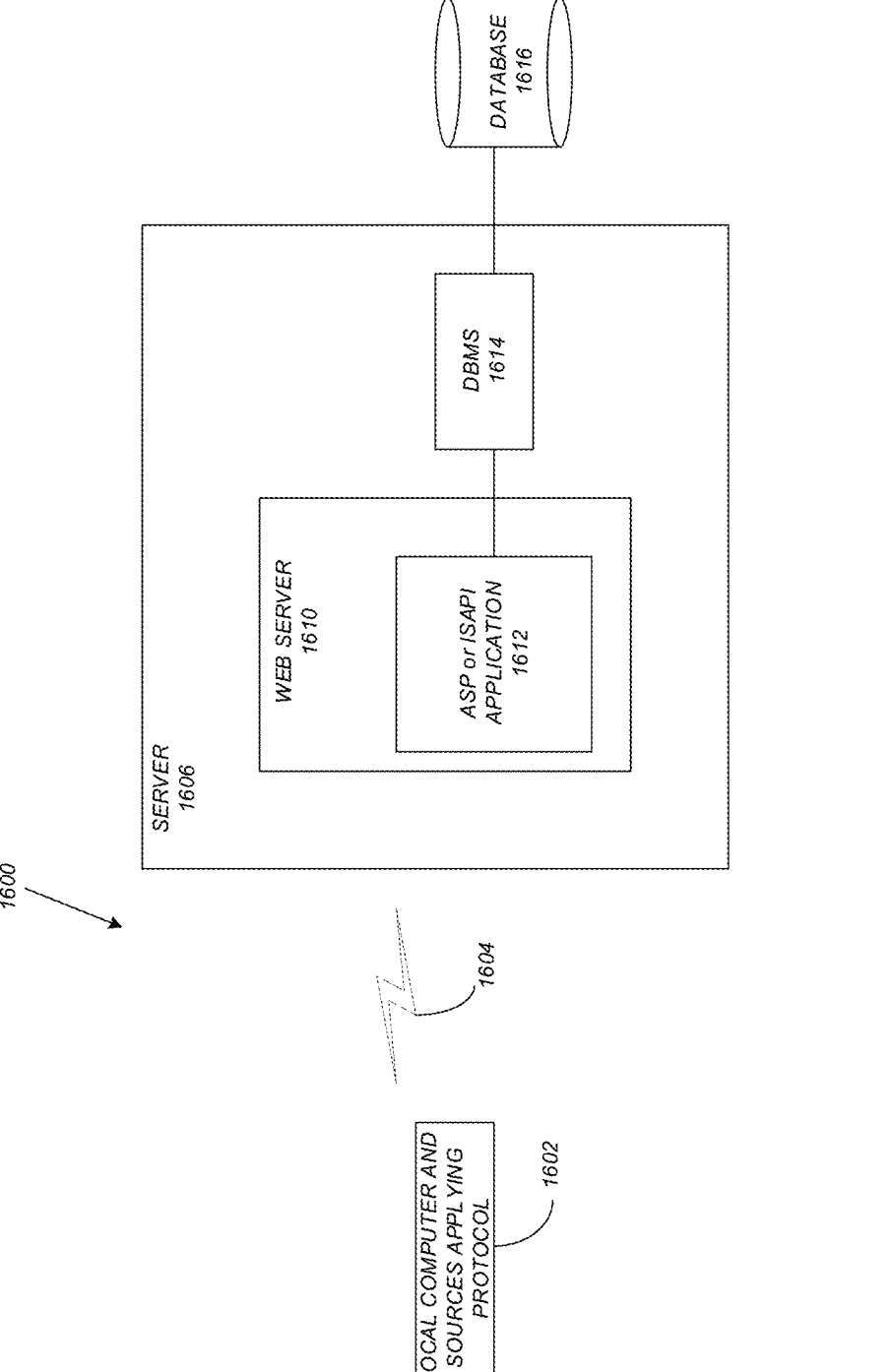
FIG. 16. Network environment for implementing one or more embodiments of the present invention.

FIG. 16 schematically illustrates a typical distributed/ cloud-based computer system 1600 using a network 1604 to connect client computers 1602 to server computers 1606. A typical combination of resources may include a network 1604 comprising the Internet, LANs (local area networks), WANs (wide area networks), SNA (systems network architecture) networks, or the like, clients 1602 that are personal computers or workstations (as set forth in FIG. 15), and servers 1606 that are personal computers, workstations, minicomputers, or mainframes (as set forth in FIG. 15). However, it may be noted that different networks such as a cellular network (e.g., GSM [global system for mobile communications] or otherwise), a satellite based network, or any other type of network may be used to connect clients 1602 and servers 1606 in accordance with embodiments of the invention.

A network 1604 such as the Internet connects clients 1602 to server computers 1606. Network 1604 may utilize ethernet, coaxial cable, wireless communications, radio frequency (RF), etc. to connect and provide the communication between clients 1602 and servers 1606. Further, in a cloud-based computing system, resources (e.g., storage, processors, applications, memory, infrastructure, etc.) in clients 1602 and server computers 1606 may be shared by clients 1602, server computers 1606, and users across one or more networks. Resources may be shared by multiple users and can be dynamically reallocated per demand. In this regard, cloud computing may be referred to as a model for enabling access to a shared pool of configurable computing resources.

Clients 1602 may execute a client application or web browser and communicate with server computers 1606 executing web servers 1610. Such a web browser is typically a program such as MICROSOFT INTERNET EXPLORER/ EDGE, MOZILLA FIREFOX, OPERA, APPLE SAFARI, GOOGLE CHROME, etc. Further, the software executing on clients 1602 may be downloaded from server computer 1606 to client computers 1602 and installed as a plug-in or ACTIVEX control of a web browser. Accordingly, clients 1602 may utilize ACTIVEX components/component object model (COM) or distributed COM (DCOM) components to provide a user interface on a display of client 1602. The web server 1610 is typically a program such as MICROSOFT'S INTERNET INFORMATION SERVER.

Web server 1610 may host an Active Server Page (ASP) or Internet Server Application Programming Interface (ISAPI) application 1612, which may be executing scripts. Generally, these components 1600-1616 all comprise logic and/or data that is embodied in/or retrievable from device, medium, signal, or carrier, e.g., a data storage device, a data communications device, a remote computer or, device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1602 and 1606 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1602 and 1606. Embodiments of the invention are implemented as a software protocol application on a client 1602 or server computer 1606. Further, as described above, the client 1602 or server computer 1606 may comprise a thin client device or a portable device that has a multi-touch-based display.

Process Steps

Method of Making a Register

Figure 17A:
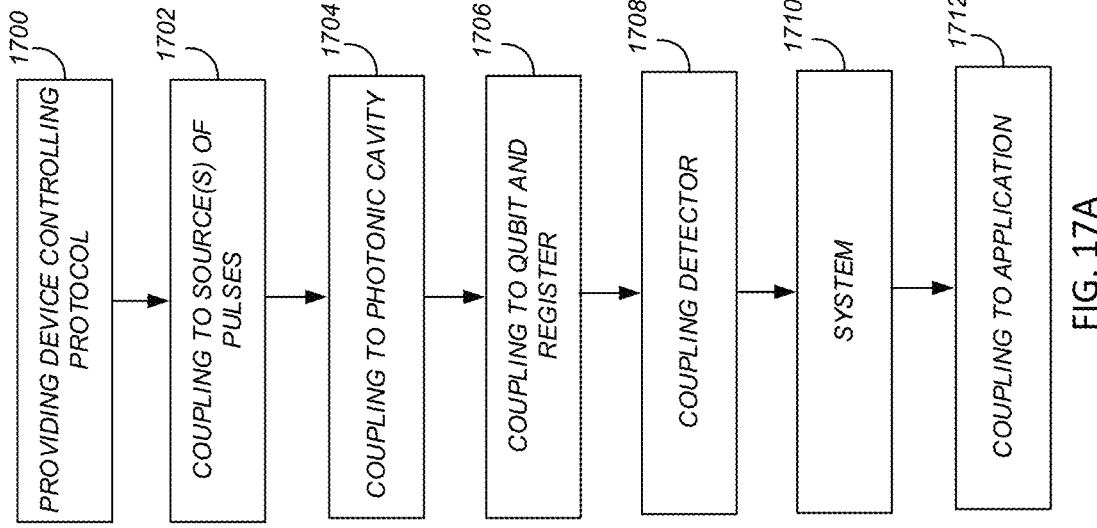
FIG. 17A. Flowchart illustrating a method for making a system according to one or more embodiments described herein.

FIG. 17A illustrates a method of making a system for implementing a quantum register. The method comprises the following steps.

Block 1700 represents obtaining or providing a device 1500 for coupling a qubit to a register. The device comprises one or more circuits or a computer 1502 configured to control a protocol 200 comprising a sequence 201 of pulses 202 synchronized with an RF field 204. Controlling the protocol comprises configuring (e.g., selecting, setting, or programming) a timing (e.g., spacing $\tau/4$ relative to other pulses and RF field), a phase ($+/-$x., $+/-$y), and a duration (pi, pi/2) of each of the pulses comprising a single qubit gate, a period $\tau$, 210, and amplitude $B^{RF}$ of the RF field, and a number of cycles M of the sequence, so that application of the protocol 200 controls a coherent spin exchange interaction $\tilde{S}_+\tilde{I}_-+\tilde{S}_-\tilde{I}_+$ between a register 206 and a qubit 208 having a zero magnetic dipole moment.

In one or more embodiments, the device comprises at least one of a signal generator, arbitrary waveform generator (e.g., comprising FPGA and digital to analog converter), or amplifier comprising the one or more circuits (e.g., as an embedded circuit or processor) outputting control signals that are used to control the output of the pulses (comprising the electromagnetic fields) and the RF field from one or more sources (e.g., lasers, microwave sources, or RF generator). In one or more examples, the sources of the pulses and RF field (e.g., the laser(s) and microwave source(s) and RF source) comprise the one or more circuits, e.g., as an embedded system or processor, e.g., so as to form smart or programmable sources. The one or more circuits may be in central controller or distributed among the sources. In one or more examples, the arbitrary waveform generator (AWG) comprises the microwave sources and RF sources outputting the microwave pulses and RF field, and the AWG outputs timing control signals to the laser sources.

In one or more examples, the device comprises a computer comprising or coupled to one or more processors; one or more memories; and one or more programs stored in the one or more memories, wherein the one or more programs executed by the one or more processors control the implementation of the protocol.

In one or more examples, the device comprises an application specific integrated circuit or field programmable gate array controlling the implementation of the protocol. In one or more examples, the one or more circuits comprise one or more timing circuits or a clock or a clock signal generator.

Block 1702 represents optionally coupling the device to one or more sources of electromagnetic fields. The one or more sources output the pulses comprising an electromagnetic field having a frequency (e.g., $f_g$ in FIG. 5a) tuned to excite a transition between the first spin state and the second spin state.

Block 1704 represents optionally coupling the one or more sources to a photonic cavity.

Block 1706 represents optionally coupling the one or more sources to the qubit coupled to the register, e.g., via the photonic crystal. In one or more examples the qubit and the register are coupled, combined, or integrated with the photonic cavity.

The qubit comprises a first spin state (e.g., $|0_g\rangle$) having a zero magnetic dipole moment and a second spin state (e.g., $|1_g\rangle$ having a zero magnetic dipole moment). The register comprises multiple register spins 100 having an energy level structure 102, wherein the register spins are indistinguishable so as to be configurable in basis states including a superposition state $|W_v\rangle$ used for storing the quantum state of the qubit.

A variety of systems including, but not limited to, solid state materials, can be used to implement the qubit and the register. In one example, the system comprises a spin carrying defect (e.g., an ion or nitrogen vacancy) in a host lattice (e.g., a crystal), wherein the spin carrying defect comprises the qubit and the host lattice comprises the register. Various rare earth doped crystals can be used. In one or more examples, the qubit ion comprising the qubit is Yb, Er, or Eu doped in a host crystal comprising register ions 122 surrounding the qubit ion. Examples include, but are not limited to, Yb:YVO (as described in the first example), Er:$Y_2SiO_5$, or Eu:$Y_2SiO_5$). In another example, the system comprise a quantum dot in a host lattice, wherein the quantum dot (e.g., InGaAs or other semiconductor quantum dot) comprises the qubit and the host lattice (e.g., InGaAs or other semiconductor) comprises the register.

Block 1708 represents optionally coupling the qubit to a detector.

Block 1710 represents the end result, a system for coupling the qubit to a register. The system can be embodied in many ways, including, but not limited to, the following examples.

1. FIG. 15, FIG. 2, and FIG. 1 illustrate examples of a means for, or a device 1500 for coupling a qubit to a register, comprising a circuit or computer 1502 controlling a protocol 200 comprising a sequence 201 of pulses 202 synchronized with an RF field 204. Controlling the protocol comprises configuring (e.g., selecting, setting, or programming) a timing (e.g., spacing $\tau/4$ relative to other pulses and RF field), a phase (+/−x., +/−y), and a duration (pi, pi/2) of each of the pulses comprising a single qubit gate, a period $\tau$ and amplitude $B^{RF}$ of the RF field, and a number of cycles M of the sequence, so that application of the protocol 200 controls a coherent spin exchange interaction (e.g., $\tilde{\hat{S}}_+\hat{I}_-$+ $\tilde{\hat{S}}_-\hat{I}_+$) between a register 206 and a qubit 208 having a zero magnetic dipole moment. The qubit comprises a first spin state (e.g., $|0_g\rangle$) having a zero magnetic dipole moment and a second spin state (e.g., $|1_g\rangle$ having a zero magnetic dipole moment. The register comprises multiple register spins 100 having an energy level structure 102, wherein the register spins are indistinguishable so as to be configurable in basis states including a superposition state $|W_v\rangle$ used for storing the quantum state of the qubit.

2. The device of example 1, wherein the protocol is configured to:
   suppress or cancel one or more non-exchange interactions between the register and the qubit,
   suppress or cancel noise coupled to the qubit and causing decoherence of a quantum state of the qubit,
   enable the coherent spin exchange interaction that performs a quantum logic gate (e.g., a Clifford gate Uc as illustrated in FIG. 6), coherently transferring a quantum state of the qubit between the register and qubit.
   The non-exchange interactions arise when the $S_xI_x$ interaction is expressed in a form comprising spin preserving parts (spin exchange) and also non spin preserving parts (corresponding to the non-exchange interaction).

Figure 17B:
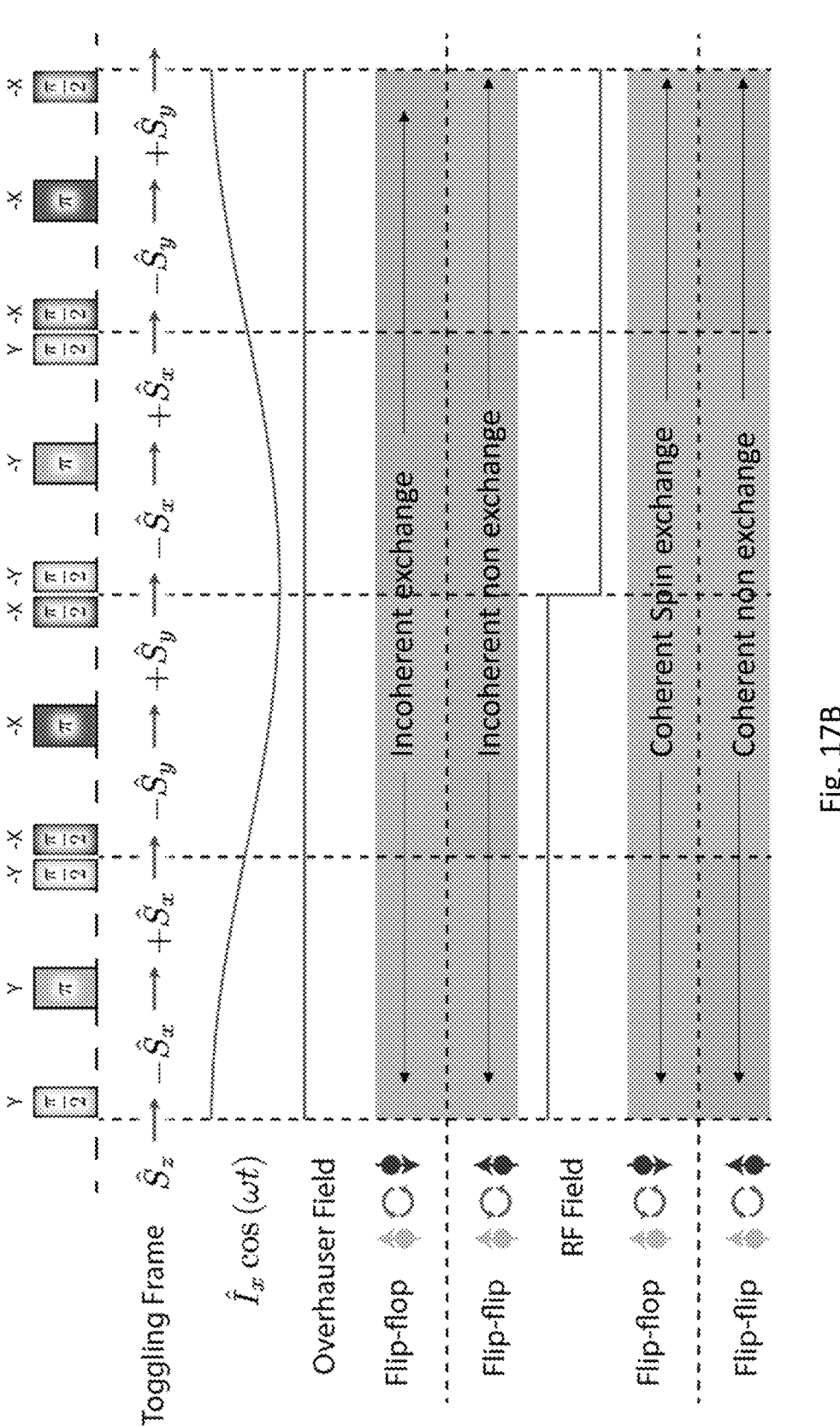
FIG. 17B. Schematic showing how the protocol using Hamiltonian engineering can be used for cancelation of non-exchange contributions of the interaction $$\hat{H} = \gamma(B_{RF}(t) + B_{OH})^2 \hat{S}_z(t) + \hat{S}_z(t)(B_{RF}(t) + B_{OH}) \sum\nolimits_{register} \left[ \alpha \hat{I}_x^{(i)}(t) + \beta \hat{I}_z^{(i)} \right]$$

3. FIG. 17B illustrates an example wherein of the device of example 1 or 2, wherein the circuit controls:
   application of a period of the protocol within a time period shorter than a rate of change of a magnetic noise (e.g., Overhauser field), so that the magnetic noise is quasi-static during the application of the period of protocol, the magnetic noise causing qubit decoherence and inducing a second order interaction (incoherent or random interaction) between the qubit and the register; and
   at least one of a phase, duration, or time spacing of the pulses in the period so that:
      one or more spin exchange interactions induced by the RF field are preserved or maintained across the period;
      one or more non-exchange interactions induced by the RF field are cancelled across the period (e.g., components of the non exchange interactions induced at different time instances in the period cancel each other, or average to zero, over the period);
      one or more (or any) exchange and one or more (or any) non-exchange interactions induced by the magnetic noise are cancelled across the period (e.g., components of these interactions induced at different time instances in the period cancel each other, or average to zero, over the period); and
   the qubit decoherence induced by the magnetic noise is cancelled over the period (e.g., decoherence induced at different time instances in the period cancel each other, or average to zero, over the period);
   the RF field toggling between two values 214 of equal magnitude and opposite polarity such that:
      the period is associated with a frequency of a precession of each of the multiple register spins about a predetermined quantization axis (e.g., determined by an electric field gradient generated by the host lattice at zero magnetic field, or the application of a magnetic field); and
      the amplitude is selected for a predetermined magnitude of the coherent spin exchange interaction between the register spins and qubit; and
   so as to form a predictable (e.g., controllable, non random, deterministic) and coherent spin exchange interaction.

4. The device of any of the examples 1-3, wherein each of the single qubit gates comprises one of the pulses having the frequency (e.g., $f_g$ in FIG. 5a) and duration (e.g., pi or pi/2) tuned to drive a transition between the first spin state and the second spin state.

6. The device of any of the examples claim 1-5 comprising a quantum memory 104, wherein the circuit:

controls application of the protocol in combination with an initialization of the qubit so as to configure the register spins in a polarized state |0v>;

controls application of one or more of the pulses to set a quantum state 106 of the qubit; and controls application of the protocol so as to apply a first swap gate 108 (two qubit gate) transferring the quantum state of the qubit from the qubit to the register, thereby changing the polarized state to a corresponding state 110 of the register spins corresponding to the quantum state; and apply a second swap gate 112 retrieving the quantum state in the qubit from the register, thereby changing the corresponding state of the register spins to the polarized state.

6. The device of any of the examples 1-5, wherein configuring the register spins in the polarized state comprises polarizing the register, which is initially in an unpolarized state comprising any configuration of excitations of the register spins, by:

(a) initializing the qubit in the first spin state by controlling application of one or more initialization pulses of one or more initialization electromagnetic fields having one or more frequencies (e.g., A, F, and fe in FIG. 5a) and tuned to initialize the quantum state of the qubit in the first spin state;

(d) applying the protocol transferring a spin excitation from the register spins to the qubit; and (e) repeating steps (a) and (b) until all excitations of the register spins are transferred from the register to the qubit and the register spins are initialized in the polarized state, as characterized by a measurement of the qubit remaining in the first spin state after step (b).

7. The device of example 5 or 6, wherein the circuit controls application of the protocol so as to apply the first swap gate mapping (via the coherent spin exchange interaction) between the qubit and the register, such that:

if the qubit is in the first spin state, the corresponding state of the register is the polarized state |0ᵥ>, if the qubit is in the second spin state, the corresponding state of the register is a W state |Wv>, and if the qubit is in a superposition of the first spin state and the second spin state, the corresponding state of the register is a superposition 110 of the polarized state and the W state, and wherein the W state is a superposition of all single spin excitation states of the register spins.

8. The device of any of the examples 1-7, wherein the circuit:

controls application of the protocol in combination with an initialization of the qubit so as to configure the register spins in a polarized state;

controls application of one or more of the pulses to set a quantum state of the qubit;

controls application of the protocol so as to apply a first square root of swap gate entangling the qubit with the register so as to form a Bell state; and controls application of the protocol so as to apply a second square root of swap gate interacting with the Bell state so as to perform a measurement of the Bell state.

9. A repeater in a quantum network comprising the device of example 8.

10. FIG. 1, FIG. 2, and FIG. 5 illustrate an example of a system 112 comprising the device 1500 of any of the examples 1-9, further comprising:

a photonic cavity 114 coupled to a solid state material comprising the qubit and the register;

one or more microwave sources 500, 502 coupled to the qubit via a microwave waveguide, the microwave sources outputting one or more first microwave pulses fe and/or one or more second microwave pulses fg;

a radio frequency source 504 outputting the RF field; and one or more laser sources 506, 508 outputting one or more laser pulses coupled to the qubit through the photonic cavity; and wherein:

the circuit controls the one or more laser sources and the one or more microwave sources so as to:

output initialization pulses comprising at least one of the one or more laser pulses A, F, or the one or more first microwave pulses fe having initialization frequencies for exciting one or more transitions initializing the qubit;

apply the protocol 200 comprising the single qubit gates comprising the second microwave pulses in synchronization with the RF field; and output one or more readout electromagnetic fields having a readout frequency A for exciting a readout transition from the second spin state to a readout state |0e>, so as to stimulate output of readout pulses 116 from the readout state.

11. The device of any of the examples 1-10, wherein:

the pulses each comprise a pi pulse or a pi/2 pulse having at least one phase selected from +x. −x, +y, or −y, and the circuit controls:

the sequence such that the period of the RF field is $2\tau$ and a spacing of the pulses is $\tau/4$, and for a given magnitude of the spin exchange interaction determined by the amplitude of the RF field, a number of repeats M of the protocol that applies at least one of a swap gate transferring a quantum state between the qubit and the register, a square root of a swap gate for forming or measuring a Bell state, or that can be used to polarize the spins into a polarized state in combination with an initialization of the qubit.

12. The device of any of the examples 1-11 wherein the circuit selects and sets the duration and the timing of each of the pulses and a toggling of the RF field to engineer the coherent spin-exchange interaction comprising:

$$\hat{S}_+\hat{I}_- + \hat{S}_-\hat{I}_+,$$

where $\hat{I}_+ = |\uparrow\rangle \langle\downarrow|$, $\hat{I}_- = |\downarrow\rangle \langle\uparrow|$ are the raising and lowering operators in an effective nuclear two-level manifold of the multiple spins in the register and $\hat{S}_\pm$ are similarly defined for the qubit.

13. The device of any of the examples, wherein:

the RF field induces an interaction between the qubit and the register comprising $S_z I_z$ and at least one of $S_x I_x$ or $S_y I_y$ including exchange and non-exchange components, where Sx, Sy, Sx are the spin operators for the qubit ion and Ix, Iy, Iz are the spin operators for the register ions along the x, y, z cartesian axes respectively, the control circuit applies the protocol that engineers the interaction comprising only the coherent spin exchange interaction by causing a cancelation of any non-exchange components over the period, and the pulses are synchronized with a precession of the register ions about a predetermined quantization axis.

14. FIG. 2 illustrates an example of the device of any of the examples 1-13, wherein the RF field comprises a square wave and the sequence of pulses comprise:

in a first half period τ of the square wave a sequence of the second pulses comprising:

a first pi/2 pulse having a phase +Y followed by a first pi pulse having a phase +Y, the beginning of the first pi/2 pulse and the center of the first pi pulse separated in time by τ/4;

a second pi/2 pulse immediately followed by a third pi/2 pulse, the end of the second pi/2 pulse separated in time from the center of the first pi pulse by τ/4, wherein the second pi/2 pulse has a phase −Y and the third pi/2 pulse has a phase −X;

a second pi pulse having a phase −X and following the third pi/2 pulse, a center of the second pi pulse separated in time from the center of the first pi pulse by τ/2; and a fourth pi/2 pulse having a phase −X, wherein the end of the fourth pi/2 pulse is separated in time from center of the second pi pulse by τ/4; and in a second half period τ of the square wave, a repeat of the sequence of second pulses but wherein the first pi/2 pulse, the first pi pulse, and the second pi/2 pulse have opposite phase as compared to the first pi/2 pulse, the first pi pulse, and the second pi/2 pulse in the first half period, respectively.

15. The device of any of the examples 1-14, wherein the protocol de-couples the qubit from decoherence noise and random interactions caused by a nuclear Overhauser field generated by a host lattice 118 in which the qubit is located.

16. A system 112 for implementing a quantum register comprising the device of any of the examples claim 1-15 coupled to:

a spin carrying defect 120 in a host lattice, wherein the spin carrying defect comprises the qubit and the host lattice 118 comprises the register, or a quantum dot in a host lattice, wherein the quantum dot comprises the qubit and the host lattice comprises the register.

17 . . . . The system of claim 16, wherein the spin carrying defect is a qubit ion comprising the qubit and the register comprises a lattice 118 of register ions 122 surrounding the qubit ion.

18. The device of any of the examples 1-17, wherein the multiple register spins 100 in the register comprise nuclear spins and the first spin state and the second spin state comprise electron spin states.

19. The device of any of the examples, wherein the protocol controls oscillations between a first system state |1g>|0v>, representing a spin excitation in the qubit and register ions in the polarized state, and a second system state |0g>|W> where |W> is an entangled |W> spin state of the register comprising the spin excitation transferred from the qubit.

20. A protocol 200 for controlling a coherent spin exchange interaction between a register and a qubit having a zero magnetic dipole moment, wherein the qubit comprises a first spin state and a second spin state both having zero magnetic dipole moment; and the register comprises multiple indistinguishable spins. The protocol comprises a toggling RF field or magnetic field synchronized to a sequence of pulses, wherein a period (e.g. 2T) of the toggling RF field or magnetic field is matched to a spacing (e.g., T/4) of the pulses comprising single qubit gates (e.g., clifford gates performing unitary operations) and the protocol modulates the spin exchange interaction so as to transfer quantum information to or from the qubit.

21. The protocol of any of the examples, wherein the spin exchange interaction comprises an interaction between an electron spin of the qubit and a nuclear spin of the register (e.g., electron-nuclear dipole interaction) or an interaction between electron spins of the qubit and the register. Block 1712 represents optionally coupling the system in or to an application, e.g., in or to a quantum computer, in or to a quantum network, or in repeater for a quantum network.

22. The protocol of any of the examples 1-21, wherein the RF field comprises or is a magnetic field or the radio frequency (RF) field has a frequency in range 20 kHz-300 GHz.

Method of Performing Qubit Operations with a Controlled Spin Exchange Interaction FIG. 18 is a flowchart illustrating a method for coupling a qubit to a quantum register.

Block 1800 represents obtaining a protocol comprising a sequence of pulses synchronized with an RF field, the protocol further comprising a timing, a phase, and a duration of each of the pulses comprising a single qubit gate, and a period and amplitude of the RF field, wherein application of the protocol controls a coherent spin exchange interaction between a register and a qubit.

Block 1802 represents applying one or more cycles of the protocol to the qubit, so as to modulate the coherent spin exchange interaction transferring a spin excitation between the qubit and the register. The qubit comprises a first spin state and a second spin state both having a zero magnetic dipole moment, the register spins are indistinguishable so as to be configurable in basis states including a superposition state used for storing a quantum state of the qubit; and the pulses comprise an electromagnetic field tuned to excite a transition between the first spin state and the second spin state.

1. Quantum Memory

FIG. 19 illustrates a method of applying a number of cycles of the protocol so as transfer quantum information between the qubit and the register.

Block 1900 represents applying a first number of the cycles of the protocol to the qubit in combination with an initialization of the qubit so as to configure the register spins in a polarized state.

Block 1902 represents applying one or more of the pulses to the qubit to set a quantum state of the qubit.

Block 1904 represents applying a second number of the cycles of the protocol to the qubit so as to apply a first swap gate (two qubit gate) transferring a quantum state of the qubit from the qubit to the register, thereby changing the polarized state to a corresponding state of the register spins corresponding to the quantum state.

Block 1906 represents applying one or more cycles of the protocol to the qubit so as to apply a second swap gate retrieving the quantum state in the qubit from the register, thereby changing the corresponding state of the register spins to the polarized state.

2. Bell State Measurement

FIG. 20 is a flowchart illustrating a method of forming and measuring Bell states. The method comprises the following steps.

Block 2000 represents applying a first number of the cycles of the protocol in combination with an initialization of the qubit so as to configure the register spins in a polarized state.

Block 2002 represents applying one or more of the pulses to the qubit to set a quantum state of the qubit.

Block 2004 represents applying a second number of the cycles of the protocol to the qubit so as to apply a first square root of swap gate entangling the qubit with the register so as to form a Bell state.

Block 2006 represents applying one or more cycles of the protocol to the qubit so as to apply a second square root of swap gate interacting with the Bell state so as to perform a measurement of the Bell state.

REFERENCES FOR SUPPLEMENTARY EXAMPLES

The following references are incorporated by reference herein.

[1] Kindem, J. M. et al. Characterization of Yb 3+171: YVO4 for photonic quantum technologies. Phys. Rev. B 98, 1-10 (2018) [2] Bleaney, B., Gregg, J. F., De Oliveira, A. C. & Wells, M. R. Nuclear magnetic resonance of 51V (I=7/2) in lanthanide vanadates: II. The nuclear electric quadrupole interaction. J. phys., C, Solid state phys. 15, 5293-5303 (1982).

[3] Bleaney, B., Gregg, J. F., De Oliveira, A. C. & Wells, M. R. Nuclear magnetic resonance of 51V (I=7/2) in lanthanide vanadates: I. The paramagnetic shifts. J. phys., C, Solid state phys. 15, 5293-5303 (1982).

[4] Cohen-Tannoudji, C., Dupont-Roc, J. & Grynberg, G. Atom-Photon Interactions (Wiley-VCH, Weinheim, 2004).

[5] Bermudez, A., Jelezko, F., Plenio, M. B. & Retzker, A. Electron-mediated nuclear-spin interactions between distant nitrogen-vacancy centers. Phys. Rev. Lett. 107, 3-7 (2011).

[6] Knill, E. et al. Randomized benchmarking of quantum gates. Physical Review A-Atomic, Molecular, and Optical Physics 77,1-7(2008)

[7] Gullion, T., Baker, D. B. & Conradi, M. S. New, compensated Carr-Purcell sequences. J. Magn. Reson. 89, 479-484 (1990)

[8] Kindem, J. M. et al. Control and single-shot readout of an ion embedded in a nanophotonic cavity. Nature 580, 201-204 (2020)

[9] Taylor, J. M., Marcus, C. M. & Lukin, M. D. Long-Lived Memory for Mesoscopic Quantum Bits. Phys. Rev. Lett. 90, 4 (2003)

[10] Hartmann, S. R. & Hahn, E. L. Nuclear double resonance in the rotating frame. Phys. Rev. 128, 2042-2053 (1962).

[11] Scheuer, J. et al. Robust techniques for polarization and detection of nuclear spin ensembles. Phys. Rev. B 96, 1-10 (2017)

[12] Urbaszek, B. et al. Nuclear spin physics in quantum dots: An optical investigation. Rev. Mod. Phys. 85, 79-133 (2013).

[13] Bernien, H. et al. Heralded entanglement between solid-state qubits separated by three metres. Nature 497, 86-90 (2013).

[14] Further information on one or more embodiments of the present invention can be found in https://www.nature.com/articles/s41586-021-04293-6, Ruskuc, A., Wu, C J., Rochman, J. et al. Nuclear spin-wave quantum register for a solid-state qubit. *Nature* 602, 408-413 (2022). https://doi.org/10.1038/s41586-021-04293-6.

[15] US Patent Application Publication No. 20210028863 by Faraon et. al., entitled Optical Quantum Networks with Rare Earth Ions. U.S. patent application Ser. No. 16/937, 379.

Advantages and Improvements

Usually, working with dense nuclear spin ensembles leads to qubits with short coherence times where information cannot be transferred or stored for long. Additionally, these nuclear spins are often indistinguishable, meaning information cannot be stored on a single nuclear spin (as is commonly a requirement with other systems/protocols).

Example systems described herein resolve the issue of maintaining qubit coherence by using a transition with no magnetic dipole moment. However, the lack of magnetic dipole moment also inhibits the interactions needed to transfer quantum information to the nuclear spins. The pulse sequence disclosed herein enables this interaction despite the lack of magnetic dipole moment. Additionally, the form of interaction (spin preserving) enables storage of information in a delocalized fashion across multiple indistinguishable nuclear spins (so that single nuclear spin storage is no longer a requirement).

Thus, advantages of the protocol disclosed herein include:

Enabling initialization and control of a multi-level nuclear spin ensemble, which provides a much larger Hilbert space for quantum simulation compared to conventional single spin −½ nuclei.

Providing a novel configuration of pulse sequences enabling coherent control of the nuclear spin register using magnetically insensitive (and hence low-noise) qubit transitions.

Enabling the realisation of a reproducible and deterministic quantum register, a critical requirement for building scalable quantum networks.

Definitions

As known to a person skilled in the art, a pi pulse may refer to a pulse of light (e.g., laser) or microwaves generally resonant with a transition between two levels, the pulse being calibrated via known methods to move the population/excitation fully from one level to another. Accordingly, an optical pi pulse is a .pi. pulse in the optical (e.g., visible) domain/frequencies, and a microwave pi pulse is a .pi. pulse in the microwave domain/frequencies. It should be noted that a pi pulse can move (transfer) population/excitations with a probability of 1, so as to change the state of the qubit between the two spin states 0g and 1g, whereas as a non-pi pulse can transfer population/excitations with some probability between 0 and 1, and not necessarily 1, so as to form the qubit comprising a superposition of the spin states 0g and 1g.

In one or more examples, a spin-exchange interaction preserves total angular momentum of the system but may allow other aspects of the system to change. When two spins in the qubit and register experience a spin-exchange interaction, the total spin of the qubit-register system is preserved yet the orientation of the individual spins in the register and qubit may change. For example, if qubit A and register B are in opposite spin states, a spin-exchange interaction reverses the spins $$A(\uparrow)+B(\downarrow)\rightarrow A(\downarrow)+B(\uparrow)$$

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device for coupling a qubit to a register, comprising:

a circuit for controlling application of one or more cycles of a protocol comprising a sequence of pulses synchronized with an RF field, a timing, a phase, and a duration of each of the pulses, and a period and amplitude of the RF field, wherein:

the application of the one or more cycles of the protocol controls a coherent spin exchange interaction between a register and a qubit having a zero magnetic dipole moment;

the qubit comprises a first spin state and a second spin state both of which have the zero magnetic dipole moment;

the register comprises multiple register spins having an energy level structure;

the register spins are indistinguishable so as to be configurable in basis states including a superposition state used for storing a quantum state of the qubit; and the pulses each comprise an electromagnetic field tuned to excite a transition between the first spin state and the second spin state.

2. The device of claim 1, wherein the protocol is configured to:

suppress or cancel one or more non-exchange interactions between the register and the qubit, suppress or cancel noise coupled to the qubit and causing decoherence of the quantum state of the qubit, enable the coherent spin exchange interaction that performs a quantum logic gate, coherently transferring the quantum state of the qubit between the register and the qubit.

3. The device of claim 1, wherein the circuit controls:

application of a period of the protocol within a time period shorter than a rate of change of a magnetic noise, so that the magnetic noise is quasistatic during the application of the period of the protocol, wherein the magnetic noise causes qubit decoherence and induces a second order interaction (incoherent interaction) between the qubit and the register; and at least one of the phase, the duration, or time spacing of the pulses in the period so that:

the spin-exchange interactions induced by the RF field are preserved or maintained across the period;

one or more non-exchange interactions induced by the RF field are cancelled across the period;

any exchange interactions and any non-exchange interactions induced by the magnetic noise are cancelled across the period; and the qubit decoherence induced by the magnetic noise is cancelled over the period; and the RF field toggling between two values of equal magnitude and opposite polarity such that:

the period is associated with a frequency of a precession of each of the multiple register spins about a predetermined quantization axis; and the amplitude is selected for a predetermined magnitude of the coherent spin exchange interaction between the register spins and the qubit, and so as to form the coherent spin exchange interaction.

4. The device of claim 3, wherein the protocol comprises the sequence of single qubit gates, each of the single qubit gates comprising one of the pulses having the frequency and duration tuned to drive the transition between the first spin state and the second spin state.

5. The device of claim 1 comprising a quantum memory, wherein the circuit:

controls application of a number of cycles of the protocol in combination with an initialization of the qubit so as to configure the register spins in a polarized state;

controls application of one or more of the pulses to set the quantum state of the qubit; and controls application of a number of cycles of the protocol so as to apply a first swap gate (two qubit gate) transferring the quantum state of the qubit from the qubit to the register, thereby changing the polarized state to a corresponding state of the register spins corresponding to the quantum state; and controls application of a number of cycles of the protocol so as to apply a second swap gate retrieving the quantum state in the qubit from the register, thereby changing the corresponding state of the register spins to the polarized state.

6. The device of claim 5, wherein configuring the register spins in the polarized state comprises polarizing the register, which is initially in an unpolarized state comprising any configuration of excitations of the register spins, by:

(a) initializing the qubit in the first spin state by controlling application of one or more initialization pulses of an initialization electromagnetic field having a frequency tuned to initialize the quantum state of the qubit in the first spin state;

(b) applying one or more cycles of the protocol transferring a spin excitation from the register spins to the qubit; and (c) repeating steps (a) and (b) until all the excitations of the register spins are transferred from the register to the qubit and the register spins are initialized in the polarized state, as characterized by a measurement of the qubit remaining in the first spin state after step (b).

7. The device of claim 5, wherein the circuit controls application of the protocol so as to apply the first swap gate mapping (via the coherent spin exchange interaction) between the qubit and the register, such that:

if the qubit is in the first spin state, the corresponding state of the register is the polarized state, if the qubit is in the second spin state, the corresponding state of the register is a W state, and if the qubit is in a superposition of the first spin state and the second spin state, the corresponding state of the register is a superposition of the polarized state and the W state, and wherein the W state is a superposition of all single spin excitation states of the register spins.

8. The device of claim 1, wherein the circuit:

controls application of one or more cycles of the protocol in combination with an initialization of the qubit so as to configure the register spins in a polarized state;

controls application of one or more of the pulses to set the quantum state of the qubit;

controls application of one or more cycles of the protocol so as to apply a first square root of swap gate entangling the qubit with the register so as to form a Bell state; and controls application of one or more cycles of the protocol so as to apply a second square root of swap gate interacting with the Bell state so as to perform a measurement of the Bell state.

9. A repeater in a quantum network comprising the device of claim 8.

10. The repeater of claim 9, further comprising:

a photonic cavity coupled to a solid state material comprising the qubit and the register;

one or more microwave sources coupled to the qubit via a microwave waveguide, the microwave sources outputting one or more first microwave pulses and/or one or more second microwave pulses;

a radio frequency source outputting the RF field; and one or more laser sources outputting one or more laser pulses coupled to the qubit through the photonic cavity; and wherein:

the circuit controls the one or more laser sources and the one or more microwave sources so as to:

output initialization pulses comprising at least one of the one or more laser pulses or the one or more first microwave pulses having initialization frequencies for exciting one or more transitions initializing the qubit;

apply the protocol comprising the single qubit gates comprising the second microwave pulses in synchronization with the RF field; and output one or more readout electromagnetic fields having a readout frequency for exciting a readout transition from the second spin state to a readout state, so as to stimulate output of third pulses from the readout state.

11. The device of claim 1, wherein:

the pulses each comprise a pi pulse or a pi/2 pulse having at least one phase selected from +x −x, +y, or −y, and the circuit controls:

the sequence such that the period of the RF field is $2\tau$ and a spacing of the pulses is $\tau/4$, and for a given magnitude of the spin exchange interaction determined by the amplitude of the RF field, a number of repeats or cycles of the protocol that applies at least one of a swap gate transferring a quantum state between the qubit and the register, a square root of a swap gate for forming or measuring a Bell state, or that can be used to polarize the spins into a polarized state in combination with an initialization of the qubit.

12. The device of claim 1 wherein the circuit selects the duration and the timing of each of the pulses and a toggling of the RF field to engineer the coherent spin-exchange interaction comprising:

$$\tilde{S}_{+}\hat{I}_{-}+\tilde{S}_{-}\hat{I}_{+},$$

where $\hat{I}_{+}=|\uparrow\rangle\langle\downarrow|,\ \hat{I}_{-}=|\downarrow\rangle\langle\uparrow|$ are the raising and lowering operators in an effective nuclear two-level manifold of the multiple spins in the register and $\tilde{S}_{+}$ are similarly defined for the qubit.

13. The device of claim 1, wherein the RF field comprises a square wave and the sequence of pulses comprise:

in a first half period $\tau$ of the square wave a sequence of the second pulses comprising:

a first pi/2 pulse having a phase +Y followed by a first pi pulse having a phase +Y, the beginning of the first pi/2 pulse and the center of the first pi pulse separated in time by $\tau/4$;

a second pi/2 pulse immediately followed by a third pi/2 pulse, the end of the second pi/2 pulse separated in time from the center of the first pi pulse by $\tau/4$, wherein the second pi/2 pulse has a phase −Y and the third pi/2 pulse has a phase −X;

a second pi pulse having a phase −X and following the third pi/2 pulse, a center of the second pi pulse separated in time from the center of the first pi pulse by $\tau/2$; and a fourth pi/2 pulse having a phase −X, wherein the end of the fourth pi/2 pulse is separated in time from center of the second pi pulse by $\tau/4$; and in a second half period $\tau$ of the square wave, a repeat of the sequence of second pulses but wherein the first pi/2 pulse, the first pi pulse, and the second pi/2 pulse have opposite phase as compared to the first pi/2 pulse, the first pi pulse, and the second pi/2 pulse in the first half period, respectively.

14. The device of claim 1, wherein the protocol decouples the qubit from decoherence noise and random interactions caused by a nuclear Overhauser field generated by a host lattice in which the qubit is located.

15. A system for implementing a quantum register comprising the device of claim 1 coupled to:

a spin carrying defect in a host lattice, wherein the spin carrying defect comprises the qubit and the host lattice comprises the register, or a quantum dot in a host lattice, wherein the quantum dot comprises the qubit and the host lattice comprises the register.

16. The system of claim 15, wherein the spin carrying defect is a qubit ion comprising the qubit and the register comprises a lattice of register ions surrounding the qubit ion.

17. The device of claim 1, wherein the multiple spins in the register comprise nuclear spins and the first spin state and the second spin state comprise electron spin states.

18. A method for coupling a qubit to a quantum register, comprising:

obtaining a protocol comprising a sequence of pulses synchronized with an RF field, the protocol further comprising a timing, a phase, and a duration of each of the pulses comprising a single qubit gate, and a period and amplitude of the RF field, wherein application of the protocol controls a coherent spin exchange interaction between a register and a qubit; and applying one or more cycles of the protocol to the qubit, so as to modulate the coherent spin exchange interaction transferring a spin excitation between the qubit and the register; and wherein:

the qubit comprises a first spin state and a second spin state both having a zero magnetic dipole moment;

the register spins are indistinguishable so as to be configurable in basis states including a superposition state used for storing a quantum state of the qubit; and the pulses comprise an electromagnetic field tuned to excite a transition between the first spin state and the second spin state.

19. The method of claim 18, further comprising applying a number of cycles of the protocol so as transfer quantum information between the qubit and the register, comprising:

applying a first number of the cycles of the protocol to the qubit in combination with an initialization of the qubit so as to configure the register spins in a polarized state;

applying one or more of the pulses to the qubit to set the quantum state of the qubit;

applying a second number of the cycles of the protocol to the qubit so as to apply a first swap gate (two qubit gate) transferring the quantum state of the qubit from the qubit to the register, thereby changing the polarized state to a corresponding state of the register spins corresponding to the quantum state; and applying one or more cycles of the protocol to the qubit so as to apply a second swap gate retrieving the quantum state in the qubit from the register, thereby changing the corresponding state of the register spins to the polarized state.

20. The method of claim 18, further comprising a number of the cycles of the protocol so as to form and measurement of a Bell state, comprising:

applying a first number of the cycles of the protocol in combination with an initialization of the qubit so as to configure the register spins in a polarized state;

applying one or more of the pulses to the qubit to set the quantum state of the qubit;

applying a second number of the cycles of the protocol to the qubit so as to apply a first square root of swap gate entangling the qubit with the register so as to form a Bell state; and applying one or more cycles of the protocol to the qubit so as to apply a second square root of swap gate interacting with the Bell state so as to perform a measurement of the Bell state.

\* \* \* \* \*